US009650169B2

(12) United States Patent
Tom et al.

(10) Patent No.: US 9,650,169 B2
(45) Date of Patent: May 16, 2017

(54) NESTED BLOW MOLDED LINER AND OVERPACK AND METHODS OF MAKING SAME

(71) Applicant: ENTEGRIS, INC., Billerica, MA (US)

(72) Inventors: Glenn Tom, Bloomington, MN (US); Greg Nelson, Minneapolis, MN (US); Wei Liu, Eden Prairie, MN (US); Amy Koland, Eden Prairie, MN (US); Don Ware, Woodbury, MN (US); Daniel J. Durham, Toledo, OH (US); Tracy M. Momany, Sylvania, OH (US); Chantel Ortega, Millbury, OH (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 14/950,658

(22) Filed: Nov. 24, 2015

(65) Prior Publication Data

US 2016/0145003 A1 May 26, 2016

Related U.S. Application Data

(63) Continuation of application No. 14/001,713, filed as application No. PCT/US2011/055560 on Oct. 10, 2011, now Pat. No. 9,211,993.

(Continued)

(51) Int. Cl.
*A47J 41/02* (2006.01)
*B65D 1/02* (2006.01)
(Continued)

(52) U.S. Cl.
CPC ............ *B65D 1/0215* (2013.01); *B29C 49/24* (2013.01); *B29C 49/58* (2013.01); *B29D 22/003* (2013.01);
(Continued)

(58) Field of Classification Search
CPC ........... B29C 49/62; B29C 2049/2404; B29C 2049/2402; B65D 83/0055; B65D 77/06;
(Continued)

(56) References Cited

U.S. PATENT DOCUMENTS

| 1,589,138 A | 6/1926 | Fisk |
| 2,338,604 A | 1/1944 | Silveyra |

(Continued)

FOREIGN PATENT DOCUMENTS

| AT | 352609 | 9/1979 |
| AU | 632548 B2 | 1/1993 |

(Continued)

OTHER PUBLICATIONS

Cascio, S.J. et al. "Low Pressure Liquid Dispense System", IBM Technical Disclosure Bulletin, vol. 20, No. 1, Jun. c::1977 (pp. 126-127).

(Continued)

*Primary Examiner* — Anthony Stashick
*Assistant Examiner* — Mollie Impink
(74) *Attorney, Agent, or Firm* — Entegris, Inc. Legal Dept.; Brian E. Szymanski; Catherine D. Gates

(57) ABSTRACT

The present disclosure relates to an integrated liner-based system having an overpack and a liner provided within the overpack, the liner comprising a mouth and a liner wall forming an interior cavity of the liner and having a thickness such that the liner is substantially self-supporting in an expanded state, but is collapsible at a pressure of less than about 20 psi. The liner and overpack may be made by blow molding the liner and the overpack at the same time using nested preforms.

13 Claims, 36 Drawing Sheets

Related U.S. Application Data

(60) Provisional application No. 61/538,490, filed on Sep. 23, 2011, provisional application No. 61/506,807, filed on Jul. 12, 2011, provisional application No. 61/499,377, filed on Jun. 21, 2011, provisional application No. 61/484,523, filed on May 10, 2011, provisional application No. 61/468,549, filed on Mar. 28, 2011, provisional application No. 61/488,172, filed on Mar. 1, 2011, provisional application No. 61/448,164, filed on Mar. 1, 2011.

(51) Int. Cl.
| | | |
|---|---|---|
| B65D 77/06 | (2006.01) | |
| B65D 83/00 | (2006.01) | |
| B67D 1/04 | (2006.01) | |
| B67D 7/02 | (2010.01) | |
| B29C 49/24 | (2006.01) | |
| B29C 49/58 | (2006.01) | |
| B65D 23/02 | (2006.01) | |
| B29D 22/00 | (2006.01) | |
| B65D 83/38 | (2006.01) | |
| B65D 53/02 | (2006.01) | |
| B67D 1/08 | (2006.01) | |
| B65D 83/14 | (2006.01) | |
| B29L 31/00 | (2006.01) | |
| B29C 49/06 | (2006.01) | |
| B29L 9/00 | (2006.01) | |
| B29K 103/04 | (2006.01) | |
| B29K 105/12 | (2006.01) | |
| B29K 309/08 | (2006.01) | |

(52) U.S. Cl.
CPC ............ *B65D 1/023* (2013.01); *B65D 23/02* (2013.01); *B65D 53/02* (2013.01); *B65D 77/06* (2013.01); *B65D 83/0055* (2013.01); *B65D 83/38* (2013.01); *B67D 1/0462* (2013.01); *B67D 7/025* (2013.01); *B29C 49/06* (2013.01); *B29C 2049/2404* (2013.01); *B29C 2049/2477* (2013.01); *B29C 2049/5837* (2013.01); *B29C 2049/5841* (2013.01); *B29K 2103/04* (2013.01); *B29K 2105/12* (2013.01); *B29K 2309/08* (2013.01); *B29K 2995/0067* (2013.01); *B29K 2995/0069* (2013.01); *B29L 2009/001* (2013.01); *B29L 2031/712* (2013.01); *B29L 2031/7158* (2013.01); *B65D 83/14* (2013.01); *B67D 2001/0828* (2013.01)

(58) Field of Classification Search
CPC ...... B65D 83/14; B65D 83/38; B67D 3/0067; B67D 1/0004; B67D 1/0462; B67D 1/045; B67D 2001/0827; B67D 2001/0828
USPC ............ 220/495.01, 495.02, 495.04, 62.11; 206/62.11, 514; 264/512
See application file for complete search history.

(56) References Cited

U.S. PATENT DOCUMENTS

| | | |
|---|---|---|
| 2,608,320 A | 8/1952 | Harrison, Jr. |
| 2,804,995 A | 9/1957 | Fee |
| 2,816,691 A | 12/1957 | Ward |
| 2,889,078 A | 6/1959 | Thomas |
| 3,158,296 A | 11/1964 | Cornelius |
| 3,270,920 A | 9/1966 | Nessler |
| 3,275,193 A | 9/1966 | Barr |
| 3,450,254 A | 6/1969 | Miles |
| 3,484,011 A | 12/1969 | Greenhalgh et al. |
| 3,496,597 A | 2/1970 | Ayres |
| 3,592,360 A | 7/1971 | Aleck |
| 3,717,544 A | 2/1973 | Valyi |
| 3,731,854 A | 5/1973 | Casey |
| 3,813,198 A | 5/1974 | Valyi |
| 3,900,635 A | 8/1975 | Funderburk, Jr. et al. |
| 3,905,517 A | 9/1975 | Friedrich et al. |
| 3,938,708 A | 2/1976 | Burger |
| 3,966,378 A | 6/1976 | Valyi |
| 3,981,415 A | 9/1976 | Fowler et al. |
| 3,994,649 A | 11/1976 | Valyi |
| 3,999,915 A | 12/1976 | Stepenske |
| 4,008,830 A | 2/1977 | Meshberg |
| 4,062,475 A | 12/1977 | Harris et al. |
| 4,065,246 A | 12/1977 | Marcus |
| 4,090,541 A | 5/1978 | Cammarata, III et al. |
| 4,098,434 A | 7/1978 | Uhlig |
| 4,138,036 A | 2/1979 | Bond |
| 4,148,416 A | 4/1979 | Gunn-Smith |
| 4,322,020 A | 3/1982 | Stone |
| 4,330,066 A | 5/1982 | Berliner |
| 4,340,054 A | 7/1982 | Michaels |
| 4,350,272 A | 9/1982 | Petterson |
| 4,387,833 A | 6/1983 | Venus, Jr. |
| 4,391,861 A | 7/1983 | Nilsson |
| 4,423,829 A | 1/1984 | Katz |
| 4,457,455 A | 7/1984 | Meshberg |
| 4,469,250 A | 9/1984 | Evezich |
| 4,476,272 A | 10/1984 | Pengilly |
| 4,484,697 A | 11/1984 | Fry, Jr. |
| 4,560,069 A | 12/1985 | Simon |
| 4,615,925 A | 10/1986 | Nilsson |
| 4,641,765 A | 2/1987 | Diamond |
| 4,690,295 A | 9/1987 | Wills |
| 4,696,840 A | 9/1987 | McCullough et al. |
| 4,830,811 A | 5/1989 | Aoki |
| 4,842,165 A | 6/1989 | Van Coney |
| 4,846,359 A | 7/1989 | Baird et al. |
| 4,871,087 A | 10/1989 | Johnson |
| 4,881,666 A | 11/1989 | Tullman et al. |
| 4,892,230 A | 1/1990 | Lynn, Jr. |
| 4,909,416 A | 3/1990 | Evezich |
| 4,955,492 A | 9/1990 | Behm et al. |
| 4,964,540 A | 10/1990 | Katz |
| 4,966,207 A | 10/1990 | Howard et al. |
| 4,984,713 A | 1/1991 | Chambers et al. |
| 5,012,956 A | 5/1991 | Stoody |
| 5,027,952 A | 7/1991 | Kiplinger |
| 5,031,801 A | 7/1991 | Osgar et al. |
| 5,046,638 A | 9/1991 | Wolf |
| 5,049,349 A | 9/1991 | McCullough et al. |
| 5,085,904 A | 2/1992 | Deak et al. |
| 5,102,010 A | 4/1992 | Osgar et al. |
| 5,102,705 A | 4/1992 | Yammoto et al. |
| 5,108,007 A | 4/1992 | Smith et al. |
| 5,111,971 A | 5/1992 | Winer |
| 5,199,609 A | 4/1993 | Ash, Jr. |
| 5,201,438 A | 4/1993 | Norwood |
| 5,217,138 A | 6/1993 | Nichols |
| 5,228,589 A | 7/1993 | Della Riva |
| 5,232,126 A | 8/1993 | Winer |
| 5,232,129 A | 8/1993 | Guerra |
| 5,251,787 A | 10/1993 | Simson |
| 5,261,543 A | 11/1993 | Ugarelli |
| 5,294,695 A | 3/1994 | Lee et al. |
| 5,301,838 A | 4/1994 | Schmidt et al. |
| 5,303,834 A | 4/1994 | Krishnakumar et al. |
| 5,305,921 A | 4/1994 | Kock et al. |
| 5,332,121 A | 7/1994 | Schmidt et al. |
| 5,335,821 A | 8/1994 | Osgar |
| 5,343,901 A | 9/1994 | Meshberg |
| 5,344,045 A | 9/1994 | Richter et al. |
| 5,368,195 A | 11/1994 | Pleet et al. |
| 5,377,875 A | 1/1995 | Kock et al. |
| 5,381,910 A | 1/1995 | Sugiura et al. |
| 5,407,629 A | 4/1995 | Schmidt et al. |
| 5,419,936 A | 5/1995 | Tindale |
| 5,435,452 A | 7/1995 | Nishigami et al. |
| 5,443,766 A | 8/1995 | Slat et al. |

(56) References Cited

U.S. PATENT DOCUMENTS

| | | |
|---|---|---|
| 5,443,767 A | 8/1995 | Cahill |
| 5,447,678 A | 9/1995 | Kneer et al. |
| 5,454,486 A | 10/1995 | Mack et al. |
| 5,460,207 A | 10/1995 | Meshberg |
| 5,464,106 A | 11/1995 | Slat et al. |
| 5,472,105 A | 12/1995 | Krishnakumar et al. |
| 5,508,076 A | 4/1996 | Bright |
| 5,513,761 A | 5/1996 | Kobayashi et al. |
| 5,526,956 A | 6/1996 | Osgar |
| 5,529,196 A | 6/1996 | Lane |
| 5,529,744 A | 6/1996 | Tindale |
| 5,556,675 A | 9/1996 | Yamamoto et al. |
| 5,569,473 A | 10/1996 | Bright |
| 5,628,957 A | 5/1997 | Collette et al. |
| 5,645,183 A | 7/1997 | Slat et al. |
| 5,647,930 A | 7/1997 | Bright |
| 5,676,267 A | 10/1997 | Slat et al. |
| 5,680,966 A | 10/1997 | Johnson |
| 5,681,628 A | 10/1997 | Niederst et al. |
| 5,693,017 A | 12/1997 | Spears et al. |
| 5,704,503 A | 1/1998 | Krishnakumar et al. |
| 5,746,350 A | 5/1998 | Nishigami et al. |
| 5,749,500 A | 5/1998 | Kraus et al. |
| 5,750,216 A | 5/1998 | Horino et al. |
| 5,759,653 A | 6/1998 | Collette et al. |
| 5,772,056 A | 6/1998 | Slat |
| 5,804,016 A | 9/1998 | Schmidt et al. |
| 5,804,305 A | 9/1998 | Slat et al. |
| 5,875,921 A | 3/1999 | Osgar et al. |
| 5,888,598 A | 3/1999 | Brewster et al. |
| 5,908,128 A | 6/1999 | Krishnakumar et al. |
| 5,921,416 A | 7/1999 | Uehara |
| 5,925,710 A | 7/1999 | Wu et al. |
| 5,927,525 A | 7/1999 | Darr et al. |
| 5,957,328 A | 9/1999 | Osgar |
| 5,968,014 A | 10/1999 | Neftel et al. |
| 5,971,184 A | 10/1999 | Krishnakumar et al. |
| 5,976,653 A | 11/1999 | Collette et al. |
| 5,988,422 A | 11/1999 | Vallot |
| 6,001,439 A | 12/1999 | Kawakami et al. |
| 6,015,068 A | 1/2000 | Osgar et al. |
| 6,016,932 A | 1/2000 | Gaydosh et al. |
| 6,034,167 A | 3/2000 | Tung et al. |
| 6,051,295 A | 4/2000 | Schloss et al. |
| 6,068,900 A | 5/2000 | Kohn et al. |
| 6,083,450 A | 7/2000 | Safian |
| 6,112,925 A | 9/2000 | Nahill et al. |
| 6,179,142 B1 | 1/2001 | Hansen |
| 6,203,870 B1 | 3/2001 | Darr |
| 6,206,240 B1 | 3/2001 | Osgar et al. |
| 6,223,932 B1 | 5/2001 | Usui |
| 6,228,447 B1 | 5/2001 | Suzuki et al. |
| 6,237,809 B1 | 5/2001 | Kawai et al. |
| 6,238,201 B1 | 5/2001 | Safian |
| 6,244,454 B1 | 6/2001 | Yoshioka et al. |
| 6,253,936 B1 | 7/2001 | Kong |
| 6,254,820 B1 | 7/2001 | Cornell |
| 6,257,446 B1 | 7/2001 | Pike |
| 6,296,803 B1 | 10/2001 | Darr |
| 6,305,577 B1 | 10/2001 | Fillmore et al. |
| 6,312,641 B1 | 11/2001 | Hutchinson |
| 6,345,739 B1 | 2/2002 | Mekata |
| 6,349,838 B1 | 2/2002 | Saito et al. |
| 6,360,546 B1 | 3/2002 | Wang et al. |
| 6,412,668 B1 | 7/2002 | Vlooswijk et al. |
| 6,439,413 B1 | 8/2002 | Prevot et al. |
| 6,439,430 B1 | 8/2002 | Gilroy, Sr. et al. |
| 6,453,925 B1 | 9/2002 | Kamo |
| 6,460,404 B1 | 10/2002 | Chan et al. |
| 6,460,730 B1 | 10/2002 | Liedtke |
| 6,467,652 B2 | 10/2002 | Wilcox et al. |
| 6,503,586 B1 | 1/2003 | Wu et al. |
| 6,510,965 B1 | 1/2003 | Decottignies et al. |
| 6,513,669 B2 | 2/2003 | Ozawa et al. |
| 6,544,459 B2 | 4/2003 | Maruyama et al. |
| 6,562,279 B2 | 5/2003 | Slat |
| 6,607,097 B2 | 8/2003 | Savage et al. |
| 6,627,279 B2 | 9/2003 | Hirota et al. |
| 6,641,881 B1 | 11/2003 | Darr |
| 6,645,421 B1 | 11/2003 | Sanderson et al. |
| 6,648,201 B1 | 11/2003 | Marinaro et al. |
| 6,649,121 B1 | 11/2003 | Hamamoto et al. |
| 6,651,847 B2 | 11/2003 | Mekata et al. |
| 6,670,007 B1 | 12/2003 | Safian et al. |
| 6,672,479 B2 | 1/2004 | Shiraishi et al. |
| 6,679,439 B2 | 1/2004 | Duqueroie |
| 6,698,619 B2 | 3/2004 | Wertenberger |
| 6,702,978 B1 | 3/2004 | Kuehn |
| 6,719,173 B2 | 4/2004 | Safian |
| 6,720,047 B2 | 4/2004 | Kikuchi et al. |
| 6,749,780 B2 | 6/2004 | Tobias |
| 6,749,785 B2 | 6/2004 | Subramanian et al. |
| 6,752,297 B1 | 6/2004 | Ische |
| 6,793,095 B1 | 9/2004 | Dulisse et al. |
| 6,808,820 B2 | 10/2004 | Lee et al. |
| 6,879,876 B2 | 4/2005 | O'Dougherty et al. |
| 6,889,873 B1 | 5/2005 | Leboucher |
| 6,920,992 B2 | 7/2005 | Lane et al. |
| 6,926,859 B2 | 8/2005 | Collette et al. |
| 6,932,230 B2 | 8/2005 | Pedmo et al. |
| 6,938,788 B2 | 9/2005 | White |
| 6,939,591 B2 | 9/2005 | Hutchinson et al. |
| 6,942,123 B2 | 9/2005 | Wertenberger |
| 6,945,428 B2 | 9/2005 | Shimizu et al. |
| 6,974,047 B2 | 12/2005 | Kelley et al. |
| 7,021,488 B2 | 4/2006 | Thompson |
| 7,025,234 B2 | 4/2006 | Priebe et al. |
| 7,029,752 B2 | 4/2006 | Hama et al. |
| 7,051,890 B2 | 5/2006 | Onoda et al. |
| 7,051,907 B2 | 5/2006 | Brincat |
| 7,094,863 B2 | 8/2006 | Moore et al. |
| 7,111,763 B2 | 9/2006 | Masuda |
| 7,172,087 B1 | 2/2007 | Axe et al. |
| 7,172,096 B2 | 2/2007 | O'Dougherty |
| 7,191,910 B2 | 3/2007 | Deemer et al. |
| 7,195,129 B2 | 3/2007 | Klemm |
| 7,198,165 B2 | 4/2007 | Zhang |
| 7,201,291 B2 | 4/2007 | Vigny et al. |
| 7,204,950 B2 | 4/2007 | Farha et al. |
| 7,261,551 B2 | 8/2007 | Hutchinson et al. |
| 7,296,702 B2 | 11/2007 | Tanaka et al. |
| 7,296,703 B2 | 11/2007 | Lane |
| 7,308,991 B2 | 12/2007 | Alberg |
| 7,316,329 B2 | 1/2008 | Wertenberger |
| 7,332,204 B2 | 2/2008 | Hutchinson et al. |
| 7,364,046 B2 | 4/2008 | Joshi et al. |
| 7,371,455 B2 | 5/2008 | Shirane et al. |
| 7,374,055 B2 | 5/2008 | Hatcher et al. |
| 7,377,399 B2 | 5/2008 | Lane et al. |
| 7,438,196 B2 | 10/2008 | Yourist |
| 7,455,189 B2 | 11/2008 | Lane et al. |
| 7,459,119 B2 | 12/2008 | Ota et al. |
| 7,481,336 B2 | 1/2009 | Arghyris et al. |
| 7,531,226 B2 | 5/2009 | Lee et al. |
| 7,544,405 B2 | 6/2009 | Lepage |
| 7,568,588 B2 | 8/2009 | Yourist |
| 7,588,808 B2 | 9/2009 | Hutchinson et al. |
| 7,645,135 B2 | 1/2010 | Hutchinson et al. |
| 7,681,783 B2 | 3/2010 | Stephenson |
| 7,702,418 B2 | 4/2010 | O'Daugherty et al. |
| 7,713,464 B2 | 5/2010 | Nakajima et al. |
| 7,747,344 B2 | 6/2010 | O'Daugherty et al. |
| 7,810,664 B2 | 10/2010 | Trude |
| 7,810,679 B2 | 10/2010 | Wauters et al. |
| 7,833,466 B2 | 11/2010 | Hirota et al. |
| 7,857,157 B2 | 12/2010 | Lane et al. |
| 7,867,434 B2 | 1/2011 | Iwahashi et al. |
| 7,874,442 B2 | 1/2011 | Nievierowski et al. |
| 7,882,971 B2 | 2/2011 | Kelley et al. |
| 7,984,845 B2 | 7/2011 | Kelly |
| 7,988,897 B2 | 8/2011 | Yamamoto et al. |
| 7,997,460 B2 | 8/2011 | Pardes et al. |
| 8,017,063 B2 | 9/2011 | Hutchinson et al. |
| 8,038,039 B2 | 10/2011 | Kelly et al. |

(56) References Cited

U.S. PATENT DOCUMENTS

| | | |
|---|---|---|
| 8,052,012 B2 | 11/2011 | Kelley et al. |
| 8,074,839 B2 | 12/2011 | Ronsin et al. |
| 8,336,734 B2 | 12/2012 | Ware et al. |
| 8,851,322 B2 | 10/2014 | Landman |
| 8,899,445 B2 | 12/2014 | Rasmussen |
| 8,925,748 B2 | 1/2015 | Van Hove |
| 2001/0054597 A1 | 12/2001 | Ozawa et al. |
| 2002/0022099 A1 | 2/2002 | Schmidt et al. |
| 2002/0048642 A1 | 4/2002 | Beck |
| 2002/0050496 A1 | 5/2002 | Van Der Meer et al. |
| 2002/0088767 A1 | 7/2002 | Saito et al. |
| 2003/0059130 A1 | 3/2003 | Yoneyama et al. |
| 2003/0102335 A1 | 6/2003 | Barnett |
| 2003/0178445 A1 | 9/2003 | Safian |
| 2003/0205581 A1 | 11/2003 | Wertenberger |
| 2003/0211256 A1 | 11/2003 | Tobias |
| 2003/0218021 A1 | 11/2003 | Shimizu et al. |
| 2003/0222047 A1 | 12/2003 | McRae |
| 2004/0007589 A1 | 1/2004 | Leveen |
| 2004/0099687 A1 | 5/2004 | Magermans et al. |
| 2004/0149348 A1 | 8/2004 | Wertenberger |
| 2004/0155008 A1 | 8/2004 | Lane et al. |
| 2004/0164047 A1 | 8/2004 | White |
| 2004/0188449 A1 | 9/2004 | Thompson |
| 2004/0222238 A1 | 11/2004 | Vigny et al. |
| 2004/0226967 A1 | 11/2004 | Van Der Klaauuw et al. |
| 2005/0035083 A1 | 2/2005 | Pedmo et al. |
| 2005/0040181 A1 | 2/2005 | Kurosawa et al. |
| 2005/0067432 A1 | 3/2005 | Bonneyrat |
| 2005/0103802 A1 | 5/2005 | Alberg |
| 2005/0121408 A1 | 6/2005 | Deemer et al. |
| 2005/0129888 A1 | 6/2005 | Kwon |
| 2005/0140036 A1 | 6/2005 | Hirota et al. |
| 2005/0141788 A1 | 6/2005 | Ikeda et al. |
| 2005/0167433 A1 | 8/2005 | Kuehn et al. |
| 2005/0230418 A1 | 10/2005 | Campbell et al. |
| 2005/0247664 A1 | 11/2005 | Lane et al. |
| 2006/0030652 A1 | 2/2006 | Adams et al. |
| 2006/0037968 A1 | 2/2006 | Brenner |
| 2006/0054634 A1 | 3/2006 | Mekata |
| 2006/0110555 A1 | 5/2006 | Asai et al. |
| 2006/0131258 A1 | 6/2006 | Yourist |
| 2006/0131259 A1 | 6/2006 | Hatcher et al. |
| 2006/0151425 A1 | 7/2006 | Kelley et al. |
| 2006/0180568 A1 | 8/2006 | Lane |
| 2006/0182911 A1 | 8/2006 | Tammaji et al. |
| 2006/0186083 A1 | 8/2006 | Joshi et al. |
| 2006/0207961 A1 | 9/2006 | Kurtz |
| 2006/0210746 A1 | 9/2006 | Shi et al. |
| 2007/0007234 A1 | 1/2007 | Tanaka et al. |
| 2007/0007307 A1 | 1/2007 | Bohnisch et al. |
| 2007/0039917 A1 | 2/2007 | Yourist |
| 2007/0039918 A1 | 2/2007 | Lane et al. |
| 2007/0062907 A1 | 3/2007 | Heisner |
| 2007/0075032 A1 | 4/2007 | Kelley et al. |
| 2007/0090083 A1 | 4/2007 | Trude |
| 2007/0104907 A1 | 5/2007 | Nishioka et al. |
| 2007/0108228 A1 | 5/2007 | Kleyne |
| 2007/0108668 A1 | 5/2007 | Hutchinson et al. |
| 2007/0170144 A1 | 7/2007 | Lane et al. |
| 2008/0009574 A1 | 1/2008 | Huenefeld et al. |
| 2008/0010949 A1 | 1/2008 | Lane et al. |
| 2008/0023887 A1 | 1/2008 | Vollenberg et al. |
| 2008/0035519 A1 | 2/2008 | Swartz et al. |
| 2008/0083696 A1 | 4/2008 | Nievierowski et al. |
| 2008/0087628 A1 | 4/2008 | Bangi et al. |
| 2008/0241447 A1 | 10/2008 | Shi |
| 2008/0257846 A1 | 10/2008 | Hove et al. |
| 2008/0258356 A1 | 10/2008 | Van Hove et al. |
| 2008/0260978 A1 | 10/2008 | Van Hove et al. |
| 2008/0272145 A1 | 11/2008 | Nimmo et al. |
| 2008/0272154 A1 | 11/2008 | Maas et al. |
| 2008/0298727 A1 | 12/2008 | Edgington et al. |
| 2008/0302757 A1 | 12/2008 | Furusawa et al. |
| 2009/0020176 A1 | 1/2009 | Hasegawa et al. |
| 2009/0030094 A1 | 1/2009 | Yamane et al. |
| 2009/0045222 A1 | 2/2009 | Nimmo et al. |
| 2009/0057347 A1 | 3/2009 | Leys et al. |
| 2009/0095701 A1 | 4/2009 | Forsthovel |
| 2009/0127153 A1 | 5/2009 | Kim |
| 2009/0212071 A1 | 8/2009 | Tom et al. |
| 2009/0246428 A1 | 10/2009 | Shimizu et al. |
| 2009/0261097 A1 | 10/2009 | Yamamoto et al. |
| 2009/0283541 A1 | 11/2009 | Compton et al. |
| 2009/0297769 A1 | 12/2009 | Yan et al. |
| 2009/0314798 A1 | 12/2009 | Hovinen et al. |
| 2010/0025430 A1 | 2/2010 | Cisewski et al. |
| 2010/0025895 A1 | 2/2010 | Yamamoto et al. |
| 2010/0072166 A1 | 3/2010 | Dickie |
| 2010/0072167 A1 | 3/2010 | Dickie |
| 2010/0089488 A1 | 4/2010 | Veenendaal et al. |
| 2010/0112815 A1 | 5/2010 | O'Dougherty et al. |
| 2010/0116707 A1 | 5/2010 | Sasai et al. |
| 2010/0133292 A1 | 6/2010 | Ware et al. |
| 2010/0133295 A1 | 6/2010 | Chan et al. |
| 2010/0147884 A1 | 6/2010 | Compton et al. |
| 2010/0163514 A1 | 7/2010 | Human |
| 2010/0181280 A1 | 7/2010 | Howell et al. |
| 2010/0200586 A1 | 8/2010 | Furusawa |
| 2010/0206762 A1 | 8/2010 | Sasai et al. |
| 2010/0227089 A1 | 9/2010 | Van Hoven et al. |
| 2010/0239799 A1 | 9/2010 | Van Hoven et al. |
| 2010/0264140 A1 | 10/2010 | Apps |
| 2010/0330313 A1 | 12/2010 | Van Hoven et al. |
| 2011/0024450 A1 | 2/2011 | Maas et al. |
| 2011/0076432 A1 | 3/2011 | Sakaguchi et al. |
| 2011/0108574 A1 | 5/2011 | Nimmo et al. |
| 2011/0147406 A1 | 6/2011 | Grill |
| 2011/0187028 A1 | 8/2011 | Menning et al. |
| 2011/0210148 A1 | 9/2011 | Nelson et al. |
| 2012/0267388 A1 | 10/2012 | Tom et al. |
| 2014/0001205 A1 | 1/2014 | Hodges et al. |
| 2014/0374416 A1 | 12/2014 | Tom et al. |

FOREIGN PATENT DOCUMENTS

| | | |
|---|---|---|
| CN | 2558598 Y | 7/2003 |
| CN | 101384492 | 3/2009 |
| DE | 2135746 A1 | 2/1972 |
| DE | 2103447 | 8/1972 |
| DE | 10321339 A1 | 12/2004 |
| EP | 0105537 A2 | 4/1984 |
| EP | 0179538 A2 | 4/1986 |
| EP | 0189750 A2 | 8/1986 |
| EP | 0225677 A2 | 6/1987 |
| EP | 0276994 A2 | 8/1988 |
| EP | 0583953 A1 | 2/1994 |
| EP | 0633122 A1 | 1/1995 |
| EP | 0609348 B1 | 1/1997 |
| EP | 0957030 A2 | 11/1999 |
| EP | 1097899 A1 | 5/2001 |
| EP | 1277666 A1 | 1/2003 |
| EP | 1626925 B1 | 3/2007 |
| EP | 2148771 B1 | 5/2011 |
| EP | 2152494 B1 | 5/2011 |
| EP | 2366529 A1 | 9/2011 |
| EP | 2388233 A1 | 11/2011 |
| ES | 2293791 | 3/2008 |
| FR | 2676958 | 12/1992 |
| FR | 2895735 | 7/2007 |
| FR | 2902083 | 12/2007 |
| FR | 2905116 | 2/2008 |
| GB | 1560952 | 2/1980 |
| GB | 1601424 | 10/1981 |
| GB | 2353266 A | 2/2001 |
| JP | 57174221 | 10/1982 |
| JP | S6021415 U | 2/1985 |
| JP | S60 070561 U | 5/1985 |
| JP | 63049371 | 4/1988 |
| JP | 02208332 | 8/1990 |
| JP | H04045275 | 4/1992 |
| JP | 5031791 | 2/1993 |
| JP | 5213373 | 8/1993 |
| JP | 5330535 | 12/1993 |

(56) References Cited

FOREIGN PATENT DOCUMENTS

| | | |
|---|---|---|
| JP | 6039906 | 2/1994 |
| JP | 0664073 | 3/1994 |
| JP | 06286778 | 10/1994 |
| JP | 7067792 | 3/1995 |
| JP | 7257540 | 10/1995 |
| JP | 8001761 | 1/1996 |
| JP | 8192455 | 7/1996 |
| JP | 8268470 | 10/1996 |
| JP | 2586294 | 2/1997 |
| JP | 9208688 | 8/1997 |
| JP | 10081354 | 3/1998 |
| JP | 10095903 | 4/1998 |
| JP | 10167243 | 6/1998 |
| JP | 10180853 | 7/1998 |
| JP | 10230919 | 9/1998 |
| JP | 10287365 | 10/1998 |
| JP | 11011484 | 1/1999 |
| JP | 11042697 | 2/1999 |
| JP | 11153510 | 6/1999 |
| JP | 11268771 | 10/1999 |
| JP | 2000/062745 | 2/2000 |
| JP | 2001/062963 | 3/2001 |
| JP | 2002-2795 | 1/2002 |
| JP | 2002/145233 | 5/2002 |
| JP | 2002/264944 | 9/2002 |
| JP | 2003/040231 | 2/2003 |
| JP | 2003/192031 | 7/2003 |
| JP | 2003/252376 | 9/2003 |
| JP | 2003/341681 | 12/2003 |
| JP | 2005/047172 | 2/2005 |
| JP | 2005/088979 | 4/2005 |
| JP | 2005/178390 | 7/2005 |
| JP | 3845908 | 11/2006 |
| JP | 03910059 B2 | 4/2007 |
| JP | 2007/261607 | 10/2007 |
| JP | 2007/261608 | 10/2007 |
| JP | 2007/537948 | 12/2007 |
| JP | 4525922 | 8/2010 |
| JP | 2010/235197 | 10/2010 |
| JP | 2011-126601 | 6/2011 |
| KR | 2004/46283 | 10/2009 |
| TW | 197995 B | 1/1993 |
| TW | 556662 | 10/2003 |
| TW | 272216 | 2/2007 |
| WO | WO 91/08099 | 6/1991 |
| WO | WO 91/08100 | 6/1991 |
| WO | WO 93/14987 | 8/1993 |
| WO | WO 93/24392 | 12/1993 |
| WO | WO 99/43571 | 9/1999 |
| WO | WO 00/34023 | 6/2000 |
| WO | 01/76849 A1 | 10/2001 |
| WO | WO 01/83323 | 11/2001 |
| WO | WO 02/47988 A1 | 6/2002 |
| WO | WO 2005/023660 A1 | 3/2005 |
| WO | WO 2005/100203 A2 | 10/2005 |
| WO | WO 2006/116428 A2 | 11/2006 |
| WO | WO 2006/133026 A2 | 12/2006 |
| WO | WO 2007/019853 A2 | 2/2007 |
| WO | WO 2008/022605 A1 | 2/2008 |
| WO | WO 2008/077468 A1 | 7/2008 |
| WO | WO 2008/095024 A1 | 8/2008 |
| WO | WO 2009/041809 A1 | 4/2009 |
| WO | WO 2009/076101 A1 | 6/2009 |
| WO | WO 2009/088285 A1 | 7/2009 |
| WO | WO 2009/154446 A1 | 12/2009 |
| WO | WO 2010/031764 A2 | 3/2010 |
| WO | WO 2010/044659 A1 | 4/2010 |
| WO | WO 2010/064749 A1 | 6/2010 |
| WO | WO 2011/002294 A2 | 1/2011 |
| WO | WO 2012/051093 A2 | 4/2012 |
| WO | WO 2012/051496 A2 | 4/2012 |
| WO | WO 2012/118527 A1 | 9/2012 |
| WO | WO 2012/135266 A2 | 10/2012 |

OTHER PUBLICATIONS

"Burple", Retroland, Inc., 2003-2011. Retrieved from Internet Nov. 27, 2012 URL: <http://www.retroland.com/burple/>(3 pp.).

"Cheertainer Bag in Box", CDF Corporation, 2012. Retrieved from Internet Dec. 4, 2012 URL:<http://www.cdfl.com/cheertainer.php>(2 pp.).

Ophir, A. et al "Hot Fillable Containers Containing PET/Pen Copolymers and Blends", 2004. Retrieved from Internet Dec. 4, 2012. URL: <http://www.ispirc.co.il/images/calc/HighTempPET.doc> (20 pp.).

Hudson, Benjamin S. "The effect of liquid hot filling temperature on blow-molded HOPE bottle properties", Dec. 2008. Retrieved from Internet Dec. 4, 2012 URL: <http://contentdm.lib.byu.edu/cdm/ref/collection/ETD/id/1628> (154 pp.).

Supplementary European Search Report and Opinion for related European Application 13176645.3, mailed Nov. 3, 2014 (3 pages).

Supplementary European Search Report and Opinion for related European Application 11833189.1 dated Jun. 23, 2015 (6 pages).

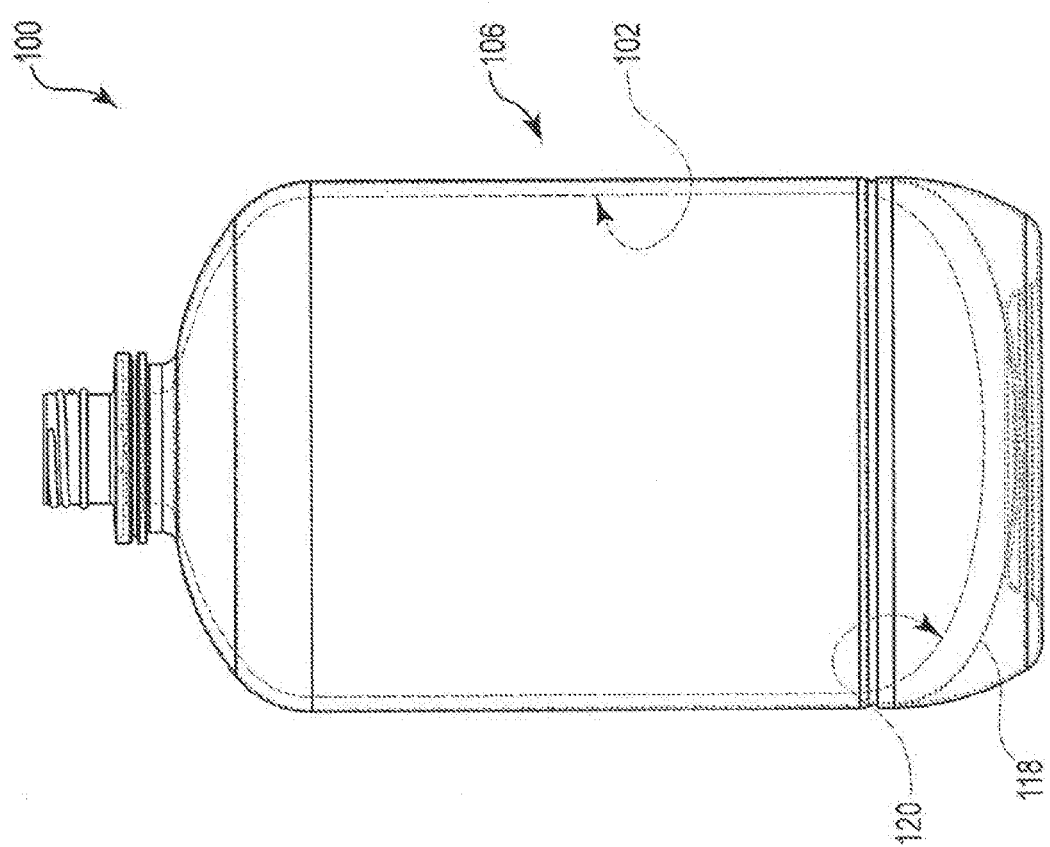

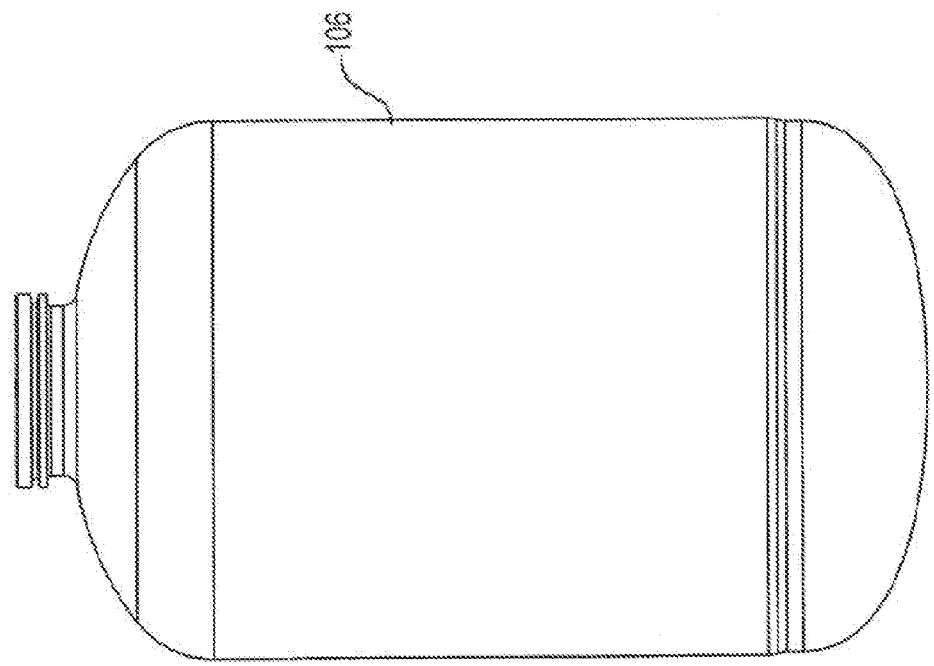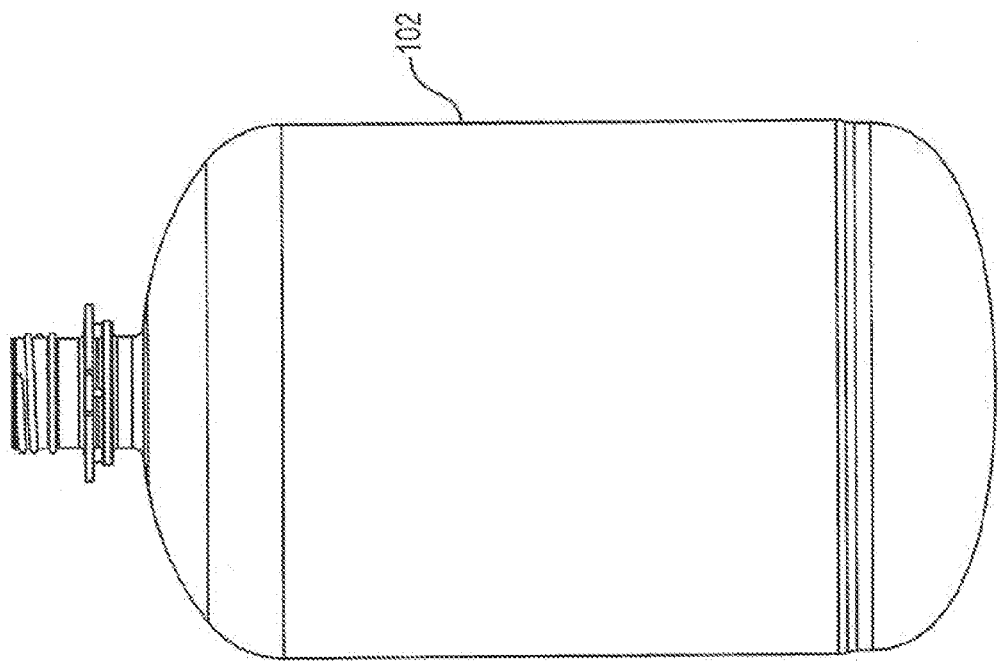

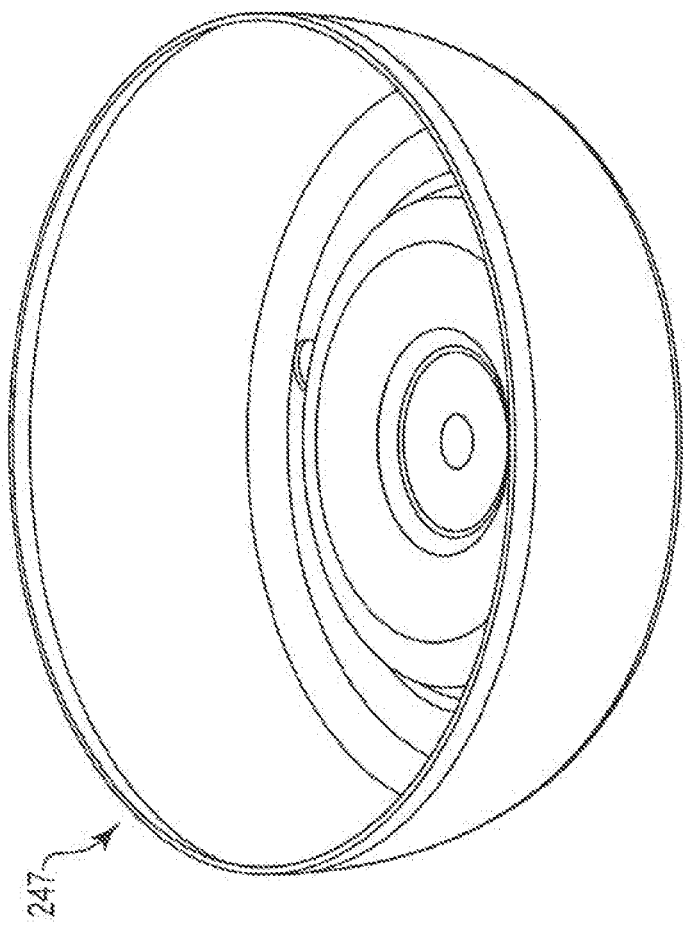

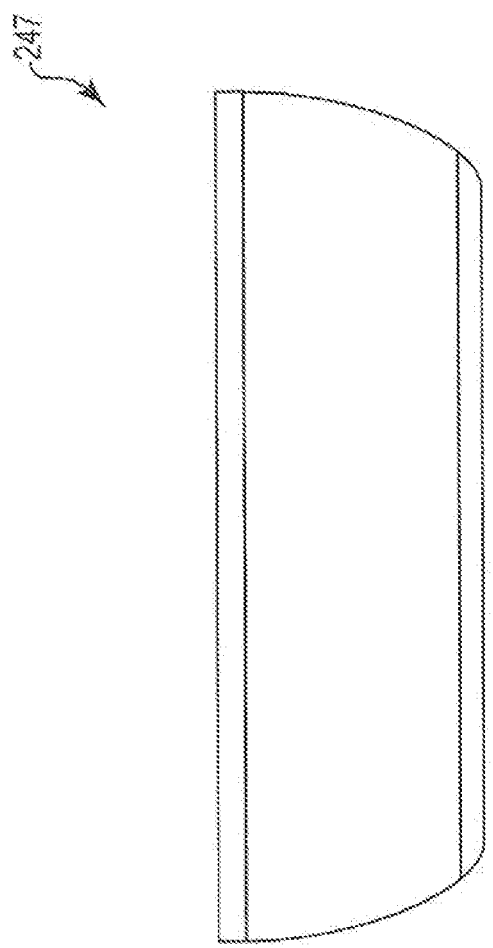

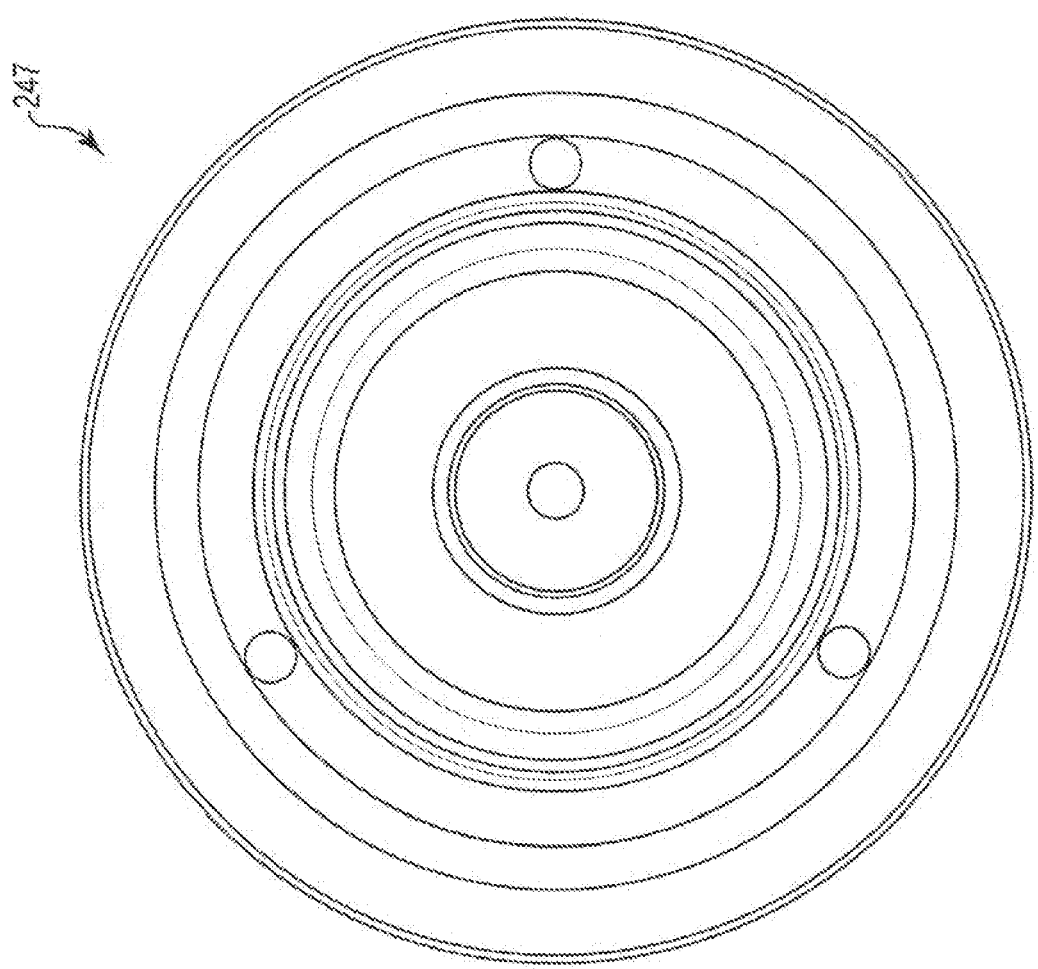

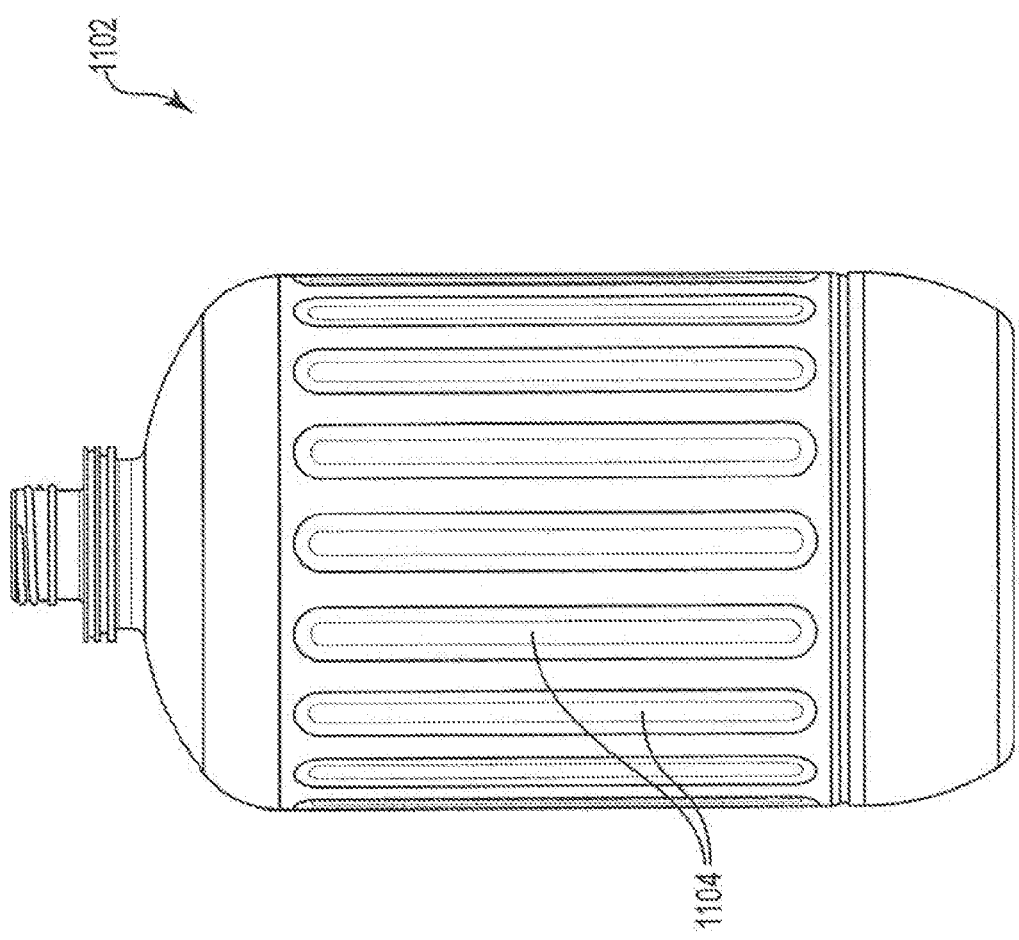

NESTED BLOW MOLDED LINER AND OVERPACK AND METHODS OF MAKING SAME

CROSS-REFERENCE TO RELATED APPLICATIONS

The present application is a continuation of U.S. patent application Ser. No. 14/001,713, filed on Nov. 14, 2013, which is a 371 of PCT/US2011/055560, filed on Oct. 10, 2011, which claims the benefit of U.S. Provisional Application No. 61/538,490 filed on Sep. 23, 2011, U.S. Provisional Application No. 61/506,807 filed on Jul. 12, 2011, U.S. Provisional Application No. 61/499,377 filed on Jun. 21, 2011, U.S. Provisional Application No. 61/484,523 filed on May 10, 2011, U.S. Provisional Application No. 61/468,549 filed on Mar. 28, 2011, U.S. Provisional Application No. 61/448,172 filed on Mar. 1, 2011, and U.S. Provisional Application No. 61/448,164 filed on Mar. 1, 2011, all of which are incorporated herein in their entirety by reference.

FIELD OF THE INVENTION

The present disclosure relates to liner-based storage and dispensing systems. More particularly, the present disclosure relates to liner-based systems that are created by a nested blow-molding process.

BACKGROUND OF THE INVENTION

Numerous manufacturing processes require the use of ultrapure liquids, such as acids, solvents, bases, photoresists, slurries, cleaning formulations, dopants, inorganic, organic, metalorganic and biological solutions, pharmaceuticals, and radioactive chemicals. Such applications require that the number and size of particles in the ultrapure liquids be minimized. In particular, because ultrapure liquids are used in many aspects of the microelectronic manufacturing process, semiconductor manufacturers have established strict particle concentration specifications for process chemicals and chemical-handling equipment. Such specifications are needed because, should the liquids used during the manufacturing process contain high levels of particles or bubbles, the particles or bubbles may be deposited on solid surfaces of the silicon. This can, in turn, lead to product failure and reduced quality and reliability.

Examples of the types of containers typically used in the industries include flexible liners, simple rigid-wall containers made of glass or plastic and collapsible liner-based containers. However, current methods of manufacturing liner-based systems may not be as efficient as possible. Thus, there exists a need in the art for better methods of manufacturing liner based systems. In particular, the need exists for more efficient methods of manufacturing liner-based systems where the liner may be comprised of a material that is different from the material comprising the overpack. More particularly, there exists a need for liner-based systems created by a nested blow molding process.

BRIEF SUMMARY OF THE INVENTION

The present disclosure, in one embodiment, relates to a liner-based system comprising a liner disposed within an overpack. The liner and the overpack are made by blow molding the liner and the overpack at the same time using nested preforms.

The present disclosure, in another embodiment, relates to a liner-based system including a liner disposed within an overpack, wherein the liner and overpack are made by blow molding the liner and the overpack at the same time using nested preforms, the liner and the overpack being comprised of different materials having different melting points. The liner may be configured to collapse away from an interior wall of the overpack upon the introduction of a gas or liquid into an annular space between the liner and the overpack, thereby dispensing contents of the liner. The liner and/or overpack may include one or more surface features for controlling the collapse of the liner. The one or more surface features, in some cases, may be a plurality of rectangular-shaped panels spaced around the circumference of the at least one of the liner or overpack. The one or more surface features for controlling the collapse of the liner may be configured to maintain the integrity between the liner and overpack when not in active dispense. In some cases, the system may include a chime coupled to the exterior of the overpack. The chime may be coupled to the overpack by snap fit, with the chime substantially entirely covering the one or more surface features. The liner and/or overpack may be configured to control the collapse of the liner such that the liner collapses substantially evenly circumferentially away from the interior wall of the overpack. The liner and/or overpack may each have a barrier coating for protecting contents of the liner. Similarly, the chime may have a barrier coating for protecting the contents of the liner. The liner and/or overpack may, in some cases, include a coating or wrap that at least partially protects contents of the liner from ultra-violet rays. The materials comprising the liner and/or overpack may include additional additives, such as but not limited to an ultra-violet blocking additive, an energy-absorbing additive, an energy releasing additive, or a colorant. The liner and/or overpack preforms can include features to form air channels during the blow mold process that permit gas introduced during pressure dispense or pressure assisted pump dispense to flow more evenly throughout the annular space between the overpack and liner. The liner and/or overpack may have a plurality of wall layers and/or be comprised of a biodegradable material. The liner and overpack walls in an expanded shape may be substantially cylindrical. In some cases, the system may include a handle coupled to at least one of the overpack or liner.

The present disclosure, in yet another embodiment, relates to a method for providing a liner-based system. The method may include providing a liner preform, providing an overpack preform, the material comprising the overpack preform being different than the material comprising the liner preform, heating the liner preform to a first temperature; inserting the heated liner preform into the overpack preform, heating the nested liner and overpack preforms, and blow-molding the heated nested preforms at the same time. The method may also include providing features in at least one of the liner or overpack preforms to form air channels during the blow mold process that permit gas introduced during pressure dispense or pressure assisted pump dispense to flow more evenly throughout the annular space between the overpack and liner. It may also include providing additives in at least one of the materials used to make the liner preform or the overpack preform, the additives comprising at least one of an ultra-violet blocking additive, an energy-absorbing additive, an energy releasing additive, or a colorant.

Embodiments of liners of the present disclosure, in some cases, may be dispensed at pressures less than about 100 psi, or more preferably at pressures less than about 50 psi, and still more preferably at pressures less than about 20 psi, in some cases, the contents of the liners of some embodiments may be dispensed at significantly lower pressures, as described in this disclosure. The present disclosure, in yet another embodiment, relates to an integrated liner-based system having an overpack and a liner provided within the overpack, the liner comprising a mouth and a liner wall forming an interior cavity of the liner and having a thickness such that the liner is substantially self-supporting in an expanded state, but is collapsible at a pressure of less than about 20 psi. The liner and overpack may be made by blow molding the liner and the overpack at the same time using nested preforms.

In another embodiment, the present disclosure relates to a method of delivering a high purity material to a semiconductor process that includes providing a substantially rigid, free-standing container having the high purity material stored in an interior thereof. The container has a container wall comprising polyethylene naphthalate (PEN) and a dip tube in the interior for dispensing the high purity material therefrom.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1A is a cross-sectional view of a liner-based system in accordance with an embodiment of the present disclosure.

FIG. 1B is a perspective view of a liner in accordance with an embodiment of the present disclosure.

FIG. 1C is a perspective view of an overpack in accordance with an embodiment of the present disclosure.

FIG. 2C is a top view of a chime in accordance with yet another embodiment of the present disclosure.

FIG. 2D is a side view of the chime, according to the embodiment shown in FIG. 2C.

FIG. 2E is a bottom view of the chime, according to the embodiment shown in FIG. 2C.

FIG. 11A is a perspective view of a liner-based system including surface features according to one embodiment of the present disclosure.

DETAILED DESCRIPTION

Figure 2A:
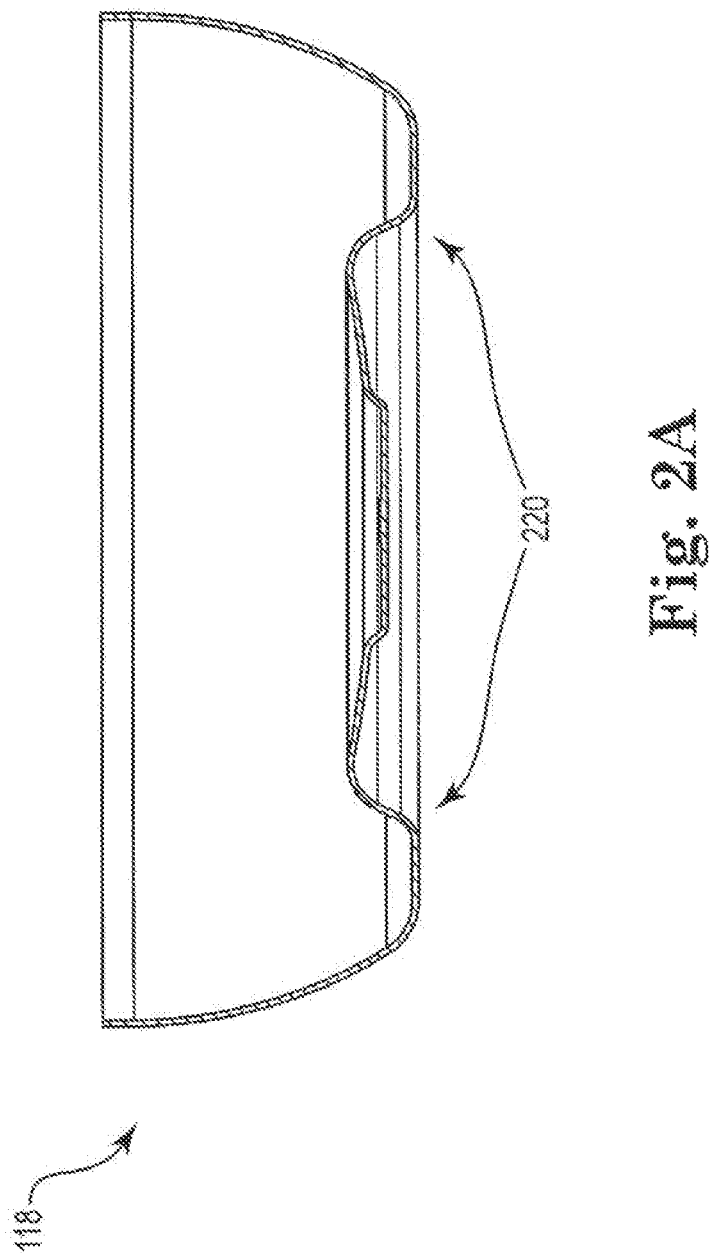
FIG. 2A is a side perspective view of a chime in accordance with an embodiment of the present disclosure.

The present disclosure relates to novel and advantageous liner-based storage and dispensing systems and methods of making the same. More particularly, the present disclosure relates to novel and advantageous liner-based storage and dispensing systems and methods for manufacturing such liners using nested co-blow molding. More particularly, in some embodiments, the present disclosure relates to a nested blow-molded, liner-based system whereby the liner and the outer container are comprised of different materials.

Example uses of the liners disclosed herein may include, but are not limited to, transporting and dispensing acids, solvents, bases, photoresists, chemicals and materials for OLEDs, such as phosphorescent dopants that emit green light, for example, ink jet inks, slurries, detergents and cleaning formulations, dopants, inorganic, organic, metalorganics, TEOS, and biological solutions, DNA and RNA solvents and reagents, biopharmaceuticals, pharmaceuticals, hazardous waste, radioactive chemicals, and nanomaterials, including for example, fullerenes, inorganic nanoparticles, sol-gels, and other ceramics, and liquid crystals, such as but not limited to 4-methoxylbenzylidene-4'-butylaniline (MBBA) or 4-cyanobenzylidene-4'-n-octyloxyanaline (CBOOA). However, such liners may further be used in other industries and for transporting and dispensing other products such as, but not limited to, coatings, paints, polyurethanes, food, soft drinks, cooking oils, agrochemicals, industrial chemicals, cosmetic chemicals (for example, foundations, bases, and creams), petroleum and lubricants, adhesives (for example, but not limited to epoxies, adhesive epoxies, epoxy and polyurethane coloring pigments, polyurethane cast resins, cyanoacrylate and anaerobic adhesives, reactive synthetic adhesives including, but not limited to, resorcinol, polyurethane, epoxy and/or cyanoacrylate), sealants, health and oral hygiene products, and toiletry products, etc. Those skilled in the art will recognize the benefits of such liners and the process of manufacturing the liners, and therefore will recognize the suitability of the liners to various industries and for the transportation and dispense of various products.

As stated above, the present disclosure relates to various embodiments of a nested blow-molded, which may also be referred to herein as co-blow molded, liner-based storage and dispensing system, such as for storage of about 200 L or less of liquid, and more desirably about 20 L or less of liquid, or any other desired volume. Accordingly, the co-blow molded liners may be suitable for storage of high purity liquids, which can be very expensive (e.g., about $2,500/L or more), that are used in the integrated circuit or flat panel display industries, for example.

As may be seen in FIG. 1A, the liner-based system 100, manufactured according to some embodiments of the present disclosure, may include a liner 102 that is disposed within an overpack 106. FIG. 1B shows a liner 102 according to some embodiments of the present disclosure, and FIG. 1C shows an overpack 106 according to some embodiments of the present disclosure. As may be seen, the liner 102 may have substantially the same shape and size as the overpack 106, except that the liner 102 may be smaller, and in some cases only slightly smaller than the overpack 106, such that it fits within, and in some cases closely conforms to the interior of the overpack 106. In some embodiments, the system 100 may include a base cup, support, or chime 118 that may provide support for the system and in some embodiments permit the liner 102 and overpack 106 to stand upright in instances where the bottom of the liner 102 and overpack 106 may be rounded or otherwise unsuited to standing upright. The contents of a liner-based system of the present disclosure may be dispensed by any suitable means, including, for example direct and indirect pressure dispense, pressure assisted pump dispense, and/or pressure assisted gravity dispense.

The liner 102 of the liner-based system may be comprised of any suitable material or combination of materials. For example, in some embodiments, liner 102 may be manufactured using one or more polymers, including plastics, nylons, EVOH, polyolefins, or other natural or synthetic polymers. In further embodiments, liner 102 may be manufactured using polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (HDPE), high-density polyethylene (HDPE), and/or polypropylene (PP). In some embodiments, the material or materials selected and the thickness of that material or those materials may determine the rigidity of the liner 102.

In alternative embodiments, liner 102 may be manufactured using a fluoropolymer, such as but not limited to, polychlorotrifluoroethylene (PCTFE), polytetrafluoroethylene (PTFE), fluorinated ethylene propylene (FEP), and perfluoroalkoxy (PFA). In some embodiments, liner 102 may comprise multiple layers. For example, in certain embodiments, liner 102 may include an internal surface layer, a core layer, and an outer layer, or any other suitable number of layers. The multiple layers may comprise one or more different polymers or other suitable materials. For example, the internal surface layer may be manufactured using a fluoropolymer (e.g., PCTFE, PTFE, FEP, PFA, etc.) and the core layer may be a gas barrier layer manufactured using such materials as nylon, EVOH, polyethylene naphthalate (PEN), PCTFE, etc. The outer layer may also be manufactured using any variety of suitable materials and may depend on the materials selected for the internal surface layer and core layer. It is recognized that the various embodiments of substantially rigid liners described herein may be manufactured from any suitable combination of materials disclosed herein.

Liners 102 of the present disclosure may be made of any suitable material, as explained above, may have any desired or suitable thickness, may have any suitable shape, and may be of any suitable type, for example, flexible, rigid collapsible, or glass bottle replacement. Examples of some types of liners that may be used in embodiments of the present disclosure are described in detail in U.S. Patent Appln. No. 61/538,509, titled, "Substantially Rigid Collapsible Liner, Container and/or Liner for Replacing Glass Bottles, and Flexible Gusseted or Non-Gusseted Liners," filed Sep. 23, 2011, which is hereby incorporated herein by reference in its entirety. Preferably, embodiments of the present disclosure include rigid collapsible liners. Such rigid collapsible liners may be any suitable thickness as described above, and may generally be thick and rigid enough to substantially reduce or eliminate the occurrence of pinholes, in some embodiments. In some embodiments, for example, the liner walls and/or overpack walls and/or the walls of the liner and overpack incombination may be from 0.1 to 3.0 mm thick. In one embodiment, the liner wall may be from about 0.05 mm to about 3 mm thick, desirably from about 0.1 mm to about 1 mm thick, and more desirably from about 0.15 mm to about 0.6 mm thick. However, the thickness may vary depending on the volume of the liner as well as the material from which the liner is made.

The liner wall may generally be thicker than the liners in conventional collapsible liner-based systems. The increased thickness of liner wall and/or the composition of the film comprising the liner increases the rigidity and strength of liner 102. Because of the rigidity, in one embodiment, liner 102 may be free-standing and used similar to conventional rigid-wall containers, for example glass bottles. In another embodiment, the liner 102 may be free-standing during filling, transportation, and storage. That is, an outer container is not necessary for support of the liner as with liners in conventional collapsible liner-based systems. In one embodiment, a pressure vessel may be used when pressure dispensing liquid from liner 100 during chemical delivery. In a further embodiment, liner 102 may be a free-standing container system. Such embodiments can reduce the overall cost of the container system by substantially eliminating the cost associated with the outer containers. Additionally, in conventional collapsible liner-based systems, the liner and outer container are both typically non-reusable and need to be disposed. In various embodiments of the present disclosure, since an outer container is not necessary, waste can be substantially reduced or minimized because only the liner would be disposed. In one embodiment, the liner wall may be from about 0.05 mm to about 3 mm thick, desirably from about 0.2 mm to about 1 mm thick. However, the thickness may vary depending on the volume of the liner. Generally, liner 102 can be thick and rigid enough to substantially reduce or eliminate the occurrence of pinholes.

As mentioned above, both the composition of the film comprising the liner as well as the thickness of the liner wall can provide rigidity to liner 102. The thickness is selected so that, when a specified amount of pressure or vacuum is applied to liner 102, the liner wall is collapsible to dispense liquid from within the interior cavity of the liner 102. In one embodiment, the dispensability of liner 102 may be controlled based on the thickness selected for liner wall 102. That is, the thicker liner wall 102 is, the more pressure that will need to be applied to fully dispense the liquid from within the interior cavity. In further embodiments, the liner 102 may be initially shipped in a collapsed or folded state to save shipping space, and allow more liners 102 to be shipped to a recipient, for example a chemical supplier, in one shipment. The liner 102 could subsequently be filled with any of various liquids or products.

As used herein, the terms "rigid" or "substantially rigid," in addition to any standard dictionary definitions, are meant to also include the characteristic of an object or material to substantially hold its shape and/or volume when in an environment of a first pressure, but wherein the shape and/or volume may be altered in an environment of increased or decreased pressure. The amount of increased or decreased pressure needed to alter the shape and/or volume of the object or material may depend on the application desired for the material or object and may vary from application to application.

Liners of the present disclosure may take a number of advantageous shapes. As can be seen in FIG. 1, in one embodiment, a liner 102 may be configured such that the bottom of the liner is rounded or bowl-shaped 120. In such embodiments, the degree of rounding may vary. The rounding of the bottom surface may be such that the liner 102 may still be free-standing or self-supporting in some embodiments. Embodiments of liners with rounded bottoms may help improve chemical utilization in, for instance, a pump dispense application as the rounding of the bottom surface may help properly direct a dip tube to the bottom of the liner, for example. Such an embodiment may be particularly useful with liners that are opaque, for instance, which may also help improve chemical utilization and dip tube alignment. A rounded bottom may also be advantageous for embodiments where the contents of the liner are direct pressure dispensed because the rounded bottom may help the liner prevent deformation. A rounded bottom of the overpack may also be advantageous for embodiments where the contents of the liner are indirect pressure dispensed because the rounded bottom may help the overpack prevent deformation when pressurized fluid is added in the annular space between the walls of the overpack and the walls of the liner.

The overpack 106 of the present disclosure, in some embodiments may be comprised of any suitable material such as but not limited to PEN, PET, or PBN, or any suitable mixtures or copolymers thereof, and may exhibit any of the advantageous properties discussed herein. Also, such container may be any suitable thickness as described above, and may generally be thick and rigid enough to substantially reduce or eliminate the occurrence of pinholes, in some embodiments. Examples of some types of overpacks that may be used with embodiments of the present disclosure are described in detail in U.S. Patent Appln. No. 61/538,509, titled, "Substantially Rigid Collapsible Liner, Container and/or Liner for Replacing Glass Bottles, and Flexible Gusseted or Non-Gusseted Liners," filed Sep. 23, 2011, which was previously incorporated herein by reference in its entirety.

Figure 2B:
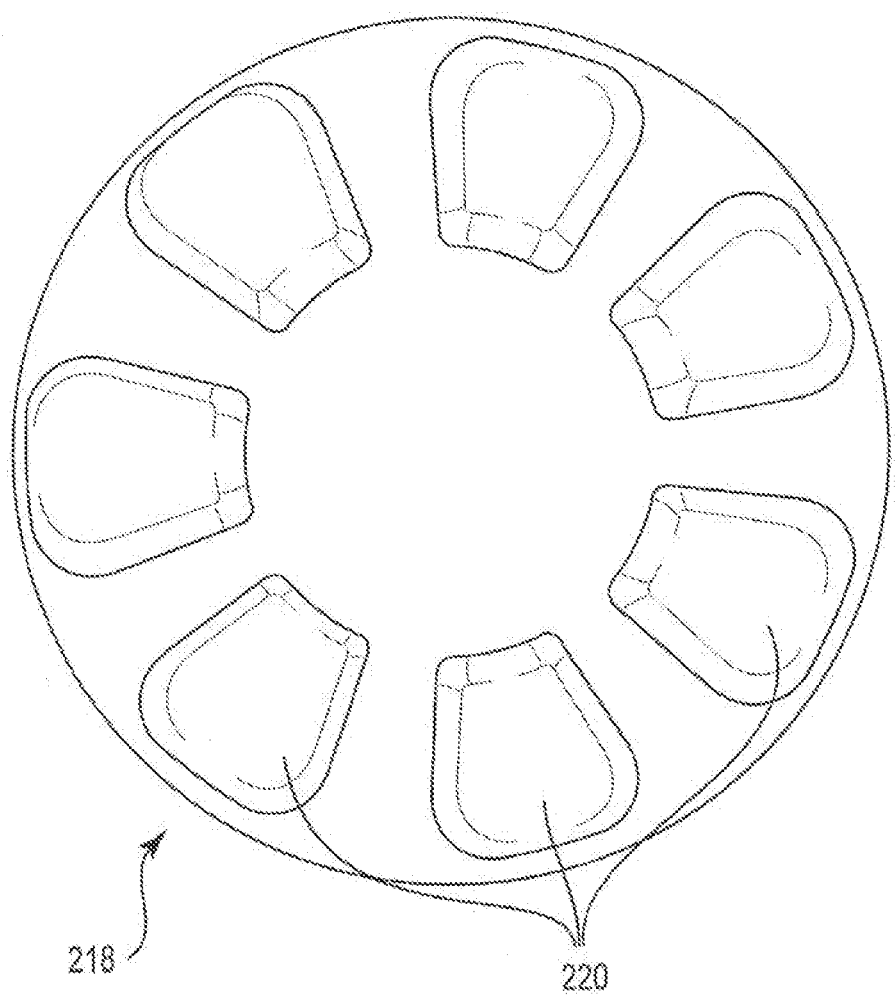
FIG. 2B is a bottom perspective view of a chime in accordance with another embodiment of the present disclosure.
Figure 2F:
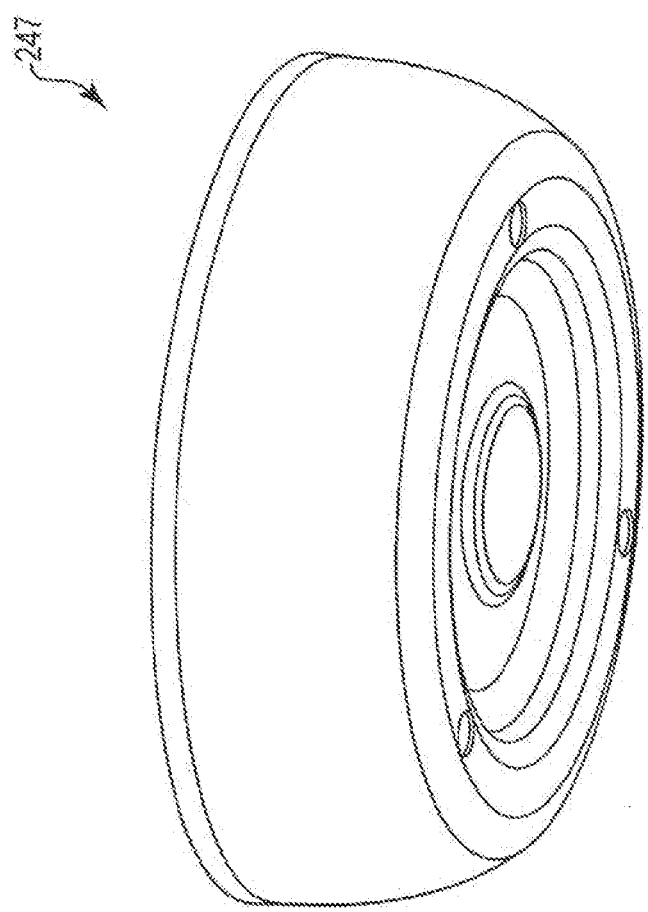
FIG. 2F is a bottom side view of the chime, according to the embodiment shown in FIG. 2C.

A support or chime 118, as shown in FIG. 2A, may also be included in the liner-based system of the present disclosure, in some embodiments. The chime 118 may be made of any suitable material, including, but not limited to any of the materials listed above or any other suitable material or combination of materials. The chime 118 may provide stability for the liner-based system, such that the system may stand upright. The use of a chime 118 may be particularly important and advantageous in use with embodiments of systems that have a rounded bottom. It will be noted, however, that a chime 118 may be used with embodiments of liner/overpack combinations that have a bottom of any shape. The chime 118, in some embodiments may have feet 220 that may help provide stability to the system. In some embodiments the chime may have any number of feet, including no feet, two feet, four feet, or any other number of feet. The chime 118 may fixedly or detachably secure to the overpack by any suitable means, in some embodiments. For example, the chime 118 may attach by an adhesive, snap-fit, friction fit, welding, or by any other suitable means or combination of means. FIG. 2B shows a chime 218 with multiple feet 220. FIGS. 2C-2F show different views of a chime 247 according to another embodiment of the present disclosure. In some cases the system 100 of the present disclosure may be made for a single use, whereas in other embodiments, the system 100 of the present disclosure may be reusable. In still other embodiments, some portion of the system 100 (including the system, chime, or both) may be reusable, while other portions may be made for a one-time use. For example, the chime in some embodiments may have connecting features that allow the chime to be removable, such as snap, or twist features, for example, so that the chime may be removed from the overpack and the liner to be reusable, while the liner and overpack may be configured for a one-time use.

Liner-based systems of the present disclosure, in some embodiments, may be blow molded in a nested fashion, also referred to as co-blow molded. Accordingly, the liner and the overpack may be blow-molded at generally the same time, with the liner preform nested within the overpack preform, as will be discussed below.

The liner can be manufactured using any suitable blow molding manufacturing process, such as injection blow molding, injection stretch blow molding, etc. A manufacturing process utilizing blow molding can allow for liners to have more accurate shapes than other manufacturing processes. In some embodiments, the liner and overpack may be co-blow molded using nested blow molding techniques. The co-blow molding process according to some embodiments described herein generally forms an integrated system comprising an overpack and a liner, the overpack and the liner forming an interface where the liner walls join, abut, or otherwise interface or be proximate one another.

Figure 3B:
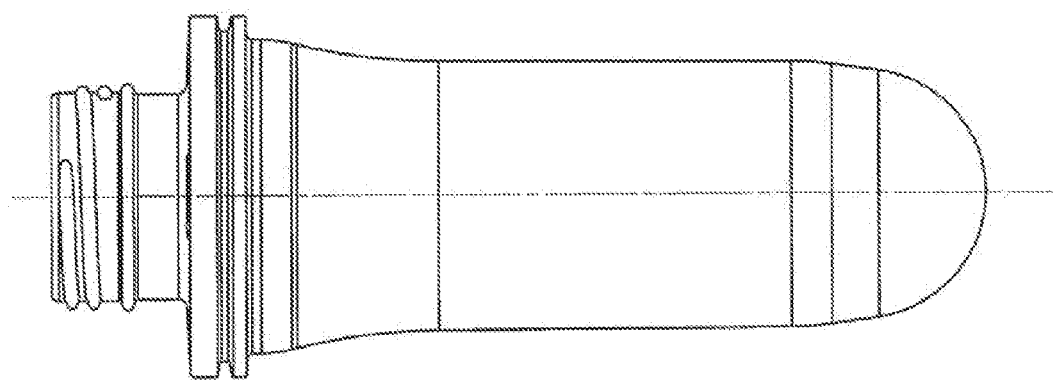
FIG. 3B shows a perspective view of the nested preforms of FIG. 4A.
Figure 3A:
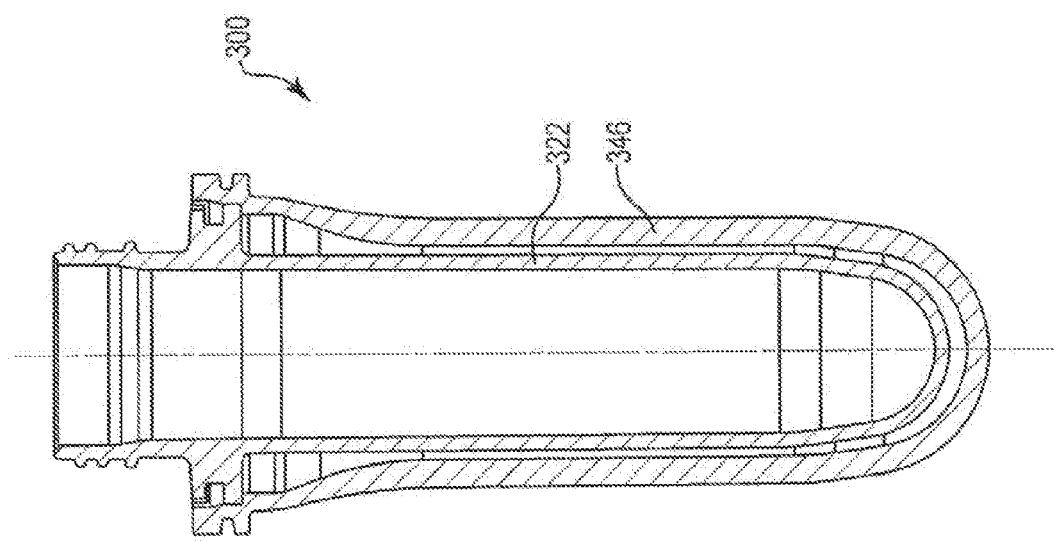
FIG. 3A shows a cross-sectional view of nested preforms, according to one embodiment of the present disclosure.

FIG. 3A shows a cross-sectional view of a liner preform 322 nested inside of an overpack preform 346. FIG. 3B shows an outer side view of a liner preform nested inside of an overpack preform.

In one embodiment, the material comprising the liner may be the same as the material comprising the overpack. In another embodiment, however, the material comprising the liner may be different from the material comprising the overpack. For example, in one embodiment, the liner may be comprised of PEN, while the overpack may be comprised of PET or PBN, for example. In other embodiments, the liner and overpack may be comprised of any suitable same or different materials, as described herein.

In some embodiments, one or both of the liner and overpack preform may include various additives to enhance certain properties of the liner and/or overpack. For example, in some embodiments an ultra-violet blocking and/or an energy-absorbing and/or energy releasing additive may be provided to the preform material. Further, in some embodiments the overpack and/or liner may include a color additive, for example, but not limited to a liner and/or overpack that has an amberish hue. It will be recognized, however, that the liner and overpack may be any color or may be clear. In some embodiments, the overpack may have a different color than the liner, while in other embodiments, the overpack and the liner may have the same color.

Figure 4:
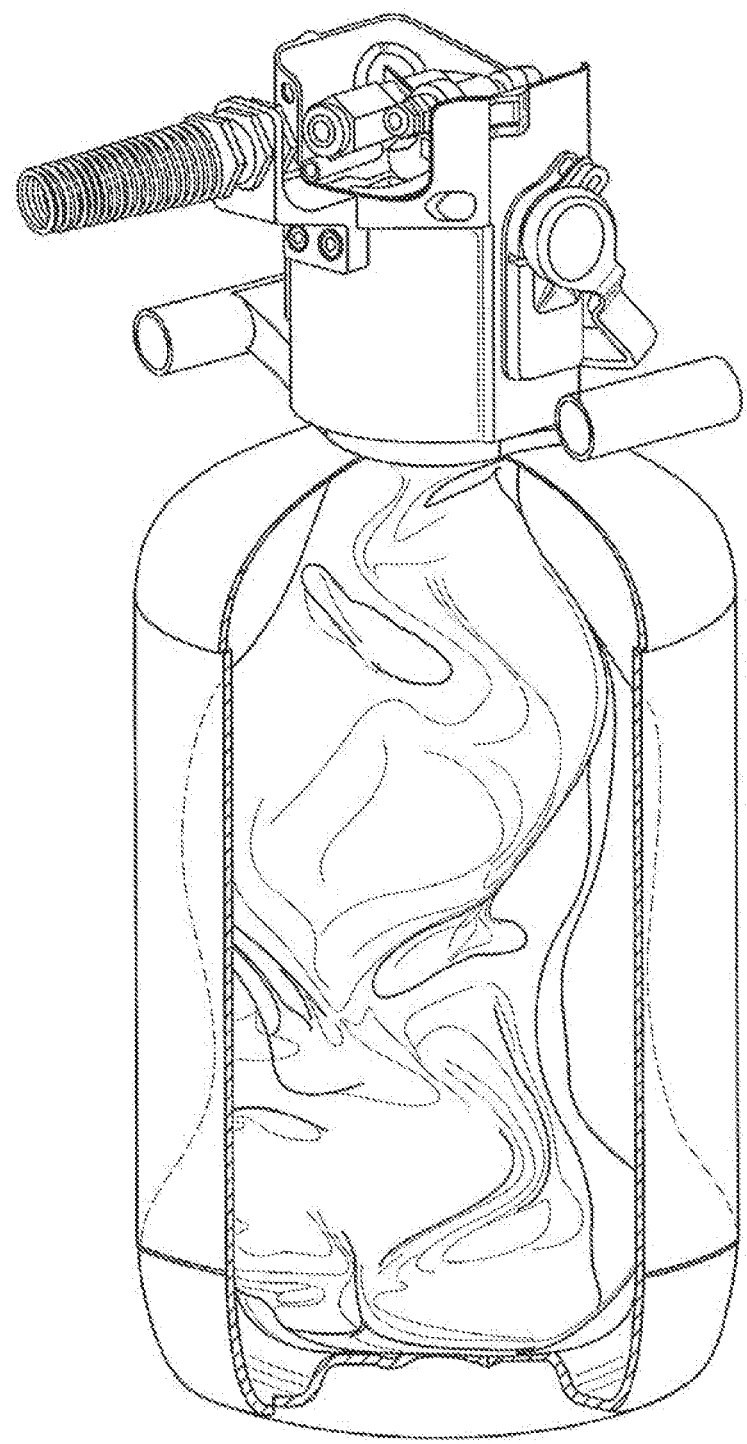
FIG. 4 is a cross-sectional view of a liner collapsing under pressure dispense in accordance to one embodiment of the present disclosure.
Figure 5A:
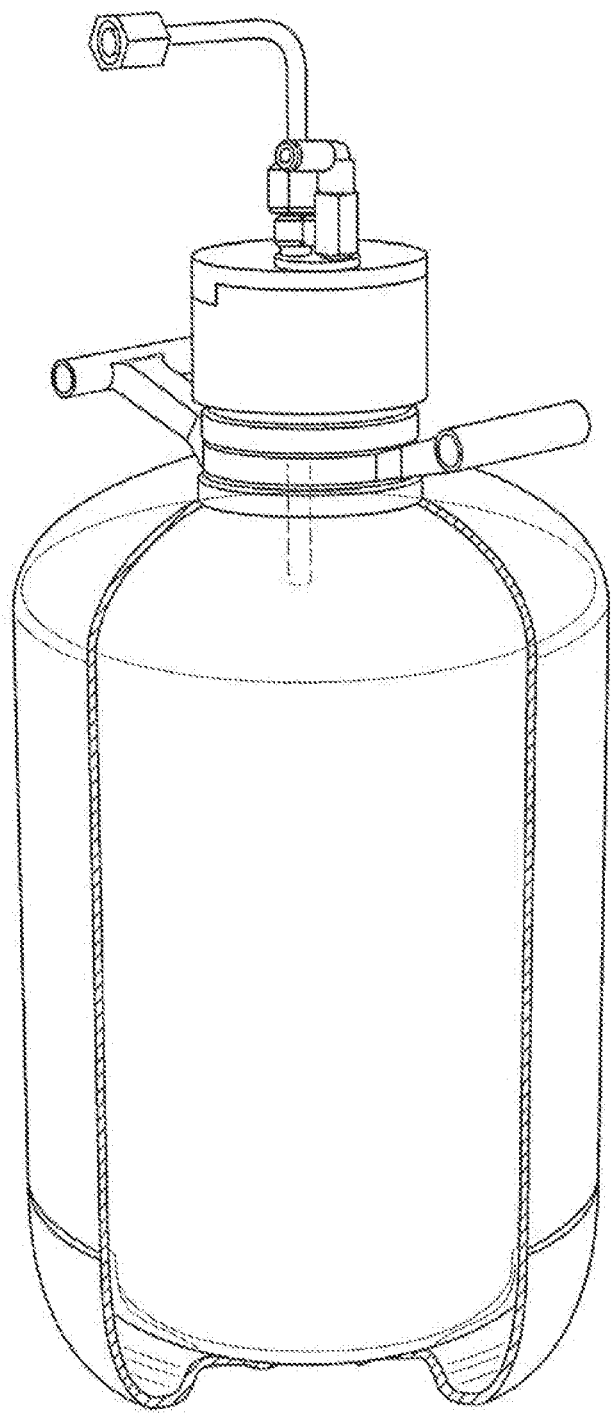
FIGS. 5A-5D show a liner of a liner-based system of the present disclosure being dispensed by pump dispense, in accordance with one embodiment of the present disclosure.
Figure 5B:
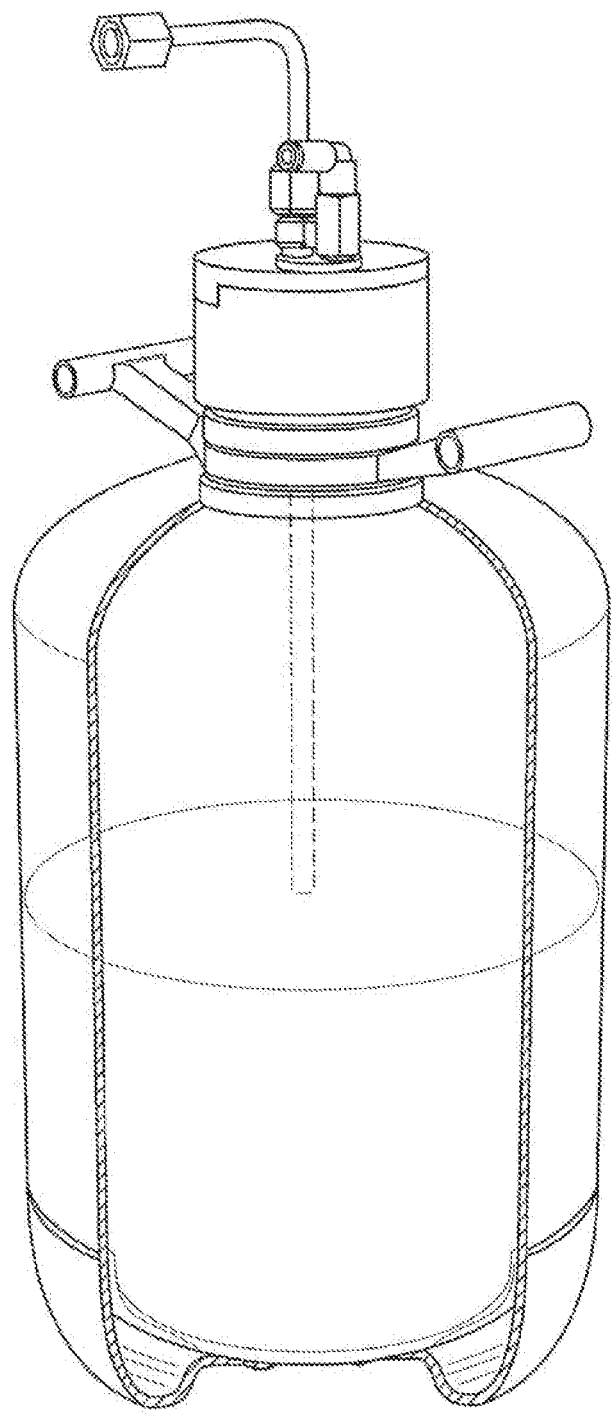
Figure 5C:
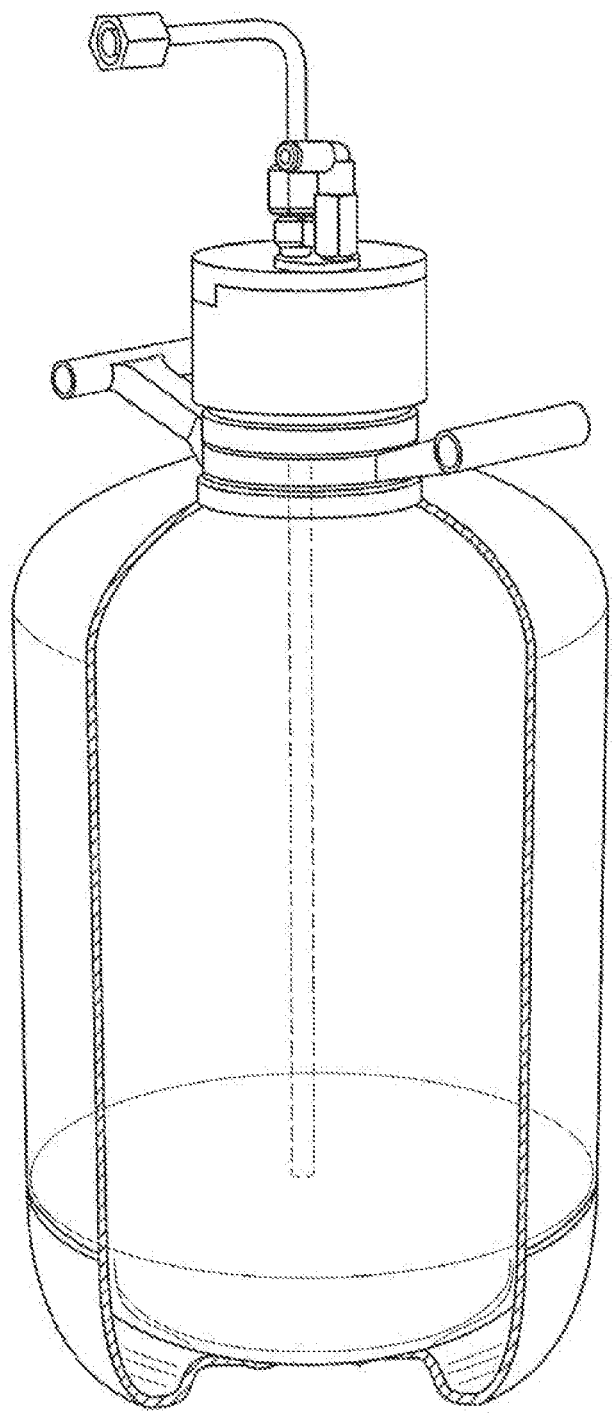
Figure 5D:
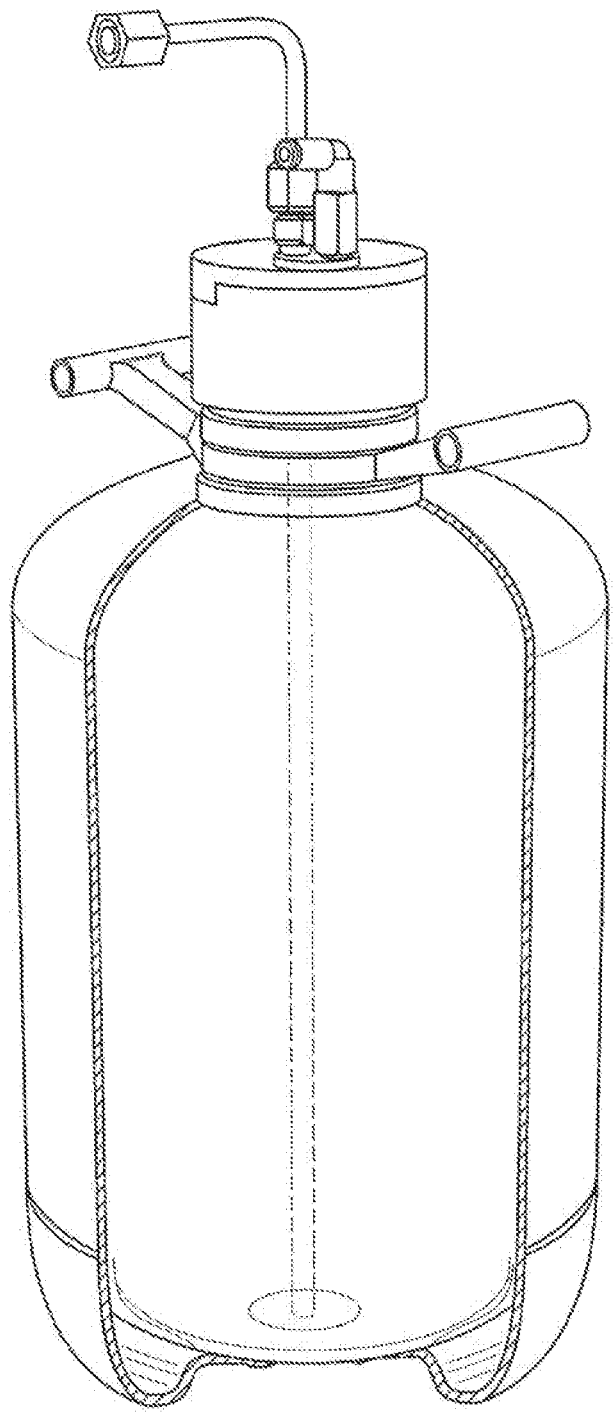

As stated above, in some embodiments of the present disclosure the materials contained in the liner-based assembly of the present disclosure may be dispensed by any suitable means. FIG. 4 shows a rigid collapsible liner of a liner based system of the present disclosure being collapsed under pressure dispense, according to one embodiment. FIGS. 5A-5D show a liner-based system of the present disclosure in a pump dispense configuration during the process of pump dispense, according to one embodiment. Particularly, FIG. 5A shows a full liner that may be ready to be dispensed by pump dispense. FIG. 5B shows a liner that is half-full due to the contents being dispensed by pump. FIG. 5C shows a liner that is nearly empty and FIG. 5D shows an empty liner dispensed by pump dispense, according to one embodiment of the present disclosure. In FIGS. 4-5D, a section of the overpack has been shown in cut out for purposes of illustration.

In some embodiments, connectors may be used with a rigid collapsible liner to facilitate filling and dispense, as well as to secure the contents of the liner from air and other contaminants during storage. As such, the liner and/or overpack may be adapted to couple with one or more caps and/or connectors and/or connector assemblies. Any suitable connection means is possible, such as for example, threads on a cap and/or connector that are complementary to threads on the fitment of the liner and/or the mouth of the overpack for example, or connecting means may comprise snap fit, friction fit, or any other suitable means. Caps and closures may be used for storage and/or shipping and/or additional protection for keeping contaminants out of the contents of the liner, while connectors may be used with embodiments of the present disclosure for filling the liner and/or dispensing the contents of the liner. Examples of some of the types of caps and/or connectors that may be used with embodiments of the present disclosure are provided in U.S. Patent Application No. 61/538,509, titled, "Substantially Rigid Collapsible Liner, Container and/or Liner for Replacing Glass Bottles, and Flexible Gusseted or Non-Gusseted Liners," filed Sep. 23, 2011; U.S. Provisional Patent Application No. 61/438,338, titled, "Connectors for Liner-Based Dispense Containers," filed Feb. 1, 2011; U.S. Pat. Appl. No. 61/299,427, titled "Closure/Connector for Dispense Containers," which was filed on Jan. 29, 2010, each of which is hereby incorporated herein by reference in its entirety.

Figure 6A:
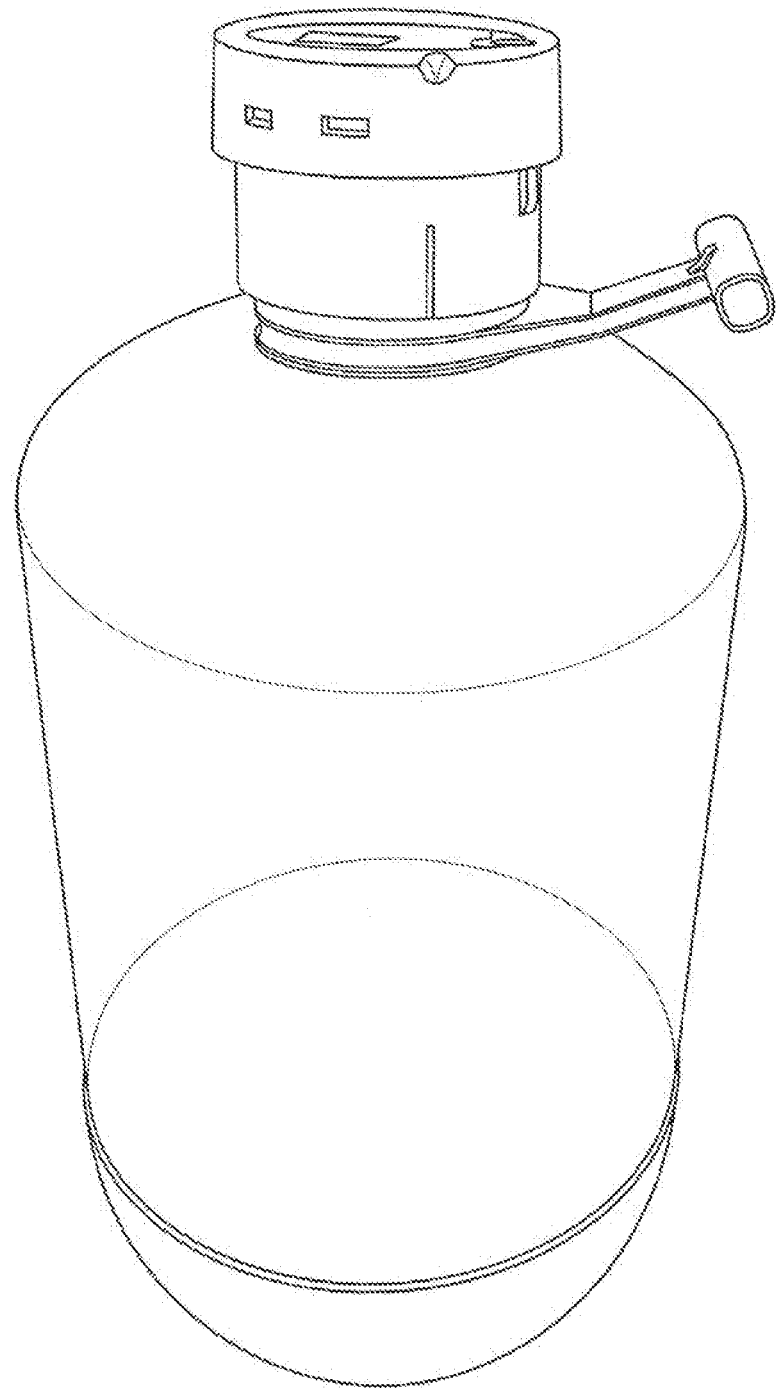
FIGS. 6A-6C show perspective views of the liner-based system of the present disclosure according to some embodiments, wherein the liner-based system had different caps and/or connectors attached.
Figure 6B:
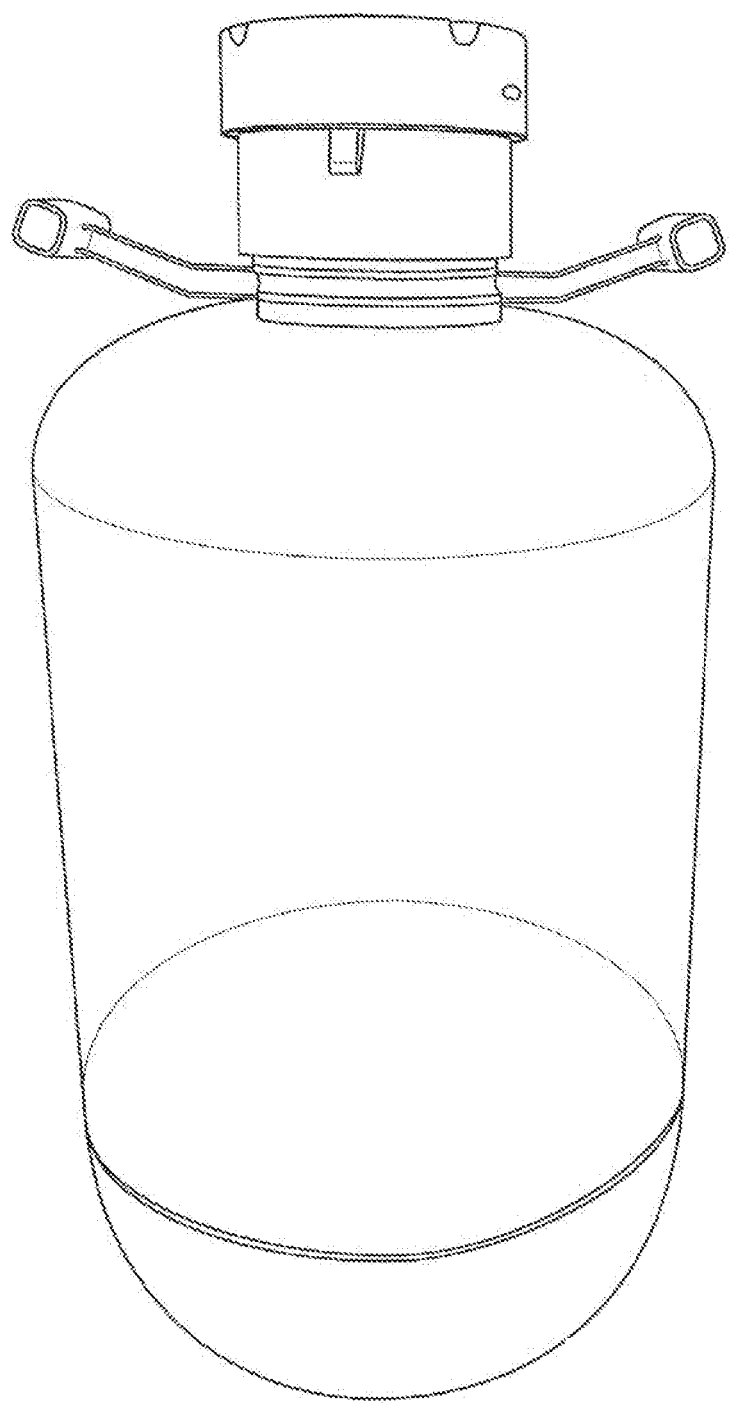
Figure 6C:
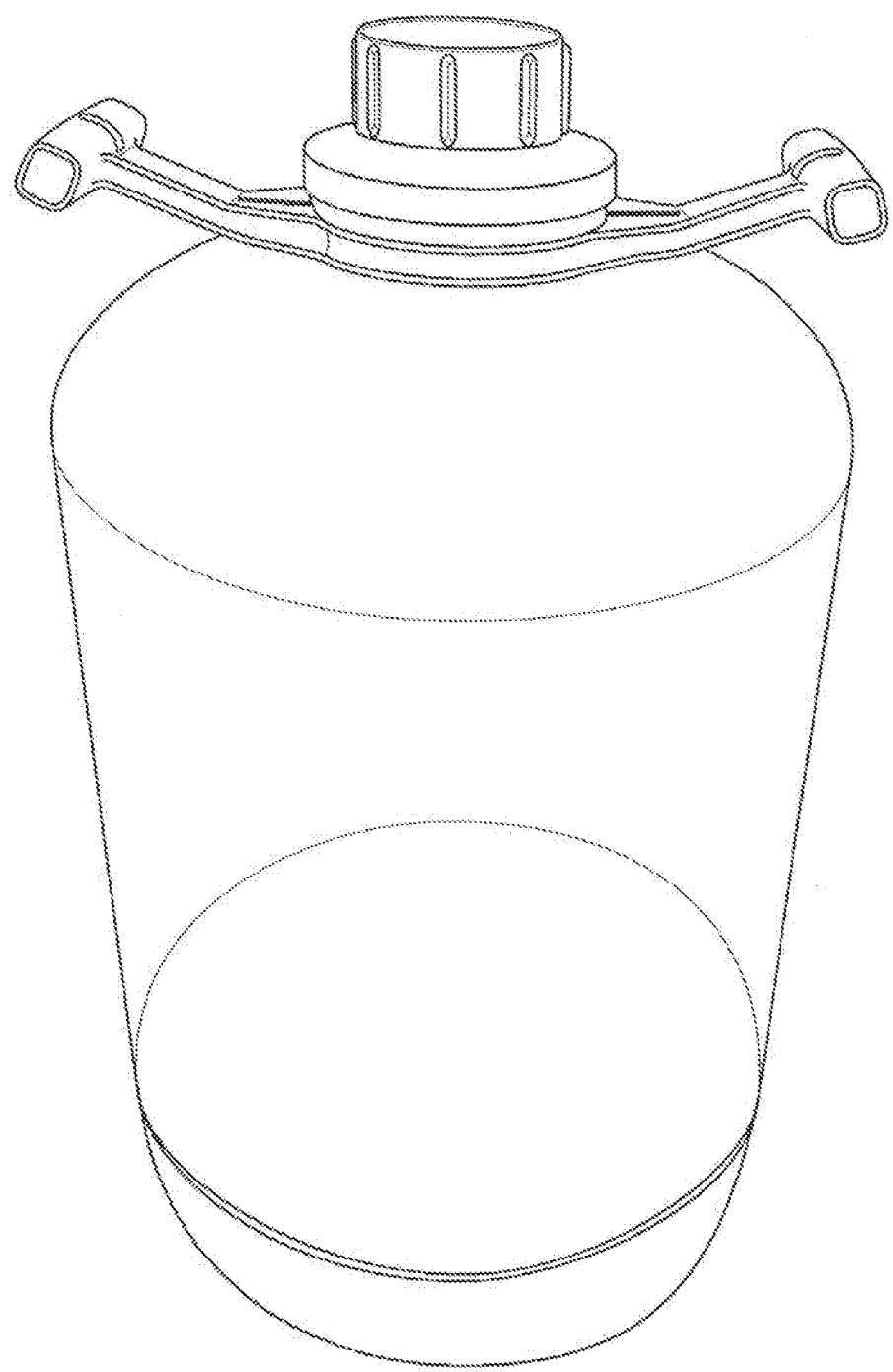

FIGS. 6A-C show liner-based systems of the present disclosure according to some embodiments, wherein the liner-based systems have different caps and/or connectors and handles attached thereto.

In some embodiments, features may be incorporated into the system that may help facilitate movement of pressurized air in the annular space and may thereby also decrease the likelihood of pin holes. Pin holing may occur during dispense, such as during pressure dispense or pressure assisted pump dispense. This undesirable outcome may result if the gas introduced during pressure dispense (indirect or pressure assisted pump dispense) is not able to move freely in the annular space.

Figure 7A:
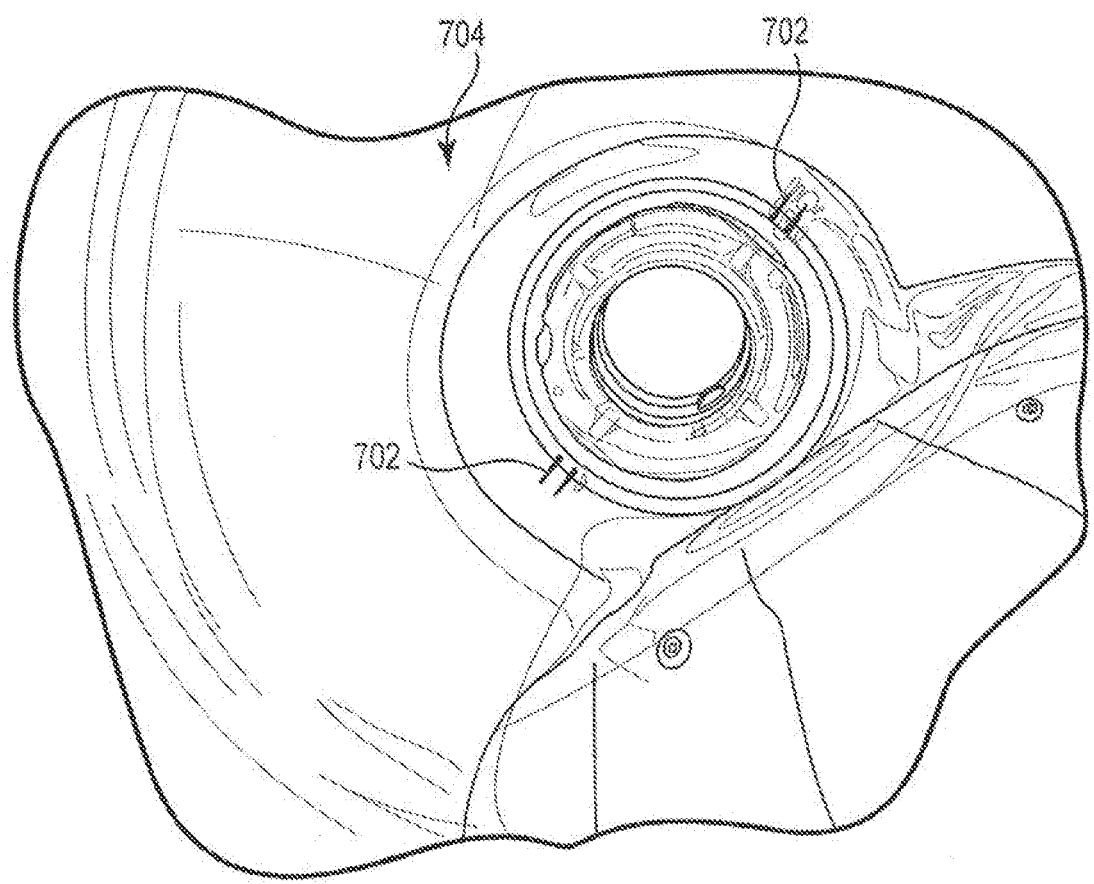
FIG. 7A shows a view of looking from the bottom inside of an overpack to the top of the overpack, according to one embodiment of the present disclosure.
Figure 7B:
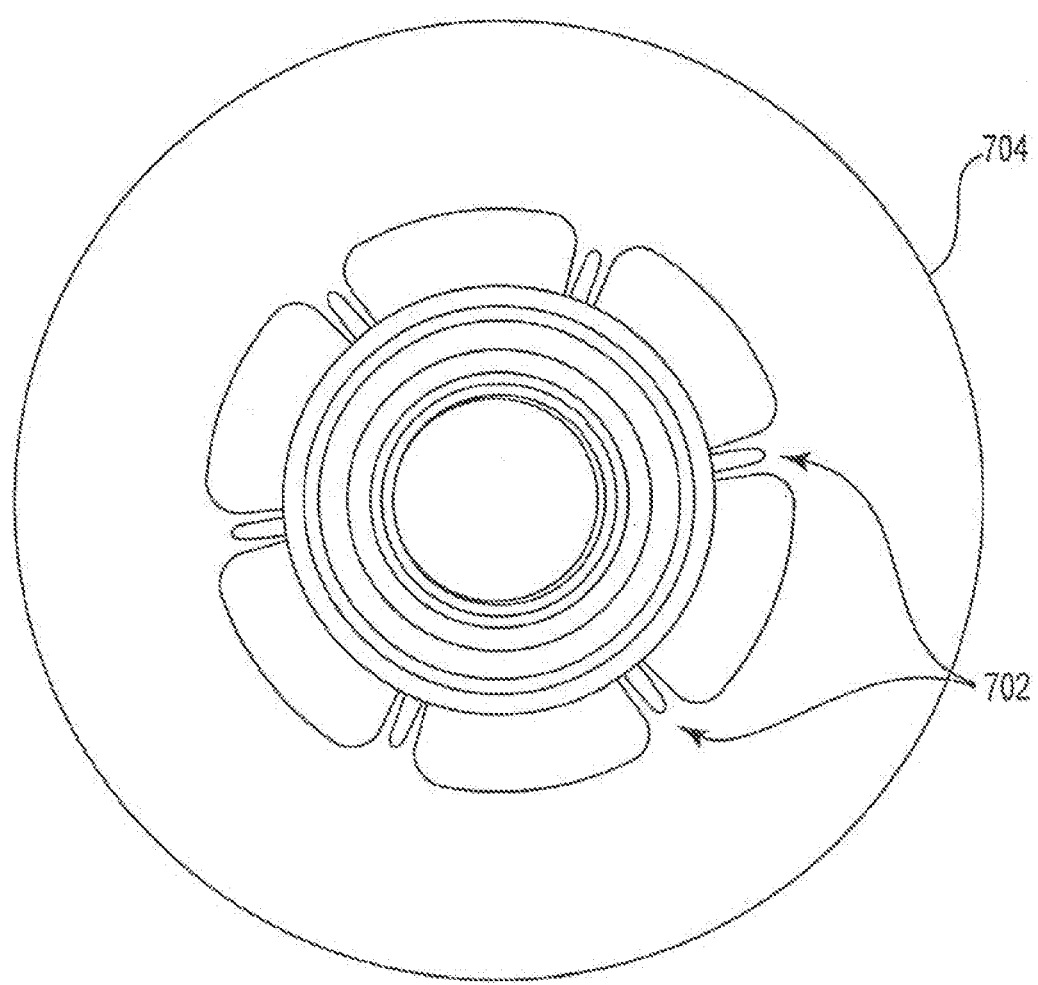
FIG. 7B is a top view of a liner-based system with air channels according to one embodiment of the present disclosure.

FIG. 7A shows a view from inside an overpack looking from the bottom of the overpack up to the top of the overpack. In some embodiments of co-blow molded liner and overpack systems, one or more air channels 702 may be provided between the liner and overpack, for example near the top of the liner and overpack 704, to permit easier and/or more even flow of gas or air into the annular space between the liner and overpack. The air channels may be provided, such as integrally provided, on the liner or the overpack, or both. FIG. 7B shows a top view of an overpack 704 with liner illustrating one embodiment of air channels 702 formed between the liner and overpack. In some embodiments, the air channels 702 may be designed to keep the liner from making complete contact with the overpack at the location of the air channels. The air channels may allow the gas or air that can be introduced during pressure dispense or pressure assisted pump dispense to flow more easily and/or more evenly throughout the annular space between the overpack and liner, thereby eliminating or reducing the occurrence of pin holes. Any number of air channels may be provided, such as but not limited to, from 2-12 air channels; of course, it is recognized that any fewer or greater suitable number of air channels may be provided. Further, the air channels may have any suitable geometry and may be disposed at any suitable place on the overpack. The air channels 702 may be formed from the same material as the overpack in some embodiments, and may protrude from the walls of the overpack, such that the liner may be kept a certain distance from the overpack walls in the area with air channels, thereby allowing gas to flow more freely into the annular space. In some embodiments, the overpack preform may be configured to create the one or more air channels 702. For example, the air channels may be formed by wedge-like protrusions made in the overpack preform. In another embodiment, one or more air channels 702 may be affixed to the overpack after the overpack is formed. In such embodiments, the air channels may be comprised of the same material or any suitable different material than the overpack.

Figure 7C:
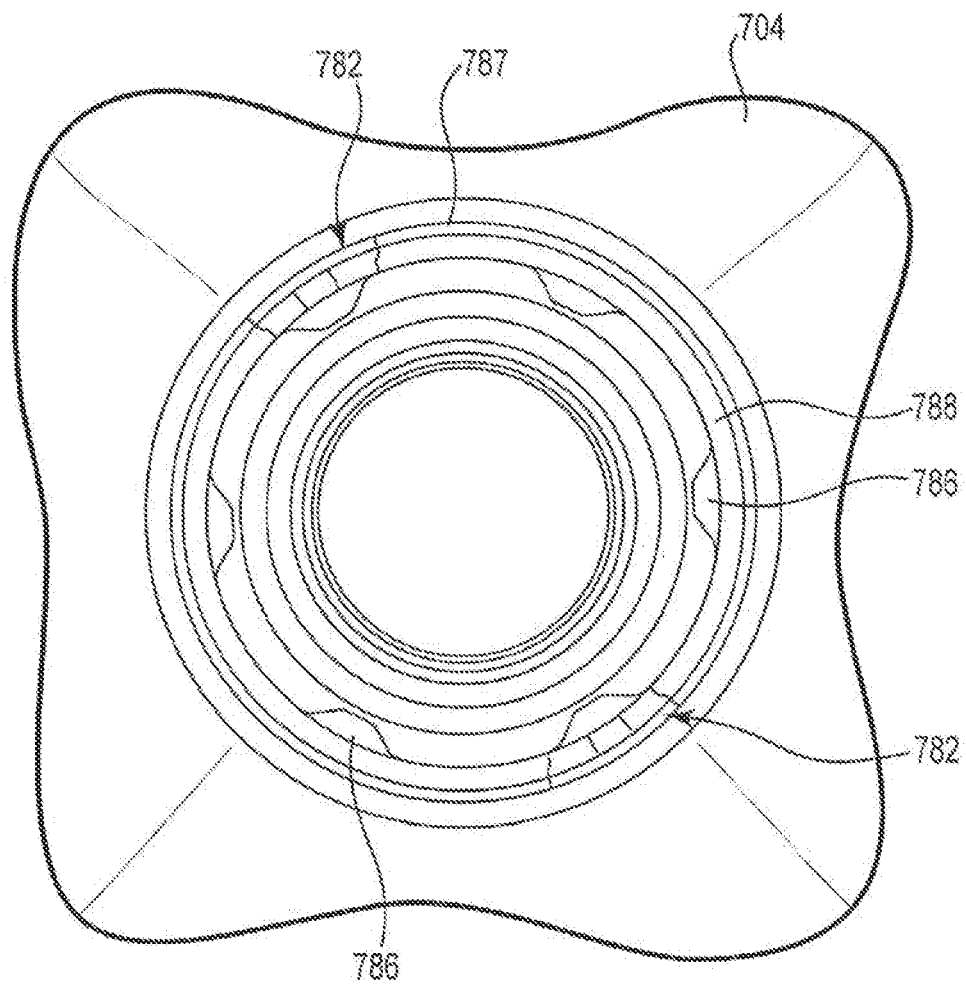
FIG. 7C is a top view of a liner-based system with support rings and air passages according to one embodiment of the present disclosure.
Figure 7D:
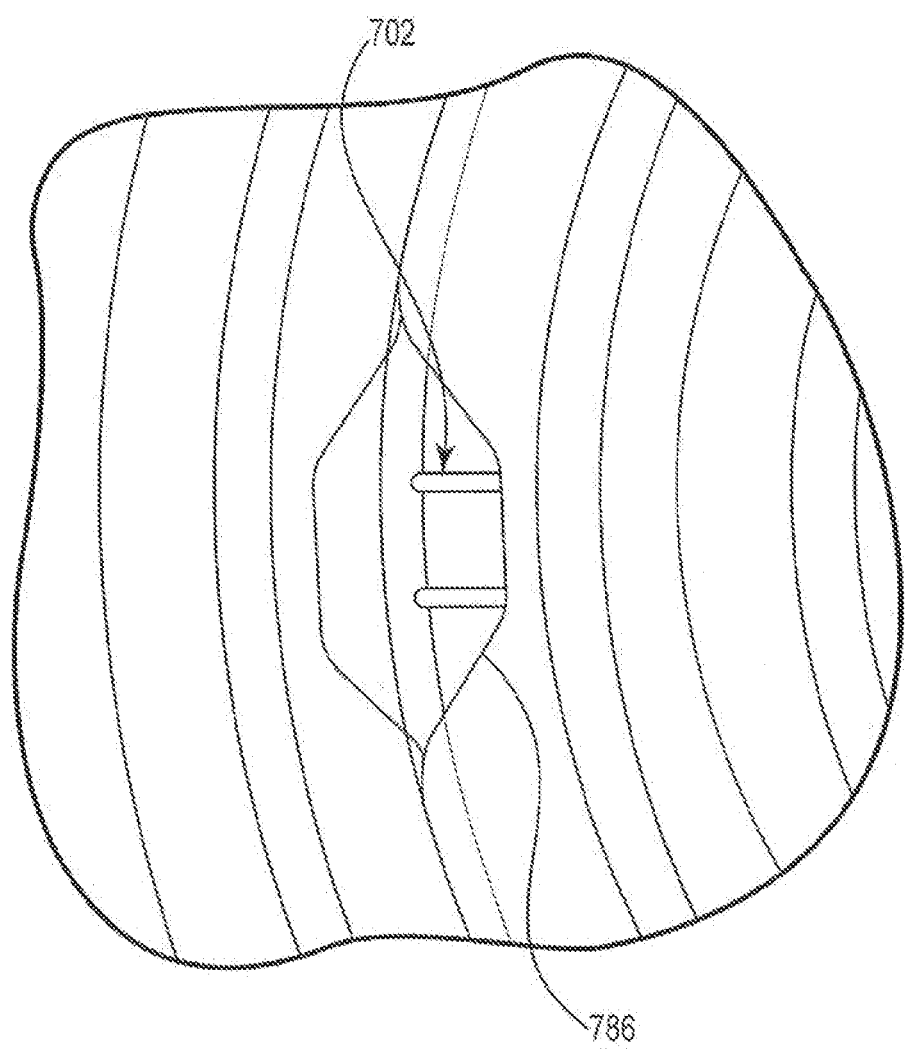
FIG. 7D is view of air channels in an overpack aligning with air passages in a support ring according to one embodiment of the present disclosure.

In one embodiment, as shown in FIG. 7C, air passages may also be provided in one or more support rings of the liner or overpack that permit gas or air from an external environment to pass to the air channels, discussed above, and then into the annular space between the overpack and liner. For example, a first support ring 787 may have one or more notches or air passages 782 permitting air flow through the first support ring from an external environment. In one embodiment, the air passages 782 may be circumferentially disposed on the first support ring 787 and may be generally rectangular in shape, as shown, or they may have any other suitable or desirable shape. In some embodiments, the air passages 782 may allow gas or air to flow from the environment of the outer neck area of the overpack 704 into an area between the first support ring 787 and a second support ring 788. The second support ring 788 may comprise one or more additional notches or air passages 786. The air passages 786 may be circumferentially disposed on the second support ring 788 and may be generally pyramidal in shape, as shown, or may have any other suitable or desirable shape. The air passages 786 in the second support ring 788 may allow gas or air to flow from the area between the first support ring 787 and the second support ring 788 into the air channels 702 in the top of the overpack 704 (illustrated in FIG. 74B, and described above). As shown in FIG. 7D, the air channels 702 in the overpack 704 may generally align with the air passages 786 in the second support ring 788, thereby allowing air to pass through the system into the annular space between the liner and the overpack. The one or more support rings may be comprised of any suitable material and may be formed in any suitable way, including being integral with the liner or overpack necks in some embodiments, or being affixed, welded, or otherwise coupled to the liner or overpack in other embodiments.

Figure 8:
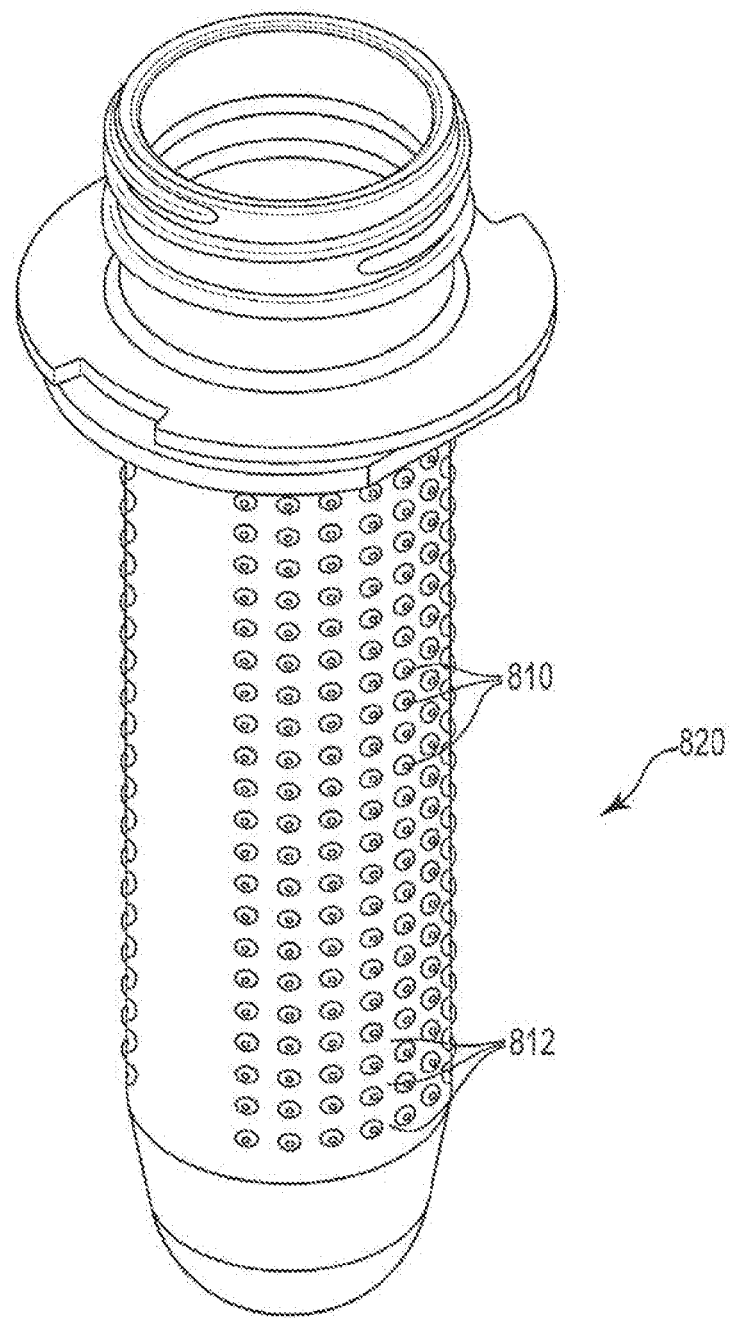
FIG. 8 is a perspective view of a preform according to one embodiment of the present disclosure.

In another embodiment, the ability for gas to flow through the annular space may be increased by including protrusions on the outside wall of a liner preform. As may be seen in FIG. 8, protrusions or recesses 810 may be provided on the liner preform 820, such that when the liner is formed, the liner has areas that protrude out from the liner wall and/or or dimples that create recesses in the liner wall. The varying protrusions and/or dimples and flush areas 812 may allow the gas to more freely move through the annular space during pressure dispense and/or keep the liner wall from adhering to the interior wall of the overpack. The geometry, pattern, and number of protrusions provided in the liner preform may include any suitable geometry, pattern or number.

Figure 9B:
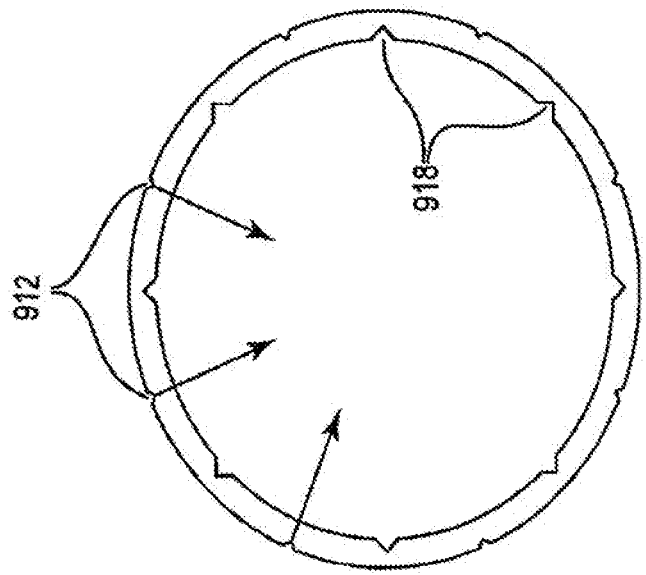
FIG. 9B is a cross-sectional end view of an embodiment of the preform shown in FIG. 9A, according to one embodiment of the present disclosure.
Figure 9A:
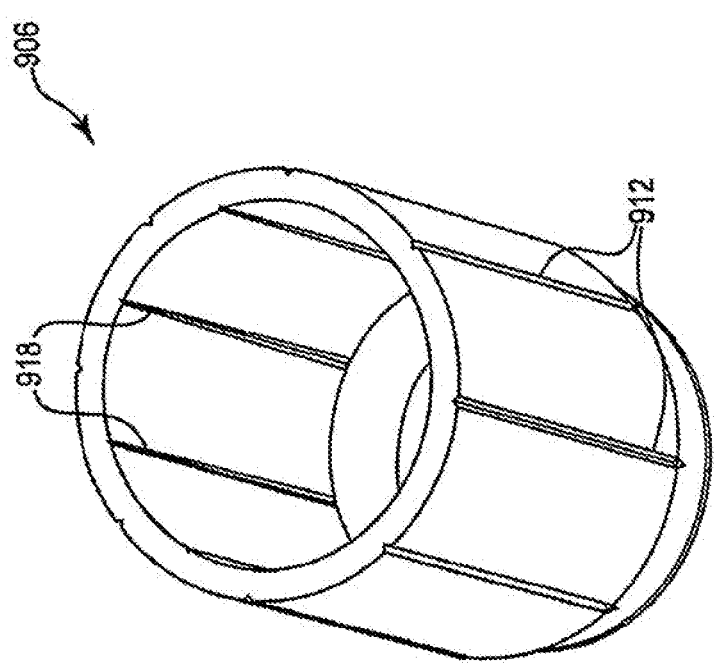
FIG. 9A is a perspective view of a preform according to another embodiment of the present disclosure.

In still other embodiments, the ability for gas to flow through the annular space may be increased by further controlling the manner in which the liner collapses during pressure dispense. Controlling the manner of collapse may advantageously keep the dispensing gas moving freely and/ or may aid in attaining a high level of dispense. As may be seen in FIG. 9A, in one embodiment, a liner preform 906 may include alternating indentations on the inside 918 of the liner preform and/or on the outside 912 of the liner preform. The indentations 918, 912 may be vertically disposed along the length of the liner walls, in some embodiments. The indentations 918, 912 may extend substantially the entire length of the liner or may extend any suitable shorter distance. Any suitable number of indentations 918, 912 may be provided. In some embodiments, for example, the same number of indentations may be provided on the inside 918 as on the outside 912 of the liner, whereas in other embodiments there may be more or less indentations on the inside 918 of the liner as on the outside 912 of the liner. The indentations may be spaced any suitable distance from one another, and may have any suitable shape. For example, an indentation may vary in thickness or may have a consistent thickness along the entire length of the indentation. The indentations may also curve in some embodiments, while in other embodiments the indentations may be substantially straight. As may be seen in FIG. 9B, a liner preform as shown in FIG. 9A, may generally collapse inward at the points where the outside indentations 912 are located. Generally, the indentations 918, 912 may act as hinges that control the way the liner collapses.

Figure 10B:
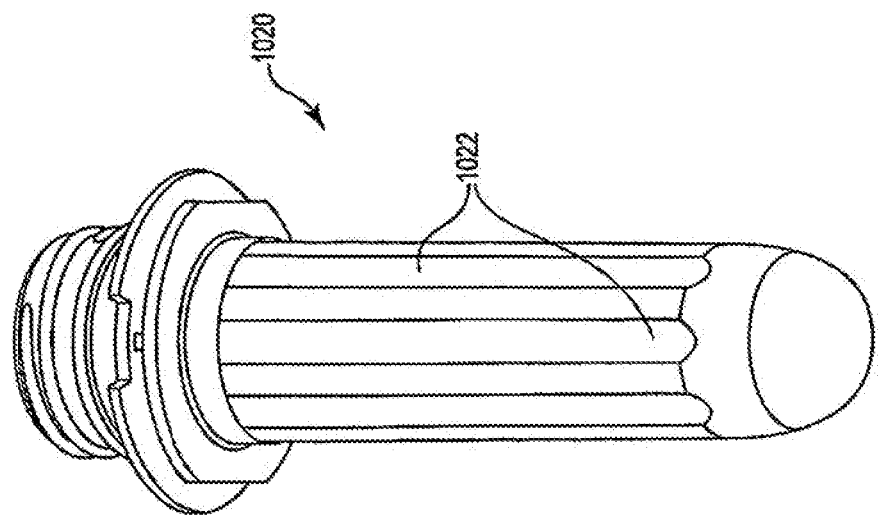
FIG. 10B is a perspective view of a preform according to one embodiment of the present disclosure.
Figure 10A:
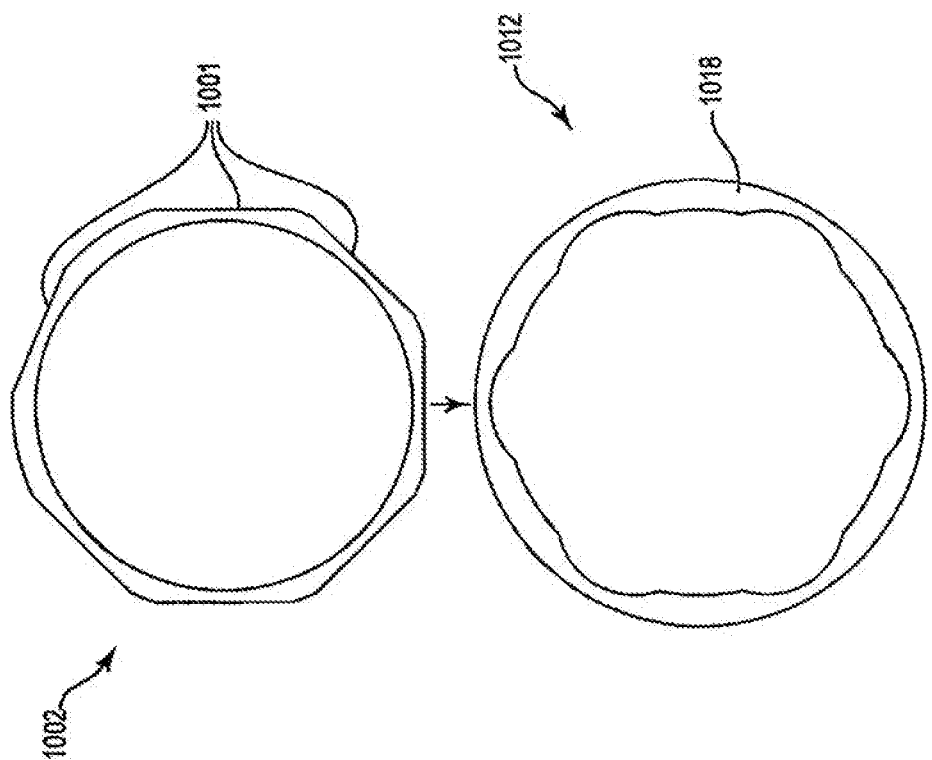
FIG. 10A is a cross sectional end view of a liner preform and a cross sectional end view of the expanded liner, according to one embodiment of the present disclosure.

In another embodiment shown in FIGS. 10A and 10B, panels may be formed in the liner preform in order to create relatively thinner areas that may help control the collapse of the liner. FIG. 10A shows a cross-sectional view of the geometry of the liner preform. As may be seen, a plurality of panels 1001 may be formed in the outside wall of the liner preform 1002. Any suitable number of panels 1001 may be provided. Further, the panels 1001 may be separated from one another any suitable distance, including varying distances from one another. For example, each panel 1001 may be the same distance away from the panel next to it. In other embodiments, however, the distance between neighboring panels may be different. The panels may have any suitable thickness. In some embodiments, the panels may each have the same thickness, while in other embodiments, some or each of the panels may have a different thickness. The panels 1001 may be areas that are thinner than areas of the preform that do not have panels. When the liner is formed to its expanded state 1012, the resulting liner wall 1018 may have areas of thickness that vary, based on which areas included panels and which did not. For example, the liner wall 1018 may be relatively thinner in panel areas than in non-panel areas of the original preform. FIG. 10B shows a perspective view of an embodiment of a preform 1020 with such panels 1022. During pressure dispense, the thinner areas of the liner may tend to collapse inward first, which may allow for a greater amount of material to be dispensed from the liner and/or may allow the gas to flow more freely through the annular space during dispense.

In some embodiments, the rigid collapsible liner may include other features that may help control when and under what circumstances the liner may collapse. As discussed above, in some embodiments of the present disclosure a liner may be configured to collapse inside of an overpack when a gas or liquid is introduced into the annular space between the liner and the overpack, for example. The collapse of the liner generally forces the contents of the liner out of the liner for dispense. While the liner is intended to collapse during dispense, in some cases the liner may desirably be predisposed against collapsing prior to dispense. For example, when the liner is filled with material and sealed within the overpack at a first temperature and the temperature of the overall system is subsequently lowered, the resulting pressure difference, if significant enough, may cause the liner to undesirably dimple or collapse. For example, if the liner-based system is filled with material at 298.degree. K and the temperature is subsequently lowered to 258.degree. K, there will be a resulting pressure drop inside of the liner-based system. Such a change in pressure may be sufficient to cause the walls to distort or "dimple." Accordingly, in some embodiments the liner may be configured to include features that may make the liner generally resistant to this type of non-dispense related collapse or distortion.

Figure 11B:
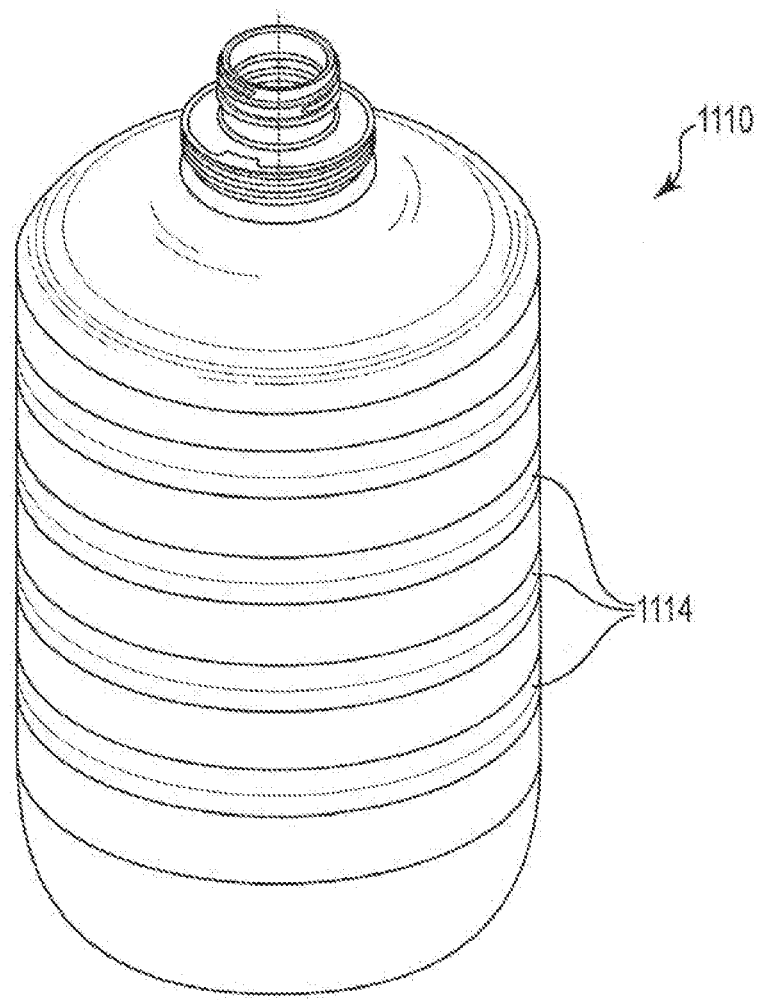
FIG. 11B is a perspective view of a liner-based system including surface features according to another embodiment of the present disclosure.

As may be seen in FIG. 11A, in one embodiment, a liner-based system 1102 comprising a liner and an overpack may have a plurality of grooves or other indentation or protrusion pattern 1104. The grooves 1104 may help maintain the structure of a liner prior to dispense, in the event of a pressure differential caused by, for example but not limited to a change in temperature. As may be seen, in some embodiments, the grooves 1104 may be vertically disposed. The grooves 1104 may extend generally any suitable length along the liner and overpack walls. Further, the grooves 1104 may have any suitable width. In some embodiments, the plurality of grooves 1104 may all have the same height and/or width, while in other embodiments, the grooves may have different heights and/or widths. Any suitable number of grooves 1104 may be disposed on the liner and the overpack walls, spaced any suitable distance apart. The one or more grooves may protrude or indent any suitable amount. For example, in some embodiments the grooves may indent about 1.5 mm. In some embodiments, the grooves may be relatively shallow to minimize loss of internal volume. In another embodiment shown in FIG. 11B, the grooves 1114 may be horizontally disposed. The horizontal grooves 1114 may have any suitable thickness. Further, there may be any suitable number of horizontal grooves 1114 disposed along the walls of the liner and overpack. The horizontal grooves 1114 may extend around the entire circumference of the liner and overpack in some embodiments, while in other embodiments one or more of the grooves 1114 may extend less than the entire circumference of the liner and overpack.

In still other embodiments, other surface features may help reduce or eliminate liner and/or overpack distortion resulting, for example, from a change in temperature. In some embodiments, a liner-based system may include a plurality of geometric indentations or protrusions. For example, as may be seen in FIG. 11C, a plurality of substantially rectangular indentations 1144 may be provided. While generally rectangular shaped features are shown, it will be understood that the features may have any suitable geometry or combination of geometries. For example, the features may be generally circular, hexagonal, oblong, or any other suitable shape. Similarly, the geometric shape or shapes (in cases where a pattern comprises more than one shape) may be arranged in any suitable pattern, including a substantially random pattern. In some embodiments, the surface features may protrude as opposed to indent. In still other embodiments, some surface features may protrude and other surface features may indent. The plurality of surface features may protrude and/or indent any suitable distance.

Figure 11C:
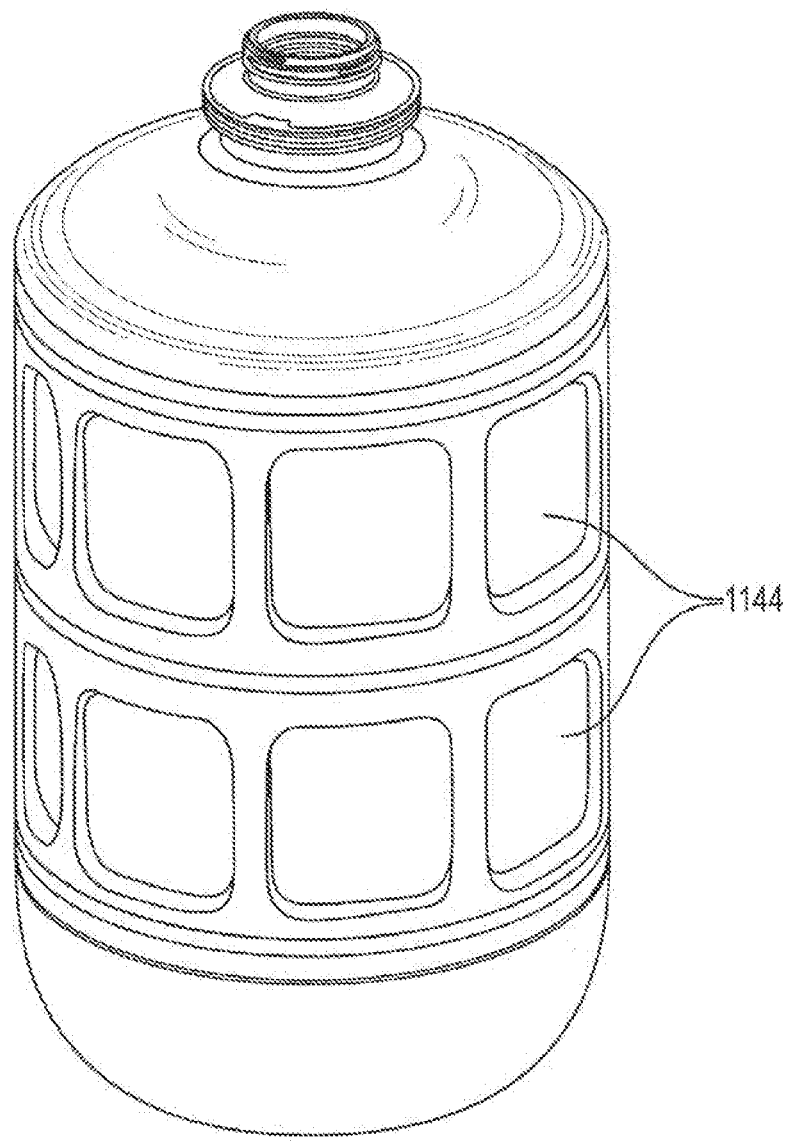
FIG. 11C is a perspective view of a liner-based system including surface features according to another embodiment of the present disclosure.

In some embodiments, surface features may be similar to those as discussed with respect to FIG. 11C, but may include edges that are generally less defined than those shown therein. For example, the edging that may define a surface feature, such as but not limited to a generally rectangular panel as shown in FIG. 11C, may be substantially more shallow, thereby generally blurring, obscuring, or making more vague the line between the indented (or in other embodiments, protruded) surface feature, and the remainder of the overpack wall. Generally lessening the definiteness of the surface-defining edging may lessen the likelihood that the liner will stick to the overpack during dispense, and/or during any non-dispense contraction caused by temperature change, as discussed above.

Figure 15:
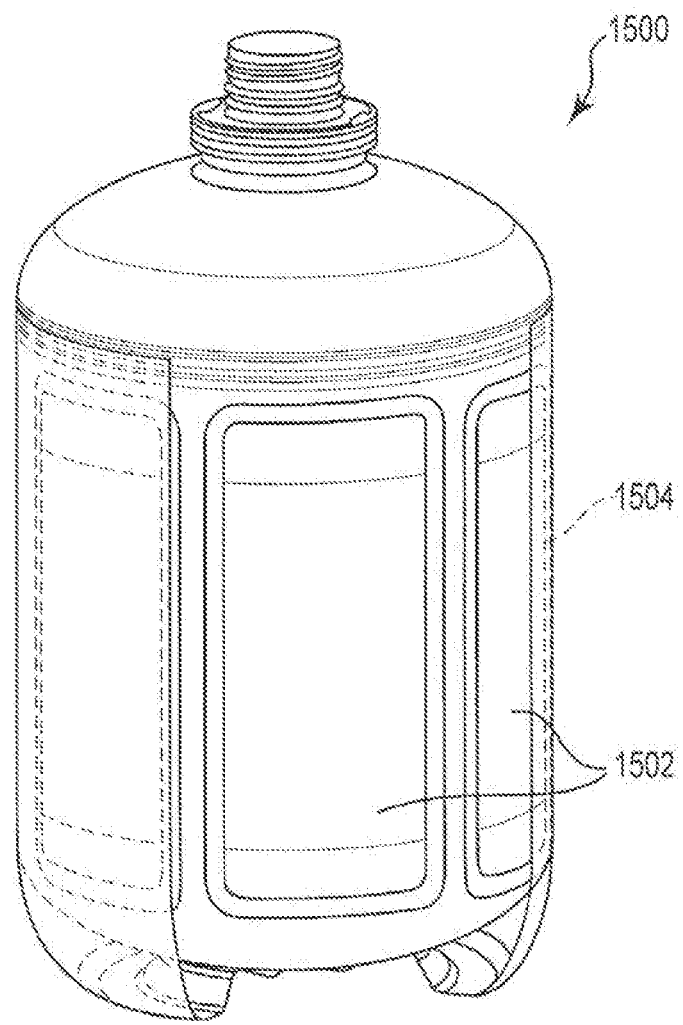
FIG. 15 shows a liner-based system of the present disclosure including surface features according to yet another embodiment of the present disclosure.

As may be seen in FIG. 15, one embodiment of a liner-based system containing surface features may include one or more surface features or panels having a generally rectangular shaped design. Panels may deform reversibly to compensate liner dimpling during temperature change. For example, as may be seen in FIG. 15, six generally rectangular shaped panels 1502 may be vertically disposed along the circumference of the liner and/or overpack walls; however, any other number of panels may be suitably used. As described above, the panels may be symmetrical, each have substantially the same size and shape as the other panels, or in other embodiments, one or more panels may be differently sized and shaped than one or more other panels. For example, one panel may be rigid to provide a space for affixing a label. Also as provided above, the boundary edge that defines a panel 1502 may have any suitable thickness and/or definition, including a shallow depth or a more defined and/or greater depth. In some embodiments, the edging depth may be generally the same for each panel and/or for the entire perimeter of a single panel, while in other embodiments the depth may vary from panel to panel or from one position along the perimeter to another position along the perimeter of the same panel. While the six-panel design is described and shown as a generally rectangularly shaped panels 1502, it will be understood that any suitable or desirable geometry is contemplated and within the spirit and scope of the present disclosure. Further, it will be understood that any suitable number of panels, spaced any suitable distance from one another is contemplated and within the spirit and scope of the present disclosure. Generally, surface features such as one or more panels may add strength and/or rigidity to the liner and/or overpack. However, in some embodiments, as previously described, a more shallow edging may also keep the liner from sticking to the overpack.

In some embodiments, the thickness of the walls of the overpack and/or liner may help or may also help prevent undesirable dimpling. For example, in some embodiments the wall thickness of the overpack may be from about 1 to about 3 mm to help prevent temperature related wall distortion.

The surface features shown in FIGS. 11A, B, and C, and FIG. 15 may be formed as described generally above by nested co-blow molding. For example, in some embodiments, the liner and the overpack, once co-blow molded, will have substantially the same form, including substantially the same number and placement of grooves, in accord with the co-blow molding process described above. In still other embodiments, the surface features may only be provided on the liner and not on the overpack, while in still other embodiments, the surface features may only be provided on the overpack and not the liner.

In some cases, a label may desirably be affixed to the outside of a liner-based system. In liner-based systems that include external surface features as have been described herein, a sleeve may be provided over the overpack so as to provide a smooth surface to which the label may adhere. The sleeve may be made of any suitable material, such as plastic, paper, or any other material or combination of materials. The sleeve may completely surround the overpack in some embodiments, while in other embodiments the sleeve may only partially surround the overpack. In some embodiments, including additional or alternative embodiments, shrink wrap may be used on or around the liner-based system for labeling.

In some cases, a label may desirably be affixed to the outside of a liner-based system. In liner-based systems that include external surface features as have been described herein, a sleeve may be provided over the overpack so as to provide a smooth surface to which the label may adhere. The sleeve may completely surround the overpack in some embodiments, while in other embodiments the sleeve may only partially surround the overpack. In other embodiments, a sleeve may additionally or alternatively provide additional support for the overpack. The sleeve for the overpack may extend any suitable height, including substantially the entire height, or any suitable lesser height of the overpack. The additional support provided by the sleeve, may help the overpack resist deformation, particularly prior to pressurized dispense, for example. The sleeve may be substantially completely adhered to the overpack in some embodiments, while in other embodiments, the sleeve may only be secured to the overpack at one or more particular locations. The sleeve may be affixed to the liner or overpack by any suitable means, such as but not limited to adhesive or any other suitable means, or combination of means. The sleeve may be comprised of any suitable material or combination of materials, including, but not limited to, plastic, sturdy paper board, rubber, metal, glass, wood and/or any other suitable material. The sleeve may comprise one or more layers and may include one or more coatings.

Figure 16:
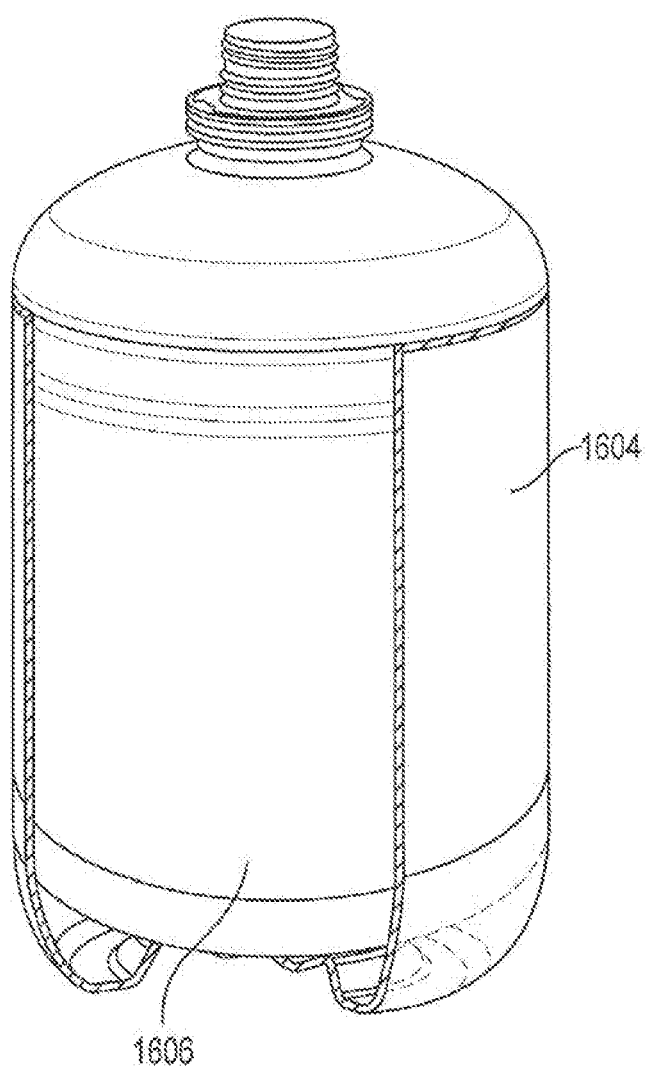
FIG. 16 shows a liner-based system of the present disclosure including a chime according to another embodiment of the present disclosure.
Figure 17B:
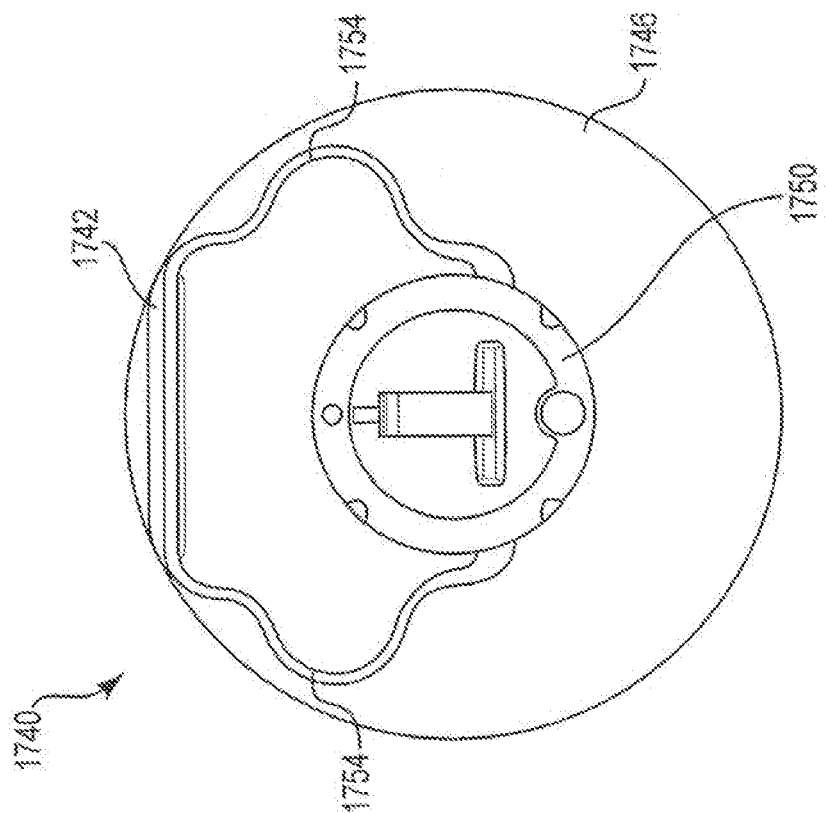
FIG. 17B shows another view of the embodiment shown in FIG. 17A.
Figure 17A:
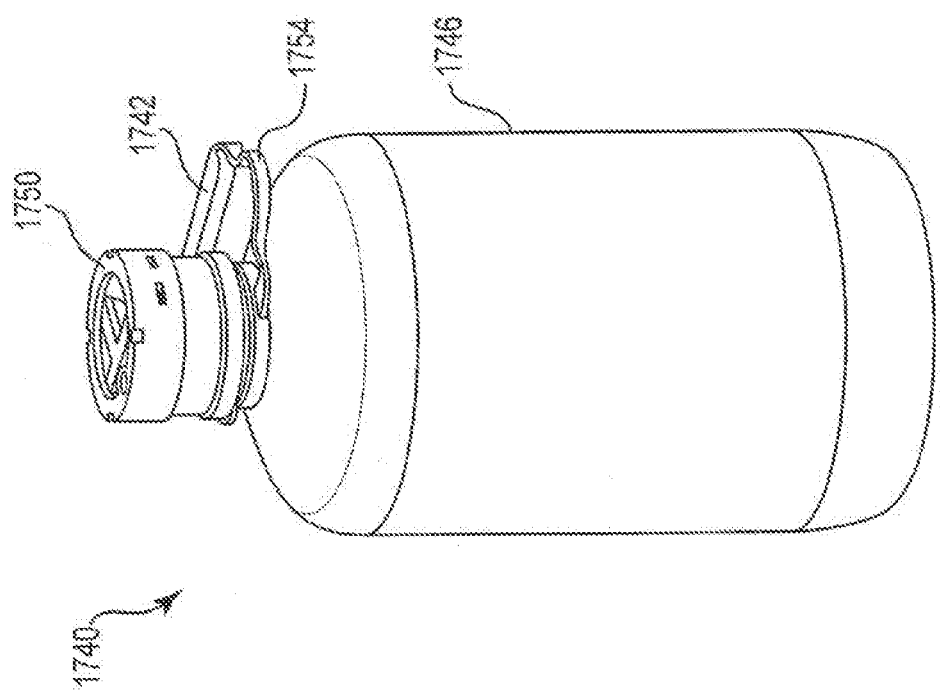
FIG. 17A shows a liner-based system of the present disclosure including a handle according to one embodiment of the present disclosure.
Figure 17C:
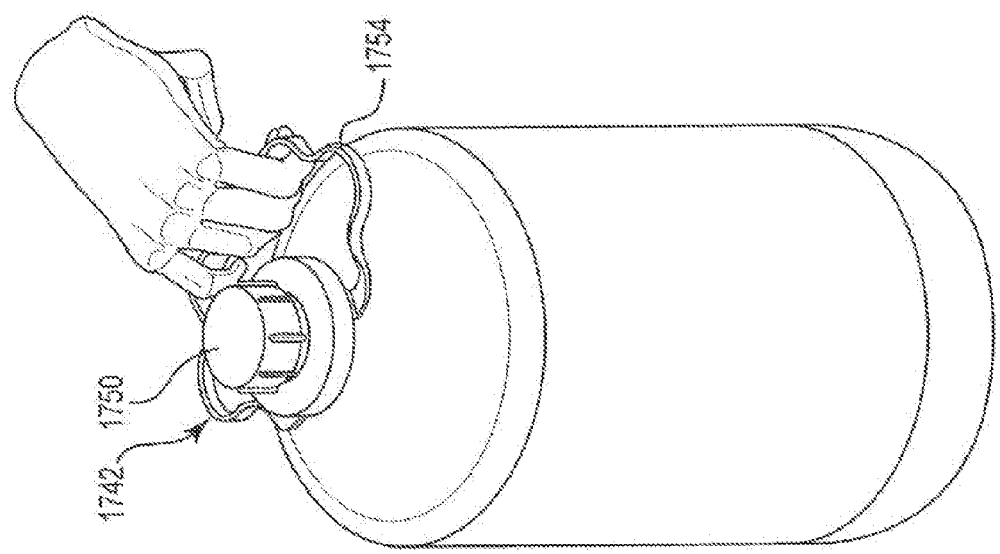
FIG. 17C shows the embodiment of FIGS. 17A and B, the handle being grasped.
Figure 17D:
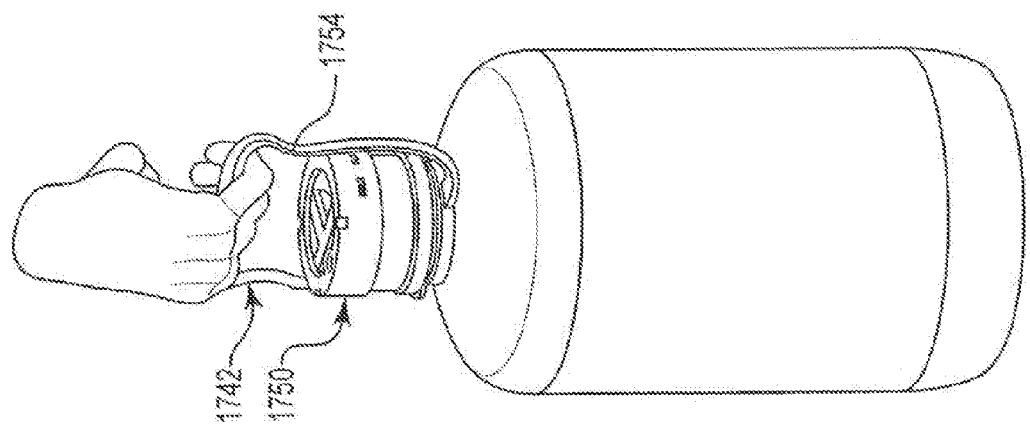
FIG. 17D shows the embodiment of FIGS. 17A-C with the handle being used to pick up the liner-based system

In other embodiments, a chime, similar to those shown in FIGS. 2A-F, may be used to provide a smooth generally rigid exterior surface for the liner-based system, which may hide any dimpling effects created by temperature changes, as discussed above, and/or may create a surface for labels and the like. However, in contrast to the chime shown in FIGS. 2A-F, which only covers a generally bottom portion of the liner-based system, a modified chime may cover a greater amount of the liner-based system. In some embodiments, the modified chime may extend generally the entire height of the liner-based system, while in other embodiments, the modified chime may extend any suitable lesser height. As may be seen in FIGS. 15 and 16 for example, a chime 1504, 1604 may extend toward a top portion of the liner or overpack 1606, and in some embodiments may couple to or connect to an upper portion of the liner/overpack 1606 by any suitable means, including, but not limited to, snap-fit, friction fit, complementary threading, adhesive, adhesive tape, or any other suitable means. Accordingly, in some embodiments, an upper peripheral edge of the chime 1604 may be glued to the overpack, while in other embodiments the chime 1504, 1604 may be snapped onto the overpack 1606 by means of snap-fit or friction fit for example at any suitable or desirable location or height on the overpack 1606. As noted above, because the chime may be comprised of a relatively rigid material in some embodiments, and because the chime may generally fit over a substantial portion of the liner/overpack, if the liner/overpack collapses, dimples, or otherwise distorts, the chime may generally maintain a smooth and rigid shape. As such, any distortion of the liner/overpack may be generally unobservable from the exterior of the liner-based system. Further, the smooth exterior surface of the chime may provide a generally undistorted surface for adhering a label. The chime 1504, 1604 may be comprised of any suitable material, including plastic, for example high density polyethylene (HDPE), PET or any other suitable polyester, or any other suitable material or plastic, or combination thereof. In FIGS. 15 and 16, the chime has been shown with a cut out portion for illustration purposes.

In one embodiment, non-dispense related distortion may be minimized or substantially eliminated by configuring a closure or cap to respond to changes in pressure within the liner-based system, generally like a bellows. For example, a cap that may be secured to the liner and/or the overpack during shipping and/or storage may be configured similar to a vertically disposed accordion. The accordion section of the closure may generally be flexible enough to move vertically up and/or down in response to a change in pressure. For example, if the contents of the container are filled at room temperature, the closure is secured, and the temperature subsequently drops, the resulting change in pressure will tend to make the liner-based system collapse inward. Instead of the liner and/or overpack walls collapsing inward, however, the flexible bellows-like closure may be pulled downward into the liner to take up more space in the liner and thereby help equalize the pressure without the liner and/or overpack walls distorting inward, in some embodiments. The bellows-like closure may be comprised of any suitable material or combination of materials, for example, but not limited to plastic, rubber, or any other material, or combination of materials. Further, the bellows-like closure may have any suitable length and/or thickness. In other similar embodiments, a cap may instead generally be a pressurized ballast cap.

Similarly, in some embodiments, the bottom of the overpack and/or liner may be configured with a folding pattern or predetermined fold lines that allow for flexible reaction to pressure changes within the liner-based system, so as to reduce or eliminate non-dispense related distortion. Fold lines at or near the bottom of the overpack and/or liner may take any general shape that may allow the liner-based system to react to non-dispense related changes in pressure. For example, one or more fold lines may be generally configured as a bellows-like closure described above, thereby allowing the bottom of the liner-based system to extend or compress at the flexible fold lines in response to a change in pressure within the liner-based system, resulting from a change in temperature, for example. In other embodiments, the fold lines may create a generally gusseted bottom portion that may allow the sides of the bottom portion of the liner and/or overpack to bend inward or expand outward at the fold lines in response to a change in pressure in the liner-based system. The number and/or placement of the fold lines is not limited and may generally include any number of fold lines or configuration of fold lines that may allow for the generally flexible and controlled movement of the liner and/or overpack in response to a change in pressure.

In some embodiments one or more valves, for example one-way valves or check valves, may be incorporated into the liner-based system to substantially equalize any change in pressure that may occur during storage and/or shipping, for example. In such embodiments, a valve may be configured as part of a closure that may allow air to either enter or exit (depending on the configuration of the one-way valve) the annular space between the exterior walls of the liner and the interior walls of the overpack. Allowing air to enter or exist the annular space in response to a change in pressure in the liner-based system may substantially reduce or eliminate non-dispense related distortion. In some embodiments a vent may additionally or alternatively serve a similar purpose. The vent, like a valve, may allow air to enter and/or exit the annular space, in some embodiments, so as to equalize a change in pressure that may occur in the liner-based system. In embodiments that include a valve and/or vent, a desiccant may also be included in the liner-based system. The one or more desiccants may be disposed in the annular space and may generally attract and hold any moisture that may be introduced therein via the vent and/or valve, thereby reducing or preventing the risk of contamination of the contents of the liner.

In another embodiment, the overpack may, or may also be, comprised of carbon fiber for example. Carbon fiber may provide advantages for the overall system and its users at least because it may be generally relatively light weight and strong. The carbon fiber overpack may be any suitable thickness.

In other embodiments, one or more coatings may be applied to the exterior of the liner/overpack to provide additional strength and support for the liner/overpack, such that the liner/overpack may generally resist non-dispense related distortion. Such strengthening coatings may be applied in any suitable thickness, or in any suitable number of layers. Further, one or more different coatings may be applied to the overpack in order to provide suitable strength. The coating(s) may be applied by any suitable method or combination of methods, including by dip coating, spraying, or any other suitable method. In other embodiments, a coating may, or may also be applied to the interior of the overpack. In still other embodiments, a coating may, or may also be applied to the interior of the liner after the liner has been expanded for example.

As explained above, the liner can be manufactured using any suitable blow molding manufacturing process, such as injection blow molding, injection stretch blow molding, etc. A manufacturing process utilizing blow molding can allow for liners to have more accurate shapes than other manufacturing processes. In some embodiments, the liner and overpack may be co-blow molded using blow molding techniques. Co-blow molding a liner and overpack system may advantageously reduce the cost of manufacturing a liner and overpack, as the amount of time and labor involved in the process may be decreased. Additionally, co-blow molding may stress the liner and/or overpack less than traditional manufacturing processes that require the liner to be collapsed and inserted into the overpack. Similarly, particle shedding may be reduced with co-blow molding because the liner does not need to be collapsed to be inserted in the overpack, which may generally cause more particles to shed. Additionally, shipping and transportation may be more efficient and/or cost effective because the liner is already disposed inside, interfaced with, or coupled to the overpack.

Figure 12C:
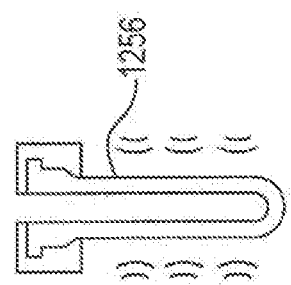
FIG. 12C shows a preform being preheated, according to one embodiment of the present disclosure.
Figure 12B:
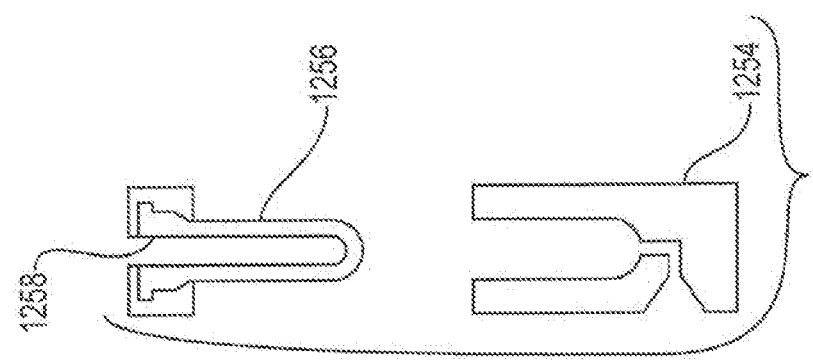
FIG. 12B shows removal of a preform from a mold, according to one embodiment of the present disclosure.
Figure 12A:
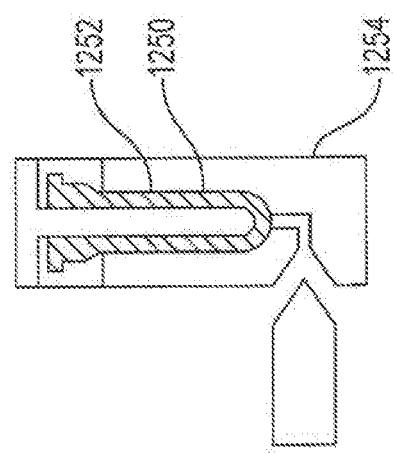
FIG. 12A shows the formation of a preform, according to one embodiment of the present disclosure.

The method may include forming a liner preform by injecting a molten form 1250 of a polymer, for example, into an injection cavity 1252 of a preform mold die 1254, as illustrated in FIG. 12A. The mold temperature and the length of time in the mold may depend on the material or materials selected for manufacturing the liner preform. In some embodiments, multiple injection techniques may be used to form a preform having multiple layers. The injection cavity 1252 may have a shape that corresponds to a liner preform 1256 (FIG. 12B) with integral fitment port 1258. The polymer may solidify, and the resultant liner preform 1256 may be removed from the preform mold die 1254. In alternative embodiments, a pre-manufactured preform, including a multilayer preform, can be used for the preform 1256 of the present disclosure.

The same process as described above and shown in FIGS. 12A and 12B may be substantially followed in order to create a preform for the overpack. The preform for the overpack may generally be larger than the liner preform so that the liner preform may fit inside of the overpack preform.

Once the liner preform and the overpack preform have been created, the liner preform may be inserted inside of the overpack preform. In some embodiments, prior to inserting the liner preform into the overpack preform, the liner preform 1256 may be heated, as shown in FIG. 12C. FIG. 3A shows a cross-sectional view of a liner preform 322 nested inside of an overpack preform 346. In some embodiments, the liner preform 322 may be manually placed inside of the overpack preform 346, while in other embodiments, the liner preform 322 may be placed inside of the overpack preform 346 by an automated or generally automated process. In some embodiments, the liner preform 322 may be kept from contacting the overpack preform 346 when the liner preform 322 is placed in the overpack preform 346. Keeping the preforms from contacting one another may advantageously prevent or reduce the restriction or of one or both preforms getting cold spots or areas of the preform(s) that may be weakened or otherwise adversely affected. As indicated above, FIG. 3B shows an outer side view of a liner preform 322 nested inside of an overpack preform 346.

Figure 13:
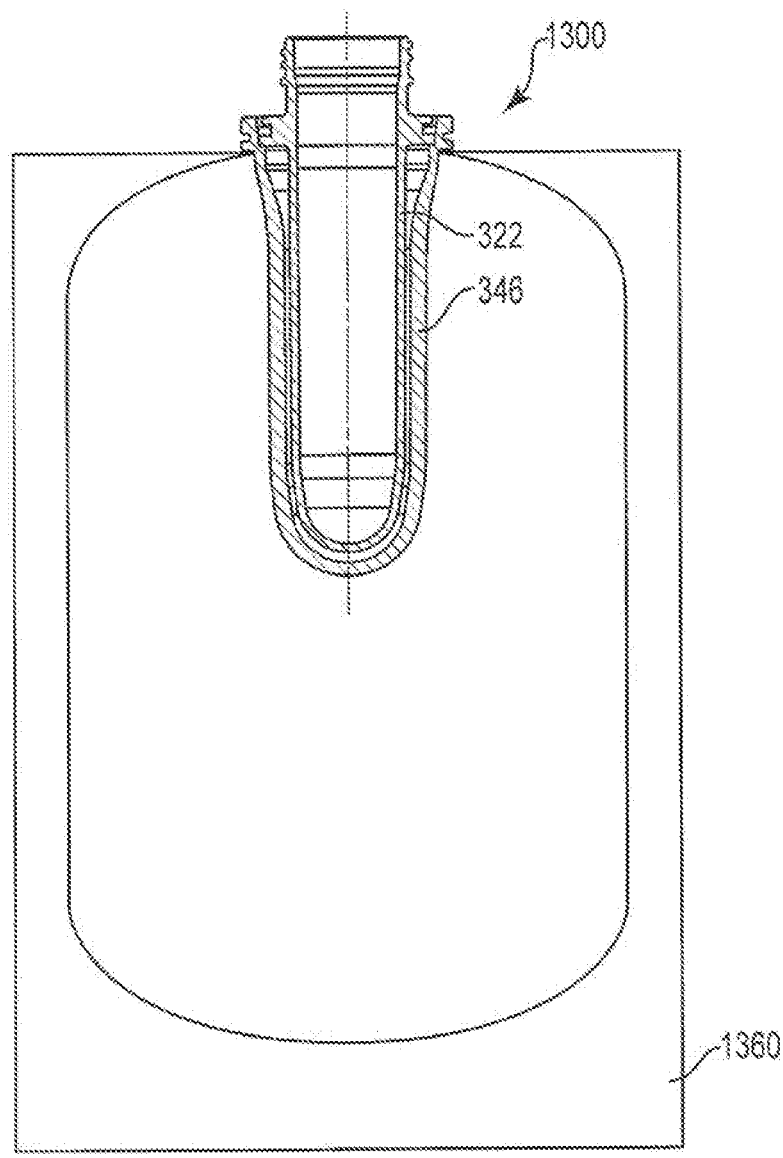
FIG. 13 shows a cross-sectional view of nested preforms being inserted into a mold, according to one embodiment of the present disclosure.
Figure 14:
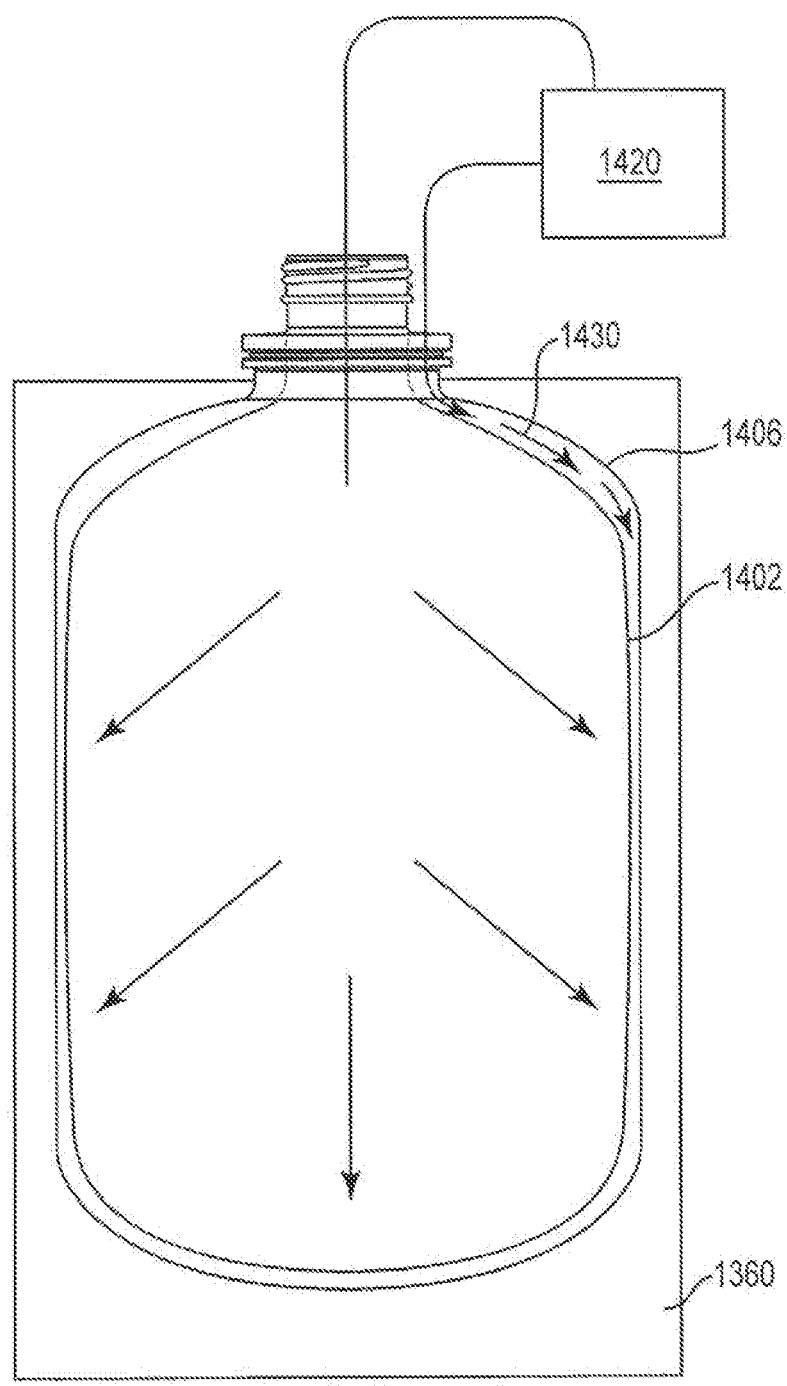
FIG. 14 shows co-blow molding of a liner and overpack, according to one embodiment of the present disclosure.

The nested preforms 1300 comprising the liner preform 322 inside of the overpack preform 346, as illustrated in FIG. 13, may then be inserted into a liner mold 1360 having substantially a negative image of the desired completed overpack and liner. The nested preforms 1300 may then be blown, or stretched and blown in other embodiments, to substantially the image of the mold 1360, as illustrated in FIG. 14, to form the overpack 1406 and liner 1402. As may be seen in FIG. 14, an air source 1420 may blow air into the inside of the liner preform such that the liner preform expands and thins to form the liner 1402. Additionally, in some embodiments, an air source (which may be the same or different from the air source just described) may blow air into the space 1430 between what becomes the overpack 1406 and the liner 1402. The blow molding air speed, as well as the blow molding temperature and pressure, may depend on the material selected for manufacturing the liner preform and the overpack preform.

Once blown to the image of the mold 1360, the overpack 1406 and liner 1402 may solidify and be removed from the mold 1360. The overpack 1406 with the liner 1402 nested inside may be removed from the mold 1360 by any suitable method.

In one embodiment, the material comprising the liner may be the same as the material comprising the overpack. In another embodiment, however, the material comprising the liner may be different from the material comprising the overpack. In embodiments where the materials are different, the melting points of the materials may differ. Therefore, the temperature at which each of the materials may be suitably blow molded may differ. Accordingly, one of the preforms may be preheated (as discussed above with regard to the liner preform) prior to nesting the preforms and co-blow molding them. As discussed above, in some embodiments, the liner preform may be kept from contacting the overpack preform when the liner preform is placed in the overpack preform. Keeping the preforms from contacting one another may advantageously prevent or reduce the risk of one or both preforms getting cold spots or areas of the preform(s) that may be weakened or otherwise adversely affected. In one embodiment, the liner may be comprised of PEN, while the overpack may be comprised of PET or PBN, for example. PEN may need to be blow molded at a higher temperature than PET or PBN because PEN has a higher melting point. Thus, the liner preform comprising PEN may be suitably preheated prior to insertion in the overpack preform and co-blow molding. In other embodiments, the liner and overpack may be comprised of any suitable material as described herein.

Further enhancements may include one or more enhancements provided below and may also include one or more enhancements or other features provided elsewhere in this disclosure. For example, in some embodiments, the exterior and/or interior walls of the liner and/or overpack may have any suitable coating provided thereon. The coating may increase material compatibility, decrease permeability, increase strength, increase pinhole resistance, increase stability, provide anti-static capabilities or otherwise reduce static, etc. Such coatings can include coatings of polymers or plastic, metal, glass, adhesives, etc. and may be applied during the manufacturing process by, for example coating a preform used in blow-molding, or may be applied post manufacturing, such as by spraying, dipping, filling, etc.

In still further embodiments, the liner and/or overpack may be provided with a metal layer or metal coating, for example, but not limited to AL (aluminum), steel, coated steels, stainless steels, Ni (nickel), Cu (copper), Mo (molybdenum, W (tungsten), chromium-copper bi-layer, titanium-copper bi-layer, or any other suitable metal material or combination of materials. In some embodiments, metal coated components may be overcoated with a protective dielectric, for example, $SiO_2$ from TEOS (tetraethylorthosilicate), or $SiCl_4$ (silicon tetrachloride), MO (metal organics), $TiO_2$ from $TiCl_4$ (titanium tetrachloride), or other suitable metal oxide material, or any other suitable metal, or some combination thereof. Metal coated liners and/or overpacks may be advantageous for storing and shipping substances, including ultra-pure substances, because a metal coating may be substantially impermeable to gases, thus reducing oxidation and/or hydrolysis of the contents and maintaining the purity of the substance contained in the liner and/or overpack. Because of the impermeability of the metal coating, a packaging of this embodiment may be substantially free of pinholes or weld tears and may be very robust and have a consistent fill volume.

In still another embodiment, the overpack may be metal, for example, but not limited to aluminum, nickel, stainless steel, thin-walled steel, or any other suitable metal material or combination of materials. In some embodiments, these metal overpacks may be coated on the internal surface with inert films to reduce interaction of the contents with the metal walls. The films may be inert metals, metal oxides, metal nitrides or metal carbides chosen specifically to reduce the chemical interactions and degradation of the contents inside the metal overpack. In another embodiment, a metal overpack may have an internal surface coated with glass, plastic, $SiO_2$, or any other suitable material or combination of materials. Because of the rigidity of the metal, a storage and/or dispensing system of this embodiment may be substantially free of pinholes or weld tears and may be very robust and have a consistent fill volume.

In one specific embodiment, a storage and dispensing system may include a plastic liner provided with a coating of metal. For example, a liner may be formed of a polymer such as PP, PE, PET, PEN, HDPE or any other suitable polymer, or combination of polymers as described above. The outside of the liner may be metalized with, such as but not limited to aluminum. It will be recognized that any suitable metal may be used to metalize the outside of a polymer liner according to this embodiment. The liner may be metalized by any suitable method, such as, for example, plating, electro-plating, spraying, etc. Metalizing the outside of the liner may substantially decrease or eliminate the effects of gas permeability. Because of the impermeability provided by the metal coating, a liner of this embodiment may be substantially free of pinholes or weld tears and may be very robust and have a consistent fill volume.

Accordingly, each of the embodiments of the present disclosure may be adapted for use with any suitable connector or connection mechanism for dispensing. For example, in some embodiments, the storage and dispense assembly of the present disclosure may include, or permit use of a misconnect prevention closure as well as a misconnect prevention connector. The misconnect prevention closure and misconnect prevention connector, in some embodiments, may be configured such that they are compatible with the NOWPak® dispense system, such as that disclosed in U.S. patent application Ser. No. 11/915,996, titled "Fluid Storage and Dispensing Systems and Processes," which was filed Jun. 5, 2006, which was previously incorporated herein. Samples of the misconnect prevention connector 2650 may be that of ATMI of Danbury, Conn., or those disclosed in U.S. Pat. No. 5,875,921, titled "Liquid Chemical Dispensing System with Sensor," issued Mar. 2, 1999; U.S. Pat. No. 6,015,068, titled "Liquid Chemical Dispensing System with a Key Code Ring for Connecting the Proper Chemical to the Proper Attachment," issued Jan. 18, 2000; U.S. Patent Application No. 60/813,083 filed on Jun. 13, 2006; U.S. Patent Application No. 60/829,623 filed on Oct. 16, 2006; and U.S. Patent Application No. 60/887,194 filed on Jan. 30, 2007, each of which is hereby incorporated by reference in its entirety. In other embodiments, the storage and dispense assembly of the present disclosure may include, or permit use of connectors or connection mechanisms traditionally used for glass bottle storage, transportation, and/or dispense systems. In some embodiments, the connectors or connection mechanisms may be made of any suitable material, which in some cases may depend on its use, and the connectors or connection mechanisms may be sterile, aseptic, etc. In still further embodiments, the connectors or connection mechanisms may be configured for applications that involve recirculation of the contents of the liner and/or overpack.

The storage and dispense assembly of the present disclosure may include one or more ports, which may be used for the processes of filling and dispensing, and may include, for example: a liquid/gas inlet port to allow a liquid or gas to enter the packaging system; a vent outlet; a liquid/gas outlet; and/or a dispense port to permit the contents of the liner to be accessed. The ports may be provided at any suitable location. In one embodiment, the ports may be provided generally at or near the top of the liner and/or overpack. In a further embodiment, the storage and dispense assembly may include a septum which may be positioned in or adjacent a connector (such as those described above) and may seal the assembly thereby securely containing any substance therein. In some embodiments any or all of the ports and/or septum may be sterilized or aseptic.

In some embodiments, headspace may be removed through a headspace gas outlet or removal port, which may include a tube or canal that leads into the liner, in some embodiments. Generally, the expression "headspace," as used herein, may refer to the gas space in the liner that may rise to the top of the liner, above the contents stored in the liner. By removing headspace gas prior to content dispense, gas that is in direct contact with the liquid can be reduced or substantially eliminated, such that the amount of gas dissolved into the liquid during the dispense process is significantly reduced or minimized. Liquid with minimal dissolved gas generally has less tendency to release gas bubbles after experiencing a pressure drop in the dispense train, and thus, substantially reducing or eliminating gas bubble issues in the liquid dispense system. Generally, headspace in the liner may be removed or reduced by first pressurizing an annular space between the liner and the overpack via a pressure port so that the liner begins to collapse, thereby forcing any excess headspace gas out of the liner through a headspace removal port, or other suitable outlet port.

As described in U.S. Patent Application No. 61/538,509, titled, "Substantially Rigid Collapsible Liner, Container and/or Liner for Replacing Glass Bottles, and Flexible Gusseted or Non-Gusseted Liners," filed Sep. 23, 2011, any of the packaging systems of the present disclosure or one or more components thereof may be shaped or otherwise configured, for example but not limited to, with folding patterns that may include one or more "hard folds" and/or one or more "pre-folds" or "secondary folds" in the rigid collapsible liner and overpack, so as to allow them to substantially uniformly collapse in a desirable manner. In other embodiments, the storage and dispense assemblies of the present disclosure or one or more components thereof may include other shaped structures or features, such as honeycomb structures or features in the walls that can be used to control the collapsing pattern of the packaging system or one or more components thereof. In one embodiment, such structures (e.g., folds, honeycombs, etc.) may be used to control collapse of the assembly or one or more components thereof, such that it collapses radially, without substantially collapsing vertically.

In some embodiments, one or more colors and/or absorbant materials may be added to the materials of the packaging system or one or more components thereof, such as a container, bottle, overpack, or liner, during or after the manufacturing process to help protect the contents of the liner and/or overpack from the external environment, to decorate the assembly, or to use as an indicator or identifier of the contents within the assembly or otherwise to differentiate multiple assemblies, etc. Colors may be added using, for example, dyes, pigments, nanoparticles, or any other suitable mechanism. Absorbant materials may include materials that absorb ultraviolet light, infrared light, and/or radio frequency signals, etc.

In some embodiments, a desiccant, or other sorbent, may be provided in the annular space between the liner and the overpack to adsorb and/or absorb water, oxygen, chemicals, and/or other impurities that may permeate through either inner and/or outer lining. The use of a desiccant may minimize contamination of the material that may result from a rupture in the liner and/or overpack walls, for example. Further, a desiccant may help minimize the possibility of the material stored in the assembly leaking into the environment as a result of a rupture in the liner and/or overpack.

Similarly, a sorbent material, for example, but not limited to a small cylinder, filled with a gas, a mixture of gasses, and/or a gas generator may be placed in the annular space between the liner and overpack. The sorbent material may be used as a source of pressure for pressure dispense without the need for an external pressure source. The sorbent may release gas by heating the sorbent, by providing electrical pulse, fracture, or any other suitable means or combination of means. Alternatively, the sorbent may be placed in the annular space in the form of beads with a sorbent gas stored therein, for example. The sorbent gas, in the presence of energy, e.g. heat, can desorb from the sorbent medium thereby increasing the pressure in the annular space.

The liners and/or overpacks may be configured as any suitable shape, including but not limited to square, rectangular, triangular or pyramidal, cylindrical, or any other suitable polygon or other shape. Differently shaped liners and/or overpacks can improve packing density during storage and/or transportation, and may reduce overall transportation costs. Additionally, differently shaped liners and/or overpacks can be used to differentiate assemblies from one another, such as to provide an indicator of the contents provided within the assembly or to identify for which application or applications the contents are to be used, etc. In still further embodiments, the assemblies described herein may be configured as any suitable shape in order to "retrofit" the assembly with existing dispense systems.

Additionally, some embodiments of the assembly may include a base or chime component or portion. The chime portion may be an integrated or separate portion or component of the assembly, and may be removable or detachable in some embodiments. With regard to chimes that are separate components, the chime may be attached by any suitable means, including snap-fit, bayonet-fit, friction-fit, adhesive, rivets, screws, etc. Some example chime embodiments are described and/or illustrated in U.S. Prov. Appl. No. 61/538,509, titled, "Substantially Rigid Collapsible Liner, Container and/or Liner for Replacing Glass Bottles, and Flexible Gusseted or Non-Gusseted Liners," filed Sep. 23, 2011, which was previously incorporated herein. The chime may be any suitable size and shape, and may be made from any suitable material, such as the materials described herein. In some embodiments, the chime may be configured to enhance or add stability to the liner and/or overpack for stacking, shipping, strength (e.g., structurally), weight, safety, etc. For example, a chime may include one or more interlocking or mating features or structures that is configured to interlock or mate with a complementary feature of an adjacent container, either vertically or horizontally, for example. As described for example in U.S. Prov. Appl. No. 61/538,509, titled, "Substantially Rigid Collapsible Liner, Container and/or Liner for Replacing Glass Bottles, and Flexible Gusseted or Non-Gusseted Liners," filed Sep. 23, 2011, which was previously incorporated herein, a liner and/or overpack may include a generally rounded or substantially rounded bottom. A rounded bottom can help increase dispensability of the contents therein, particularly in pump dispense applications. A chime may be used to provide support for such liners and/or overpacks. Further in some embodiments, a chime may be coupled to a liner without an overpack. Such an embodiments may be dispensed by pump dispense, for example.

In some embodiments, the liners and/or overpacks described herein may include symbols and/or writing that is molded into the liner and/or overpack. Such symbols and/or writing may include, but are not limited to names, logos, instructions, warnings, etc. Such molding may be done during or after the manufacturing process of the liner and/or overpack. In one embodiment, such molding may be readily accomplished during the fabrication process by, for example, embossing the mold for the liner and/or overpack. The molded symbols and/or writing may be used, for example, to differentiate products.

Similarly, in some embodiments, the liner and/or overpack may be provided with different textures or finishes. As with color and molded symbols and/or writing, the different textures or finishes may be used to differentiate products, to provide an indicator of the contents provided within the liner and/or overpack, or to identify for which application or applications the contents are to be used, etc. In one embodiment, the texture or finish may be designed to be a substantially non-slip texture or finish or the like, and including or adding such a texture or finish to the liner and/or overpack may help improve graspability or handling of the liner and/or overpack, and thereby reduce or minimize the risk of dropping of the liner and/or overpack. The texture or finish may be readily accomplished during the fabrication process by, for example, providing a mold for the liner and/or overpack with the appropriate surface features. In other embodiments, the molded liner and/or overpack may be coated with the texture or finish. In some embodiments, the texture or finish may be provided on substantially the entire liner and/or overpack or substantially the entirety of one or more components thereof. However, in other embodiments, the texture or finish may be provided on only a portion of the liner and/or overpack or a portion of one or more components thereof.

In some embodiments, the interior walls of the liner and/or overpack thereof may be provided with certain surface features, textures, or finishes. In embodiments wherein the assembly comprises an overpack and liner, or multiple liners, etc., the interior surface features, textures, or finishes of the overpack, or one or more of the liners, may reduce adhesion between the overpack and liner, or between two liners. Such interior surface features, textures, or finishes can also lead to enhanced dispensability, minimized adhesion of certain materials to the surface of the overpack or liner(s), etc. by controlling, for example, the surface hydrophobicity or hydrophilicity.

In some embodiments, the liner and/or overpack include one or more handles. The one or more handles can be of any shape or size, and may be located at any suitable position of the liner and/or overpack. Types of handles can include, but are not limited to, handles that are located at the top and/or sides; are ergonomic; are removable or detachable; are molded into the liner and/or overpack or are provided after fabrication of the assembly (such as by, for example, snap fit, adhesive, riveting, screwed on, bayonet-fit, etc.); etc. Different handles and/or handling options can be provided and may depend on, for example but not limited to, the anticipated contents of the liner and/or overpack, the application for the assembly, the size and shape of the assembly, the anticipated dispensing system for the assembly, etc.

In some embodiments, as shown in FIGS. 17A-D, a flexible or elastic handle may be molded to be compact to fit into shipping boxes and equipment. When lifted, the handle may expand to provide clearance for hands or for different size closures. Upon release, the handle may return to its original compact shape and position. In some embodiments, as shown in FIGS. 17A-D, a handle 1742 may be used to lift and or move the liner-based system 1740. The handle 1742 may be any color and may be made from any suitable material or combination of materials, for example, plastic. As may be seen, in some embodiments, the handle 1742 may be configured so as not extend beyond the circumference of the container 1746 when the handle is in a horizontal position. In further embodiments, the handle 1742, when in an unused position, for example, may have one or more bulge areas, or expansion areas, 1754 that may be configured to generally straighten out when the handle 1742 is pulled generally vertically, or otherwise in use by the user. Accordingly, when the handle 1742 is positioned in an in-use or carrying position, as shown for example in FIGS. 17C and D, in some embodiments, the handle 1742 may expand and stretch due to the give in the expansion areas 1754. For example, in some embodiments, the handle may expand by about ½ to 1½ inches when lifting the handle 1742. In other embodiments, the handle may be configured to expand more or less as appropriate. The ability of the handle to expand while in the carrying position may advantageously allow the handle to stay within the circumferential dimensions of the container while in a unused position, such that the handle does not get damaged during shipping or storage for example. The expansion of the handle while in the in-use or carrying position can also permit the handle to clear certain caps and/or connectors 1750.

In some embodiments, the storage and dispense assembly may include two or more layers, such as an overpack and a liner, multiple overpacks, or multiple liners. In further embodiments, a packaging system may include at least three layers, which may help ensure enhanced containment of the contents therein, increase structural strength, and/or decrease permeability, etc. Any of the layers may be made from the same or different materials, such as but not limited to, the materials previously discussed herein.

In some embodiments, the assembly may comprise a single wall overpack or liner. In even further embodiments, the single wall may comprise PEN. In another embodiment, the assembly may comprise a liner that is made of a flexible glass type or a flexible glass/plastic hybrid. Such flexible glass liner may reduce or eliminate the permeation of oxygen and water into the contents stored therein. A flexible glass liner may also add the ability of withstanding chemicals or chemistries not compatible with other materials, such as PEN or other plastics.

In order to assist in making the assemblies described herein more sustainable, the assembly or one or more components thereof, including any overpack, liner(s), handles, chimes (support members), connectors, etc., may be manufactured from biodegradable materials or biodegradable polymers, including but not limited to: polyhydroxyalkanoates (PHAs), like poly-3-hydroxybutyrate (PHB), polyhydroxyvalerate (PHV), and polyhydroxyhexanoate (PHH); polylactic acid (PLA); polybutylene succinate (PBS); polycaprolactone (PCL); polyanhydrides; polyvinyl alcohol; starch derivatives; cellulose esters, like cellulose acetate and nitrocellulose and their derivatives (celluloid); etc.

In some embodiments, the assembly or one or more components thereof may be manufactured from materials that can be recycled or recovered, and in some embodiments, used in another process by the same or a different end user, thereby allowing such end user(s) to lessen their impact on the environment or lower their overall emissions. For example, in one embodiment, the assembly or one or more components thereof may be manufactured from materials that may be incinerated, such that the heat generated therefrom may be captured and incorporated or used in another process by the same or different end user. In general the assembly or one or more components thereof may be manufactured from materials that can be recycled, or that may be converted into raw materials that may be used again.

In some embodiments, structural features may be designed into the liner and/or overpack that add strength and integrity to the assembly or one or more components thereof. For example, the base (or chime in some embodiments), top, and sides of the assembly may all be areas that experiences increased shake and external forces during filling, transportation, installation, and use (e.g., dispensing). Accordingly, in one embodiment, added thickness or structural edifices (e.g., bridge tressel design) may be added to support stressed regions of the packaging, which can add strength and integrity to the assembly. Furthermore, any connection region in the assembly may also experience increased stress during use. Accordingly, any of these such regions may include structural features that add strength through, for example, increased thickness and/or specifically tailored designs. In further embodiments, the use of triangular shapes could be used to add increased strength to any of the above described structures; however, other designs or mechanical support features may be used.

In some embodiments, the assembly or one or more components thereof, including any overpack or liner(s), may include reinforcement features, such as but not limited to, a mesh, fiber(s), epoxy, or resin, etc. that may be integrated or added to the assembly or one or more components thereof, or portions thereof, in order to add reinforcement or strength. Such reinforcement may assist in high pressure dispense applications, or in applications for dispensing high viscosity contents or corrosive contents.

In further embodiments, flow metering technology may be either separate or integrated into the dispense connector for a direct measurement of material being delivered from the liner and/or overpack to a down stream process. A direct measurement of the material being delivered could provide the end user with data which may help ensure process repeatability or reproducibility. In one embodiment, the integrated flow meter may provide an analog or digital readout of the material flow. The flow meter, or other component of the system, can take the characteristics of the material (including but not limited to viscosity and concentration) and other flow parameters into consideration to provide an accurate flow measurement. Additionally, or alternatively, the integrated flow meter can be configured to work with, and accurately measure, a specific material stored and dispensed from the liner and/or overpack. In one embodiment, the inlet pressure can be cycled, or adjusted, to maintain a substantially constant outlet pressure or flow rate.

In some embodiments, the assembly may include level sensing features or sensors. Such level sensing features or sensors may use visual, electronic, ultrasonic, or other suitable mechanisms for identifying, indicating, or determining the level of the contents stored in the packaging system. For example, in one embodiment, the storage and dispense assembly or a portion thereof may be made from a substantially translucent or transparent material that may be used to view the level of the contents stored therein.

In still further embodiments, the assembly may be provided with other sensors and/or RFID tags, which may be used to track the assembly, as well as to measure usage, pressure, temperature, excessive shaking, disposition, or any other useful data. The RFID tags may be active and/or passive. For example, strain gauges may be used to monitor pressure changes of the assembly. The strain gauges may be applied or bonded to any suitable component of the assembly. In some embodiments, the strain gauges may be applied to an outer overpack or liner. The strain gauges may be used to determine pressure build-up in an aging product, but may also be useful for a generally simple measurement of the contents stored in the assembly. For example, the strain gauge may be used to alert an end user when to change out a liner and/or overpack or may be used as a control mechanism, such as in applications where the assembly is used as a reactor or disposal system. In embodiments where the sensitivity of the strain gauge is high enough, it may be able to provide a control signal for dispense amount and flow rate.

In one particular embodiment, as discussed above, a liner-based system may include a co-blow molded liner and overpack with substantially co-extensive surface features and a base cup or chime, as may be seen in FIGS. 18A-D.

Figure 18B:
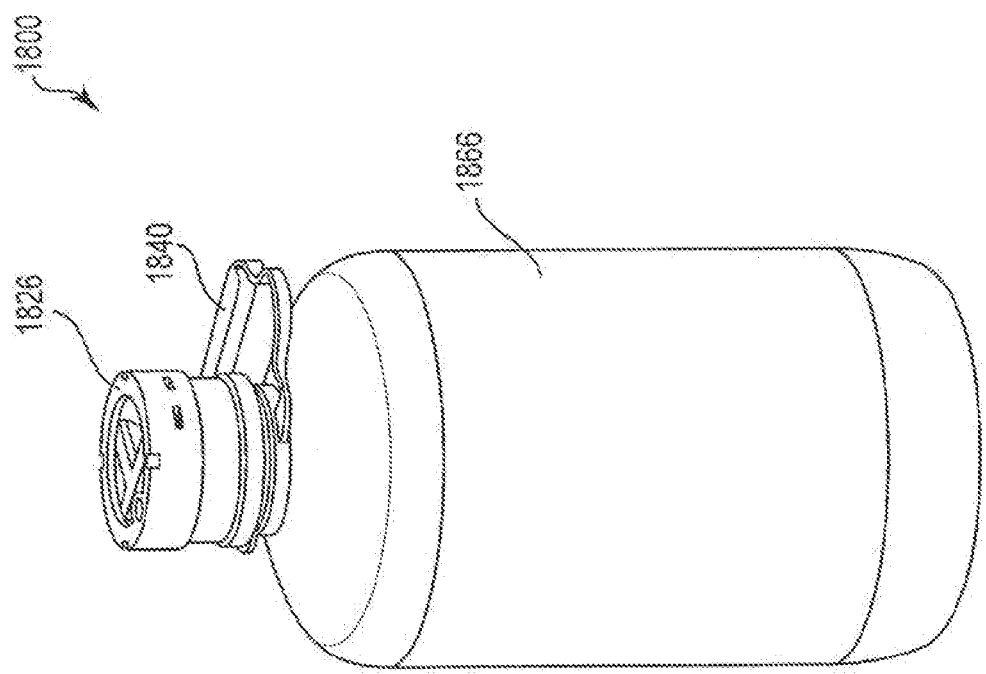
FIG. 18B shows the embodiment of FIG. 18B with a closure connected to the liner-based system.
Figure 18A:
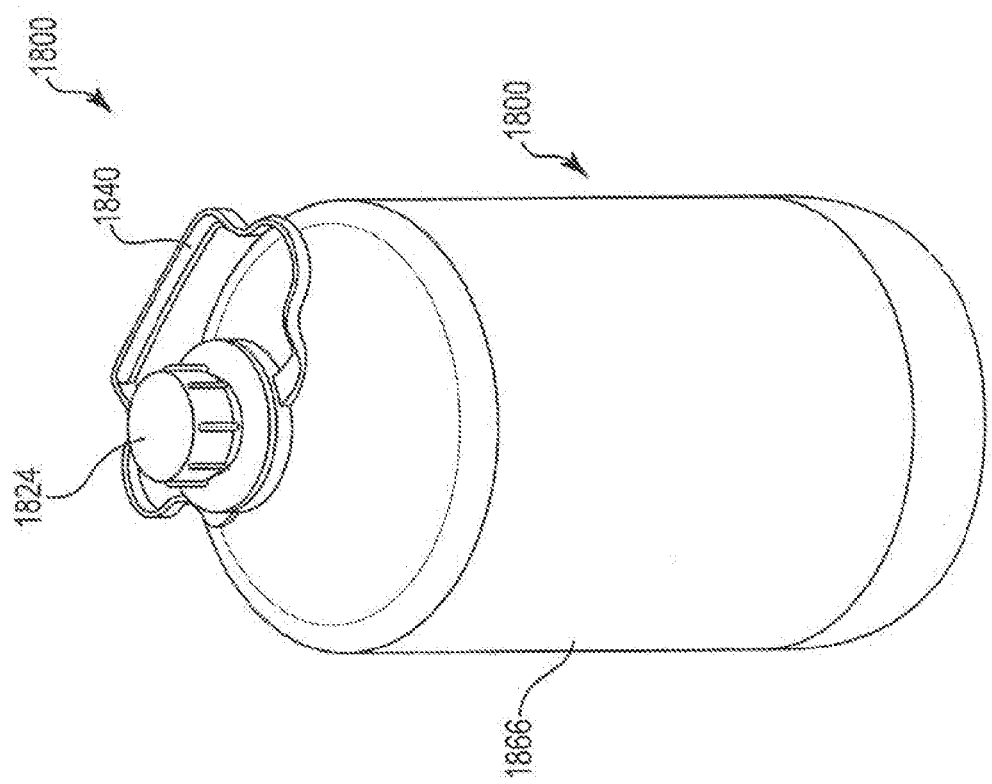
FIG. 18A shows the liner-based system with a dust cap according to one embodiment of the present disclosure.
Figure 18D:
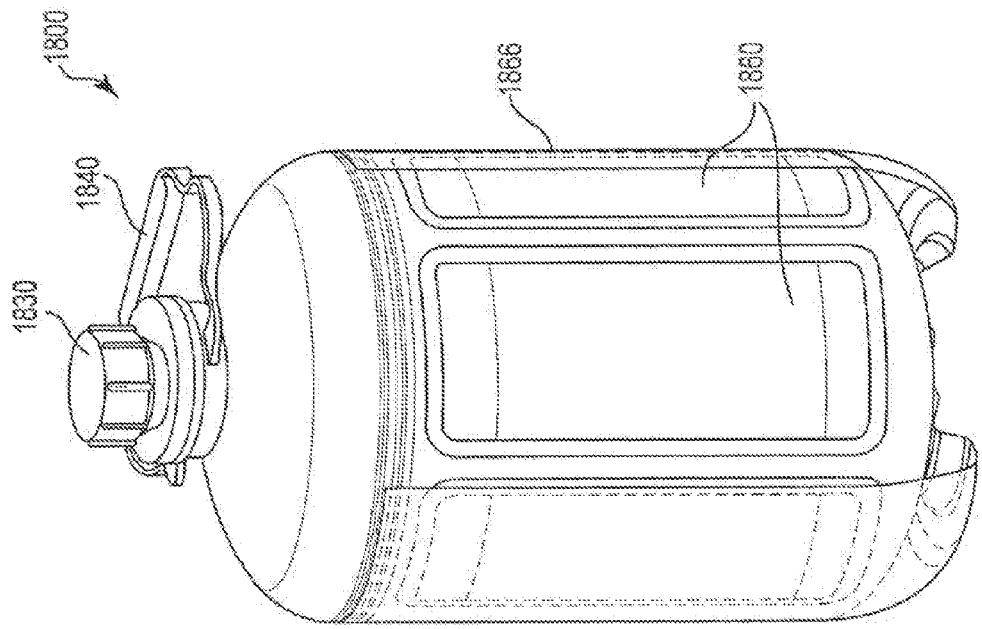
FIG. 18D shows the embodiment of FIGS. 18A-C with another cap connected to the liner-based system and also showing surface features on the liner-based system.
Figure 18C:
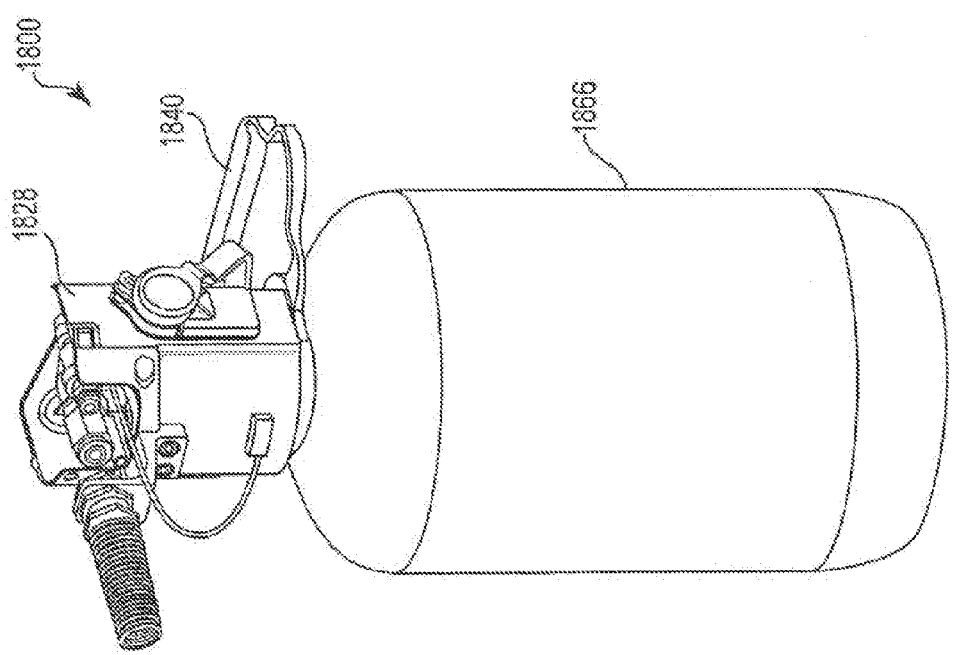
FIG. 18C shows the embodiment of FIGS. 18A and B with a dispense connector connected to the liner-based system.

The liner-based system 1800 may be configured to couple with a variety of different caps, closures, and/or connectors of the type described herein. FIG. 18A shows the liner-based system coupled with a temporary cap or dust cap 1824 that may be used for storage and/or shipping. FIG. 18B shows the liner-based system 1800 coupled with a closure 1826. The closure 1826 may secure the contents of the liner-based system 1800 during storage and/or shipping, but may also be configured to couple with a connector for dispense. FIG. 18C, for example, shows the liner-based system 1800 coupled with a pressure dispense connector 1828. And, FIG. 18D shows the liner-based system 1800 coupled to yet another cap 1830 that may be used to secure the contents of the liner-based system 1800 during storage and/or shipping. The additional coverage provided by cap 1830, as opposed to cap 1824, for example, may advantageously shield the contents of the liner from light; may prevent or reduce the risk of environmental moisture entering the contents of the liner; and/or may provide secondary containment because the cap 1830 may be secured to and/or cover both the liner fitment and the overpack, in some embodiments Each of FIGS. 18A-D shows the liner-based system 1800 including a handle 1840 of the type disclosed herein that may be flexible and expand when the handle 1840 is used to pick up and/or move the liner-based system 1800. The liner may be what has been referred to herein as a substantially rigid collapsible liner. The liner and/or overpack may include one or more barriers and/or coatings as described herein. The liner and/or overpack may be substantially smooth surfaced or may include surface features as generally described above, including rectangular shaped panels 1860, such as six panels, around the circumference of the liner and overpack, as shown in FIG. 18D. The panels 1860 may be generally evenly spaced and of substantially the same size and shape. The panels may have a height generally equal to the non-sloping height of the liner and overpack; that is, the panels may not extend to cover the top or bottom portions of the liner and overpack that begin to slope or curve toward the mouth or bottom of the liner and overpack. The embodiment may also include a base cup or chime 1866 that may have a height sufficient to generally cover the rectangular panel surface features 1860. The chime 1866 may provide added strength to the system 1800 and may also provide a smooth surface for attaching labels. The base cup 1866 may include a colorant or other additives to protect the liner and overpack 1800 from, for example, UV or infrared light. The overpack may include connecting features for connecting to the chime, including adhesive or snap-fit features that allow the chime 1866 to be detachably coupled to the overpack. The mouth and/or neck of the liner and/or overpack may be configured to couple with existing glass bottle pump dispense systems, such that the liner and overpack may be used as a replacement for existing glass bottles. In addition, the mouth and/or neck of the liner and/or overpack may be configured to couple with and/or existing pressure dispense connectors. As pressurized gas or liquid is introduced into the annual space between the interior walls of the overpack and the exterior walls of the liner during pressure dispense, the liner may be particularly configured to collapse in upon itself and away from the walls of the overpack.

As explained herein, various features of liner-based systems disclosed in embodiments described herein may be used in combination with one or more other features described with regard to other embodiments. That is, liners of the present disclosure may include any one or more of the features described herein, whether or not described as the same or another embodiment. For example only, any embodiment (unless specifically stated otherwise) may be dispensed by direct or indirect pressure dispense, pump dispense, pressure assisted pump dispense, gravity dispense, pressure assisted gravity dispense, or any other method of dispense; may include any number of layers; may have layers made of the same or different materials; may include a liner made of the same or different material as the overpack; may have any number of surface or structural features; may be filled with any suitable material for any suitable use; may be filled by any suitable means, using any suitable cap or connector; may have one or more barrier coatings; may include a sleeve, chime, or base cup; may be configured for use with any one or more caps, closures, connectors, or connector assemblies as described or illustrated herein; the material comprising the liner and/or overpack may include one or more additives; and/or the liners, overpacks, or liner-based systems may have any other combination of features herein described. While some embodiments are particularly described as having one or more features, it will be understood that embodiments that are not described are also contemplated and within the spirit and scope of the present disclosure, wherein those embodiments comprise any one or more of the features, aspects, attributes, properties or configurations or any combination thereof of storage and dispense systems described herein.

Although the present invention has been described with reference to preferred embodiments, persons skilled in the art will recognize that changes may be made in form and detail without departing from the spirit and scope of the invention.

The invention claimed is:

1. A liner-based system comprising:
an overpack; and
a liner provided within the overpack, the liner comprising a mouth and a liner wall defining an interior cavity of the liner, the liner including a top portion and a bottom portion separated by a non-sloping portion, the liner defining a plurality of vertically disposed grooves and a plurality of horizontally disposed grooves along a circumference of the non-sloping portion of the liner, wherein the overpack includes a top portion and a bottom portion separated by a non-sloping portion, the overpack defining a plurality of vertically disposed grooves and a plurality of horizontally disposed grooves along a circumference of the non-sloping portion of the overpack, the plurality of vertically disposed grooves of the overpack being co-extensive with the plurality of vertically disposed grooves of the liner, and the plurality of horizontally disposed grooves of the overpack being co-extensive with the plurality of horizontally disposed grooves of the liner.

2. The liner-based system of claim 1, wherein:
each of the plurality of horizontally disposed grooves of the liner extend around the entire circumference of the non-sloping portion of the liner; and
each of the plurality of horizontally disposed grooves of the overpack extend around the entire circumference of the non-sloping portion of the overpack.

3. The liner-based system of claim 1, wherein:
each of the plurality of vertically disposed grooves of the liner and each of the plurality of horizontally disposed grooves of the liner define projections on the non-sloping portion of the liner; and
each of the plurality of vertically disposed grooves of the overpack and each of the plurality of horizontally disposed grooves of the overpack define projections on the non-sloping portion of the overpack.

4. The liner-based system of claim 1, wherein:
each of the plurality of vertically disposed grooves of the liner and each of the plurality of horizontally disposed grooves of the liner define indentations on the non-sloping portion of the liner; and
each of the plurality of vertically disposed grooves of the overpack and each of the plurality of horizontally disposed grooves of the overpack define indentations on the non-sloping portion of the overpack.

5. The liner-based system of claim 1, wherein:
the plurality of vertically disposed grooves of the liner and the plurality of horizontally disposed grooves of the liner outline a rectangular panel; and
the plurality of vertically disposed grooves of the overpack and the plurality of horizontally disposed grooves of the overpack outline a rectangular panel.

6. The liner-based system of claim 5, wherein each of the plurality of rectangular-shaped panels of the liner and each of the plurality of rectangular-shaped surface features of the overpack are one of an indentation and a protrusion.

7. The liner-based system of claim 5, wherein the rectangular-shaped panels of the liner define a height that is equal to the non-sloping height of the liner.

8. The liner-based system of claim 1, the liner wall has a thickness in a range from 0.05 mm to 3 mm.

9. The liner-based system of claim 8, wherein the liner wall has a thickness in a range from 0.1 mm to 1 mm.

10. The liner-based system of claim 9, wherein the liner wall has a thickness in a range from 0.15 mm to 0.6 mm.

11. The liner-based system of claim 8, wherein the liner comprises a material selected from the group consisting of polyethylene, polyethylene naphthalate, and fluoropolymer.

12. The liner-based system of claim 11, wherein the liner comprises polyethylene naphthalate.

13. A method of manufacturing the liner-based system of claim 1, comprising:
providing the overpack in an expanded state, wherein the overpack includes a top portion and a bottom portion separated by a non-sloping portion, the overpack defining a plurality of vertically disposed grooves and a plurality of horizontally disposed grooves along a circumference of the non-sloping portion of the overpack:
providing a liner preform;
disposing the liner preform within the expanded overpack; and
blow molding the liner preform within the expanded overpack.

* * * * *